US008941633B2

(12) United States Patent
Hasegawa et al.

(10) Patent No.: US 8,941,633 B2
(45) Date of Patent: Jan. 27, 2015

(54) SEMICONDUCTOR INTEGRATED CIRCUIT, SELF-LUMINOUS DISPLAY PANEL MODULE, ELECTRONIC APPARATUS, AND METHOD FOR DRIVING POWER SUPPLY LINE

(71) Applicant: Sony Corporation, Tokyo (JP)

(72) Inventors: Hiroshi Hasegawa, Kanagawa (JP); Teppei Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/446,513

(22) Filed: Jul. 30, 2014

(65) Prior Publication Data

US 2014/0333605 A1 Nov. 13, 2014

Related U.S. Application Data

(63) Continuation of application No. 14/247,365, filed on Apr. 8, 2014, which is a continuation of application No. 14/055,011, filed on Oct. 16, 2013, now Pat. No. 8,730,221, which is a continuation of application No. 12/585,129, filed on Sep. 4, 2009, now Pat. No. 8,610,697.

(30) Foreign Application Priority Data

Oct. 2, 2008 (JP) ................................ 2008-256931

(51) Int. Cl.
*G06F 3/038* (2013.01)
*G09G 3/32* (2006.01)

(52) U.S. Cl.
CPC ...... *G09G 3/3258* (2013.01); *G09G 2310/0256* (2013.01); *G09G 2310/0289* (2013.01); *G09G 2310/06* (2013.01); *G09G 2330/028* (2013.01)
USPC .......................................... 345/208; 345/210

(58) Field of Classification Search
None
See application file for complete search history.

(56) References Cited

U.S. PATENT DOCUMENTS

| | | | | |
|---|---|---|---|---|
| 6,756,977 | B2 | 6/2004 | Ide | |
| 2002/0175635 | A1 | 11/2002 | Komiya | |
| 2008/0024413 | A1 * | 1/2008 | Minami et al. | 345/90 |

(Continued)

FOREIGN PATENT DOCUMENTS

| | | | |
|---|---|---|---|
| JP | 2000-056727 | A | 2/2000 |
| JP | 2001-060076 | A | 3/2001 |

(Continued)

OTHER PUBLICATIONS

Japanese Office Action issued Oct. 19, 2010 for corresponding Japanese Application No. 2008-256931.

*Primary Examiner* — Adam R Giesy
(74) *Attorney, Agent, or Firm* — Rader, Fishman & Grauer PLLC

(57) ABSTRACT

A semiconductor integrated circuit and corresponding display panel and electronic apparatus. A pixel element includes a self-luminous element and a drive transistor connected to a power supply line. In an emission period of the self-luminous element, an active voltage and an intermediate voltage are sequentially applied between the power supply line and a potential line with a pulse-shaped waveform such that a predetermined luminance duration is obtained in the emission period. In a non-emission period of the self-luminous element, an off-state voltage is applied between the power supply line and the potential line so as to maintain the self-luminous element in a non-emission state.

30 Claims, 54 Drawing Sheets

(56) References Cited

U.S. PATENT DOCUMENTS

| | | | |
|---|---|---|---|
| 2008/0117147 | A1 | 5/2008 | Iida et al. |
| 2008/0150843 | A1 | 6/2008 | Yamamoto et al. |

FOREIGN PATENT DOCUMENTS

| | | | |
|---|---|---|---|
| JP | 2002-251167 | | 9/2002 |
| JP | 2003-108075 | A | 4/2003 |
| JP | 2003-150108 | A | 5/2003 |
| JP | 2003-195814 | A | 7/2003 |
| JP | 2004-252105 | A | 9/2004 |
| JP | 2005-301084 | A | 10/2005 |
| JP | 2006-337991 | A | 12/2006 |
| JP | 2008-185671 | A | 8/2008 |
| JP | 2008-185808 | A | 8/2008 |

* cited by examiner

FIG.10A DUTY50%

FIG.10B DUTY40%

FIG.10C DUTY25%

FIG.20

| MOTION AMOUNT (PIXEL PER FRAME) | MOTION VALUE |
|---|---|
| 0 | 1.0 |
| 1 | 1.1 |
| 2 | 1.2 |
| 3 | 1.3 |
| 4 | 1.4 |
| 5 OR LARGER | 1.5 |

77

FIG.25

| LUMINANCE LEVEL (%) | LUMINANCE LEVEL VALUE (%) |
|---|---|
| 50～55 | 1.0 |
| 55～60 | 0.9 |
| 60～65 | 0.8 |
| 65～70 | 0.7 |
| 70～75 | 0.6 |
| 75 OR LARGER | 0.5 |

117

FIG.28

| FRAME RATE [Hz] | FRAME RATE VALUE |
|---|---|
| 65 OR LARGER | 0 |
| 64 | 0.2 |
| 63 | 0.3 |
| 62 | 0.5 |
| 61 | 0.7 |
| 60 | 1.0 |
| 59 | 1.5 |
| 58 | 2.0 |
| 57 | 2.5 |
| 56 | 3.0 |
| 55 | 3.5 |
| 54 OR SMALLER | 4.0 |

83

FIG.29

| AREA [%] | AREA VALUE |
|---|---|
| SMALLER THAN 10 | 0 |
| 10~15 | 1.0 |
| 15~20 | 1.1 |
| 20~25 | 1.2 |
| 25~30 | 1.3 |
| 30~35 | 1.4 |
| 35~40 | 1.5 |
| 40~45 | 1.6 |
| 45~50 | 1.8 |
| 50 OR LARGER | 2.0 |

83

FIG.30

| EMISSION TIME [SECONDS] | EMISSION TIME VALUE |
|---|---|
| SMALLER THAN 1 | 0 |
| 1.0 | 1.0 |
| 1.1 | 1.1 |
| 1.2 | 1.2 |
| 1.3 | 1.3 |
| 1.4 | 1.4 |
| 1.5 | 1.5 |
| 1.6 | 1.6 |
| 1.7 | 1.7 |
| 1.8 | 1.8 |
| 1.9 | 1.9 |
| 2 OR LARGER | 2.0 |

83

FIG.31

| FLICKER INFORMATION | EMISSION MODE |
| --- | --- |
| 0～8 | MOVING IMAGE IMPROVEMENT MODE |
| 8～14 | BALANCE MODE |
| 14～16 | FLICKER SUPPRESSION MODE |

63

DUTY50%

DUTY40%
MOVING IMAGE IMPROVEMENT SYSTEM

DUTY40%
FLICKER SUPPRESSION SYSTEM

DUTY40%
BALANCE SYSTEM

DUTY30%
MOVING IMAGE IMPROVEMENT SYSTEM

DUTY30%
FLICKER SUPPRESSION SYSTEM

DUTY25%
BALANCE SYSTEM

DUTY50%
VH
Vcat

DUTY45%
MOVING IMAGE
IMPROVEMENT SYSTEM
VH
VM
Vcat

DUTY45%
FLICKER
SUPPRESSION SYSTEM
VH
VM
Vcat

DUTY45%
BALANCE SYSTEM
VH
VM

DUTY40%
MOVING IMAGE
IMPROVEMENT SYSTEM
VH
VM

DUTY30%
FLICKER
SUPPRESSION SYSTEM
VH
VM

DUTY37.5%
BALANCE SYSTEM
VH
VM

231

SEMICONDUCTOR INTEGRATED CIRCUIT, SELF-LUMINOUS DISPLAY PANEL MODULE, ELECTRONIC APPARATUS, AND METHOD FOR DRIVING POWER SUPPLY LINE

CROSS REFERENCE TO RELATED APPLICATIONS

This is a Continuation Application of U.S. patent application Ser. No. 14/247,365, filed Apr. 8, 2014, which is a Continuation Application of U.S. patent application Ser. No. 14/055,011, filed Oct. 16, 2013, which is now U.S. Pat. No. 8,730,221, issued on May 20, 2014, which is a Continuation Application of U.S. patent application Ser. No. 12/585,129, filed Sep. 4, 2009, now U.S. Pat. No. 8,610,697, issued on Dec. 17, 2013, which in turn claims priority from Japanese Application No.: 2008-256931, filed on Oct. 2, 2008, the entire contents of which are incorporated herein by reference.

BACKGROUND OF THE INVENTION

1. Field of the Invention

The invention to be described in this specification relates to a technique for driving a power supply line in a self-luminous display panel. The invention has embodiments as a semiconductor integrated circuit, a self-luminous display panel module, electronic apparatus, and a method for driving a power supply line.

2. Description of the Related Art

Features of an organic EL (electroluminescence) display panel include not only high contrast but also a wide viewing angle and high response speed. Furthermore, the organic EL display panel needs no backlight light source and thus is suitable to obtain a display panel having smaller thickness. Therefore, the organic EL display panel is attracting attention as the leading candidate of the next-generation flat panel.

A related art is disclosed in e.g. Japanese Patent Laid-open No. 2002-251167.

The organic EL display panel can control the peak luminance level based on the emission time length of an organic EL element OLED. With reference to FIGS. 1A to 1C and 2, this function to control the luminance level will be described below. FIGS. 1A to 1C show the ratios of the emission period to a one-frame period, which is defined as 100%. In the diagram, the length of the hatched bar indicates the emission period length. For example, FIG. 1B shows a state in which 25% of the one-frame period is used as the emission period, and FIG. 1C shows a state in which 50% of the one-frame period is used as the emission period.

The number of emission periods in the one-frame period is not necessarily limited to one but the emission period may be divided into plural periods as long as the total length of the emission period in the one-frame period is the same.

FIG. 2 shows the relationships between the pixel grayscale and the luminance level dependent on the difference in the emission period length. In FIG. 2, the ordinate indicates the luminance level and the abscissa indicates a signal potential Vsig or a drive current Isig corresponding to the pixel grayscale. As shown in FIG. 2, when the emission period length is longer, the peak luminance level can be set to a higher level. That is, a wider variable range of the luminance level can be ensured.

However, the method in which the peak luminance level is varied based on only the length of a single emission period as shown in FIGS. 1A to 1C involve a problem of difficulty in ensuring of both favorable moving image performance and flicker suppression performance. For example, a longer emission period length can provide a higher peak luminance level but involves a problem of the lowering of the moving image response characteristic. On the other hand, a shorter emission period length can enhance the moving image response characteristic but leads to a problem of the lowering of the peak luminance level and a higher degree of visual recognition of flicker.

SUMMARY OF THE INVENTION

A semiconductor integrated circuit and corresponding display panel and electronic apparatus, and a method for driving a power supply line.

According to one embodiment, a pixel element includes a self-luminous element and a drive transistor connected to a power supply line. In an emission period of the self-luminous element, an active voltage and an intermediate voltage are sequentially applied between the power supply line and a potential line with a pulse-shaped waveform such that a predetermined luminance duration is obtained in the emission period. In a non-emission period of the self-luminous element, an off-state voltage is applied between the power supply line and the potential line so as to maintain the self-luminous element in a non-emission state.

According to another embodiment of the present invention, there is provided a semiconductor integrated circuit including a power supply line drive circuit configured to drive power supply lines connected to pixels that are arranged in a matrix on a self-luminous display panel, wherein in an emission period of a self-luminous element, the power supply line drive circuit supplies, to the power supply line, a first drive potential giving maximum drive amplitude and a second drive potential that gives intermediate drive amplitude and has a waveform shaped into a pulse form in such a way that a predetermined peak luminance level is obtained in the emission period whose both end positions are fixed, and in a non-emission period of the self-luminous element, the power supply line drive circuit supplies, to the power supply line, a third drive potential for setting the self-luminous element to a non-emission state.

According to another embodiment of the present invention, there is provided a semiconductor integrated circuit including a drive timing generator configured to generate timings of driving of power supply lines connected to pixels that are arranged in a matrix on a self-luminous display panel, wherein in an emission period of a self-luminous element, the drive timing generator supplies, to the power supply line, a first drive potential giving maximum drive amplitude and a second drive potential that gives intermediate drive amplitude and has a waveform shaped into a pulse form in such a way that a predetermined peak luminance level is obtained in the emission period whose both end positions are fixed.

According to yet another embodiment of the present invention, there is provided a self-luminous display panel module including:

a pixel array section configured to have a pixel structure corresponding to an active-matrix drive system;

a signal line drive circuit configured to drive signal lines;

a write control line drive circuit configured to control potential writing to pixels arranged in a matrix in the pixel array section;

a power supply line drive circuit configured to supply, to a power supply line, a first drive potential giving maximum drive amplitude and a second drive potential that gives intermediate drive amplitude and has a waveform shaped into a pulse form in an emission period of a self-luminous element, and supply, to the power supply line, a third drive potential for setting the self-luminous element to a non-emission state in a non-emission period of the self-luminous element; and a drive timing generator configured to drive the power supply line drive circuit in such a way that a predetermined peak luminance level is obtained in the emission period whose both end positions are fixed.

According to yet another embodiment of the present invention, there is provided electronic apparatus including:

a pixel array section configured to have a pixel structure corresponding to an active-matrix drive system;

a signal line drive circuit configured to drive signal lines;

a write control line drive circuit configured to control potential writing to pixels arranged in a matrix in the pixel array section;

a power supply line drive circuit configured to supply, to a power supply line, a first drive potential giving maximum drive amplitude and a second drive potential that gives intermediate drive amplitude and has a waveform shaped into a pulse form in an emission period of a self-luminous element, and supply, to the power supply line, a third drive potential for setting the self-luminous element to a non-emission state in a non-emission period of the self-luminous element;

a drive timing generator configured to drive the power supply line drive circuit in such a way that a predetermined peak luminance level is obtained in the emission period whose both end positions are fixed;

a system controller configured to control operation of an entire system; and an operation input unit for the system controller.

According to yet another embodiment of the present invention, there is provided a method for driving power supply lines connected to pixels that are arranged in a matrix on a self-luminous display panel, the method including the steps of:

in an emission period of a self-luminous element, supplying, to the power supply line, a first drive potential giving maximum drive amplitude and a second drive potential that gives intermediate drive amplitude and has a waveform shaped into a pulse form in such a way that a predetermined peak luminance level is obtained in the emission period whose both end positions are fixed; and in a non-emission period of the self-luminous element, supplying, to the power supply line, a third drive potential for setting the self-luminous element to a non-emission state.

The present inventors propose a drive system in which the first drive potential and the second drive potential are employed in the emission period whose both end positions are fixed and the second drive potential is inserted in a pulsed manner. Furthermore, the present inventors propose a drive system in which the ratio between the output period length of the first drive potential and the output period length of the second drive potential in the emission period is varied to thereby variably control the peak luminance level without changing the period length from the start of the emission period to the end thereof. As a result, in this control, the period length from the emission start to the emission end does not change, and therefore change in the displaying quality due to change in the peak luminance level can be minimized.

BRIEF DESCRIPTION OF THE DRAWINGS

FIG. 20 is a diagram showing an example of a table in which the correspondence relationship between the motion amount and a motion value is recorded;

FIG. 25 is a diagram showing an example of a correspondence table between the luminance level and a luminance level value;

FIG. 28 is a diagram showing an example of a correspondence table between the frame rate and a frame rate value;

FIG. 29 is a diagram showing an example of a correspondence table between the area of a high luminance region and an area value;

FIG. 30 is a diagram showing an example of a correspondence table between the emission time of a high luminance region and an emission time value;

FIG. 31 is a diagram showing one example of the correspondence relationship used in determination of an emission mode;

DETAILED DESCRIPTION OF THE PREFERRED EMBODIMENTS

In the following, description will be made about embodiments of the invention proposed by the present inventors regarding an active matrix driven organic EL panel as one example of a self-luminous display panel, in the order shown below.

(A) Appearance Structure of Organic EL Panel Module (B) First Embodiment: control of peak luminance level based on average luminance level (without emission mode determination)

(C) Second Embodiment: control of peak luminance level based on average luminance level (with emission mode determination)

(D) Third Embodiment: control of peak luminance level based on average luminance level (with both emission mode determination and variable drive potential)

(E) Fourth Embodiment: control of peak luminance level based on ambient illuminance (without emission mode determination)

(F) Other Embodiments

Well-known or publicly-known techniques in the related-art technical field are applied to parts that are not particularly illustrated or described in the present specification.

It should be noted that the embodiments to be described below are merely examples and the present invention is not limited thereto.

(A) Appearance Structure of Organic EL Panel Module

First, an appearance example of an organic EL panel module will be described below. In the present specification, the term "panel module" encompasses not only a panel module obtained by forming a pixel array section and drive circuitry on the same substrate but also a panel module obtained by mounting drive circuitry manufactured as e.g. an application specific IC on the same substrate as that of a pixel array section. The application specific IC corresponds to the "semiconductor integrated circuit" set forth in the claims.

Figures 1A, 1B, 1C:
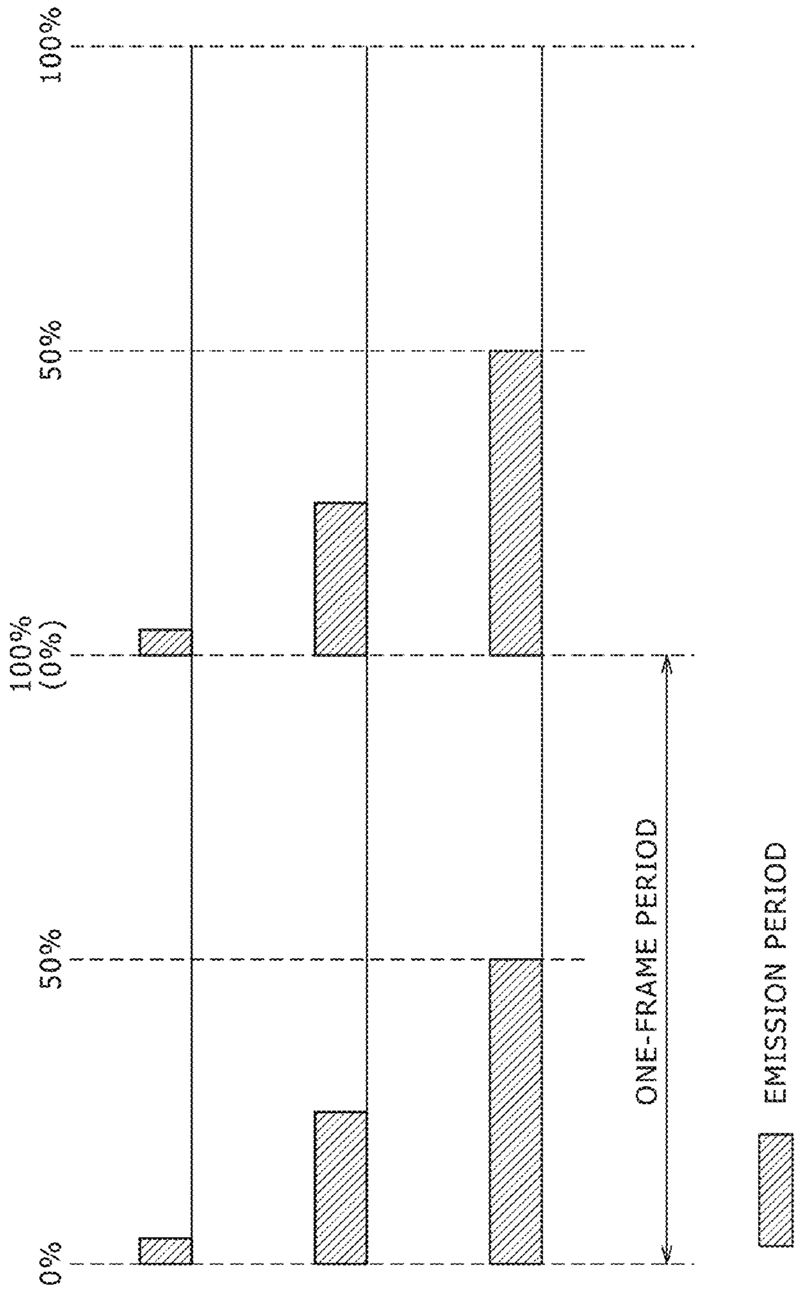
FIGS. 1A to 1C are diagrams showing the relationship between a one-frame period and the emission period length.
Figure 2:
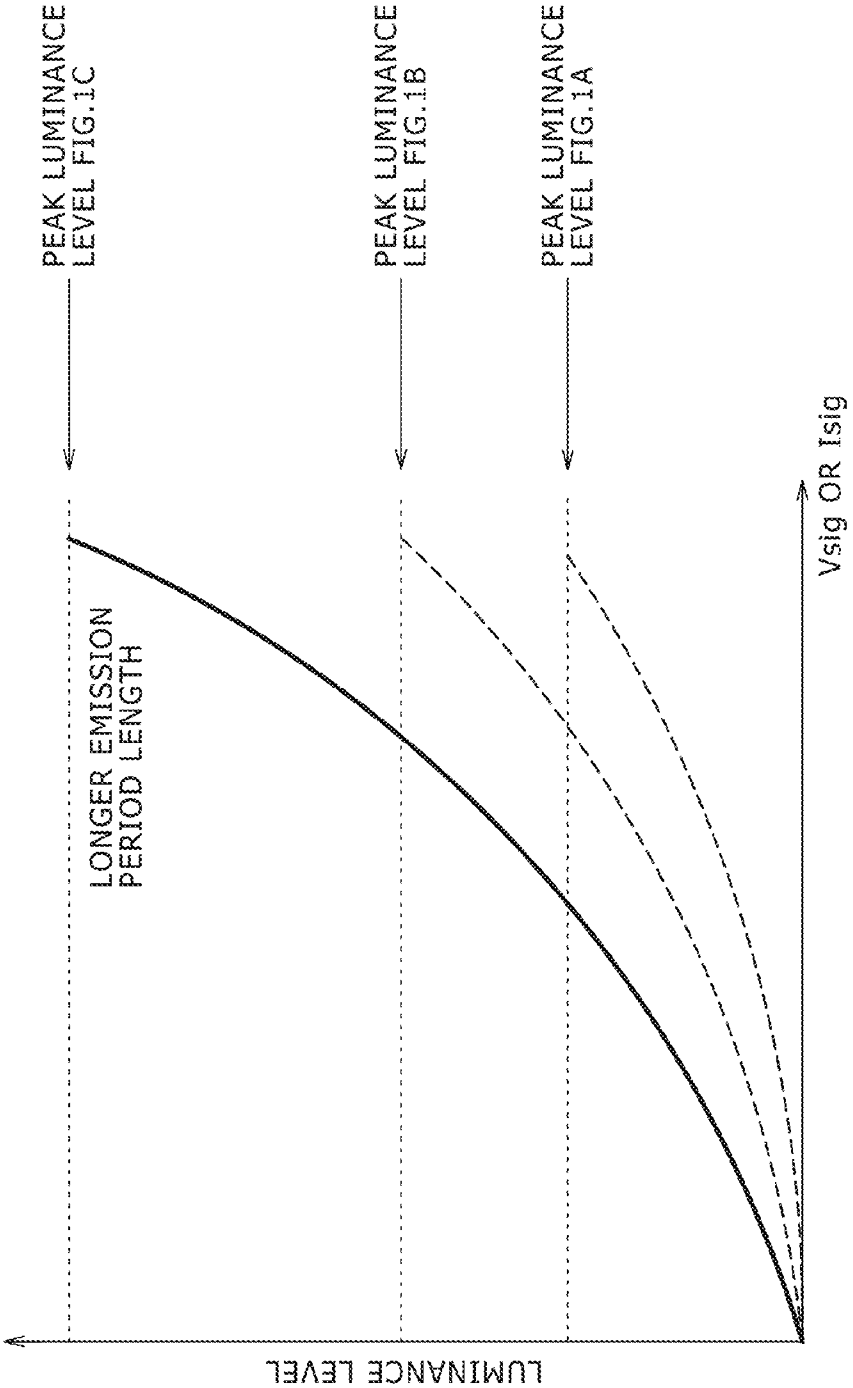
FIG. 2 is a diagram for explaining the relationship between the emission period length and the peak luminance level.
Figure 3:
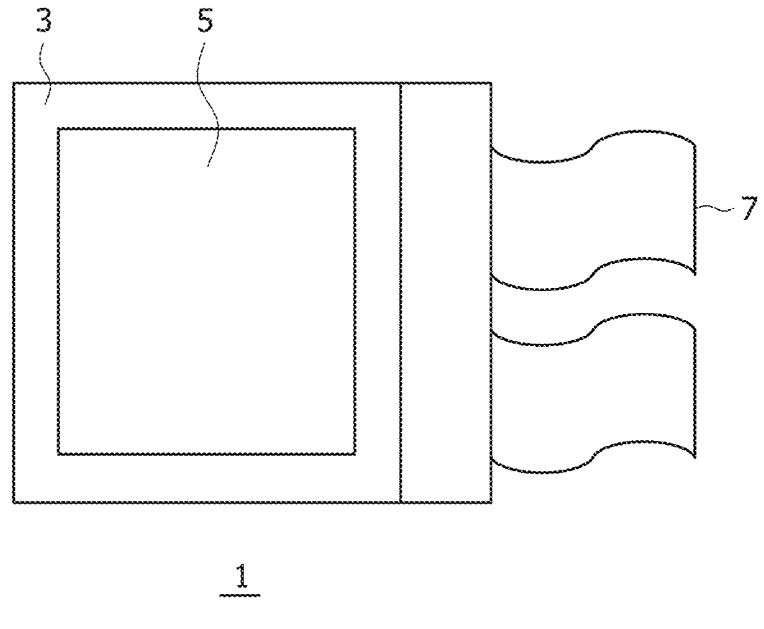
FIG. 3 is a diagram showing an appearance example of an organic EL panel module.

FIG. 3 shows the appearance example of the organic EL panel module. This organic EL panel module 1 has a structure obtained by bonding a counter substrate 5 to a support substrate 3.

The support substrate 3 is composed of glass, plastic, or another base material. The base of the counter substrate 5 is also composed of glass, plastic, or another transparent component. The counter substrate 5 seals the surface of the support substrate 3 with the intermediary of a sealing material.

It is sufficient that substrate transparency is ensured only on the light output side, and the substrate on the other side may be a non-transparent substrate.

In addition, for the organic EL panel 1, a flexible printed circuit (FPC) 7 for input of external signals and drive power is disposed according to need.

(B) First Embodiment

(B-1) System Configuration Example

Figure 4:
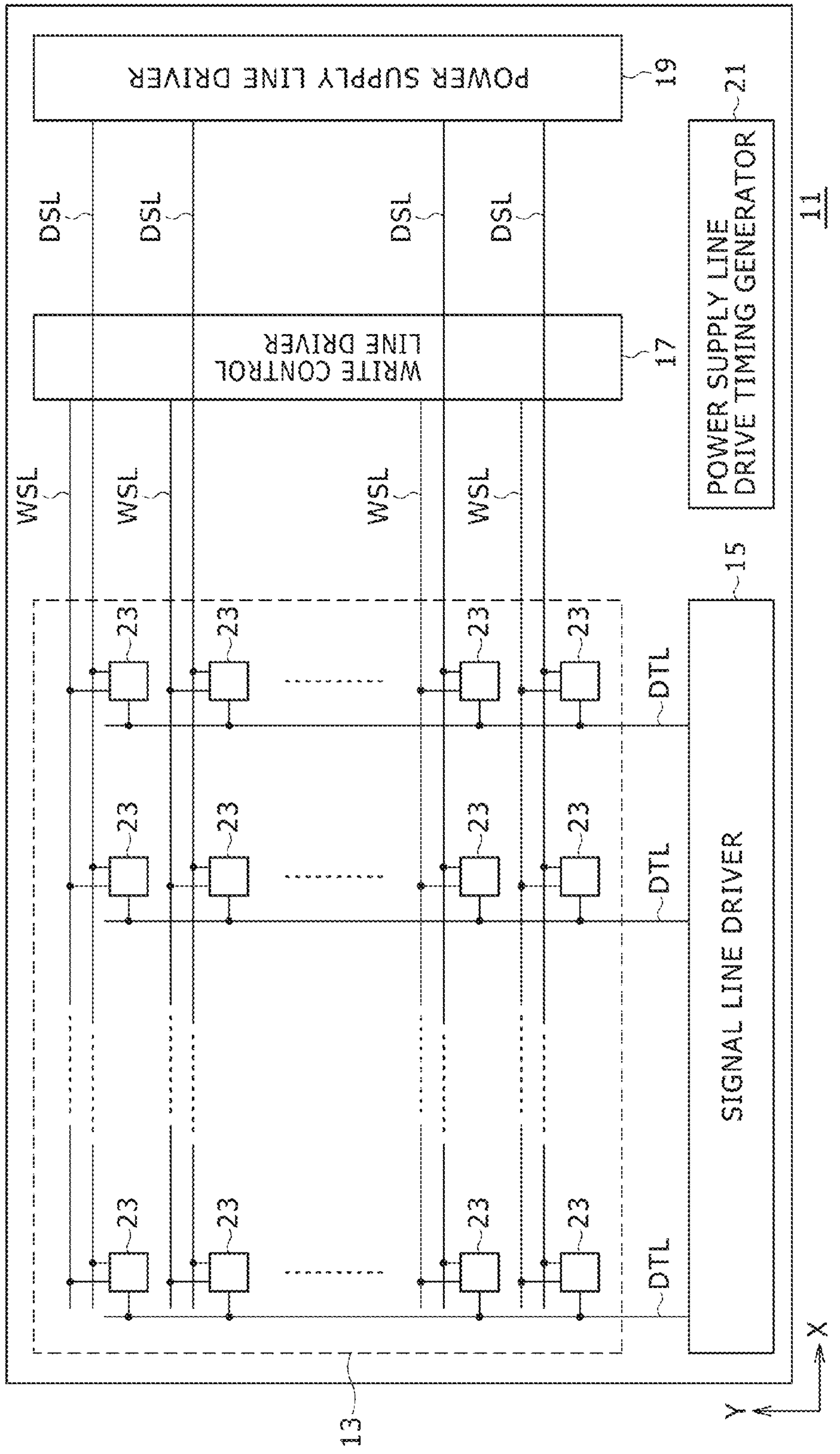
FIG. 4 is a diagram showing a configuration example of an organic EL panel module.

FIG. 4 shows a system configuration example of an organic EL panel module 11 according to a first embodiment of the present invention. The organic EL panel module 11 has a configuration obtained by disposing, on a glass substrate, a pixel array section 13, a signal line driver 15, a write control line driver 17, a power supply line driver 19, and a power supply line drive timing generator 21. In this embodiment, the circuits other than the pixel array section 13 are formed as one or plural semiconductor integrated circuits and mounted on the glass substrate.

(B-2) Configurations of Respective Devices

Form examples of the devices (functional blocks) included in the organic EL panel module 11 will be sequentially described below.

(a) Pixel Array Section

The pixel array section 13 has a matrix structure in which white units each serving as one pixel of displaying are arranged on M rows×N columns. In the present specification, the "row" refers to the pixel line that extends along the X direction in the diagram and is composed of 3×N sub-pixels 23. The "column" refers to the pixel line that extends along the Y direction in the diagram and is composed of M sub-pixels 23. Of course, the values of M and N depend on the display resolution in the vertical direction and the display resolution in the horizontal direction.

Figure 5:
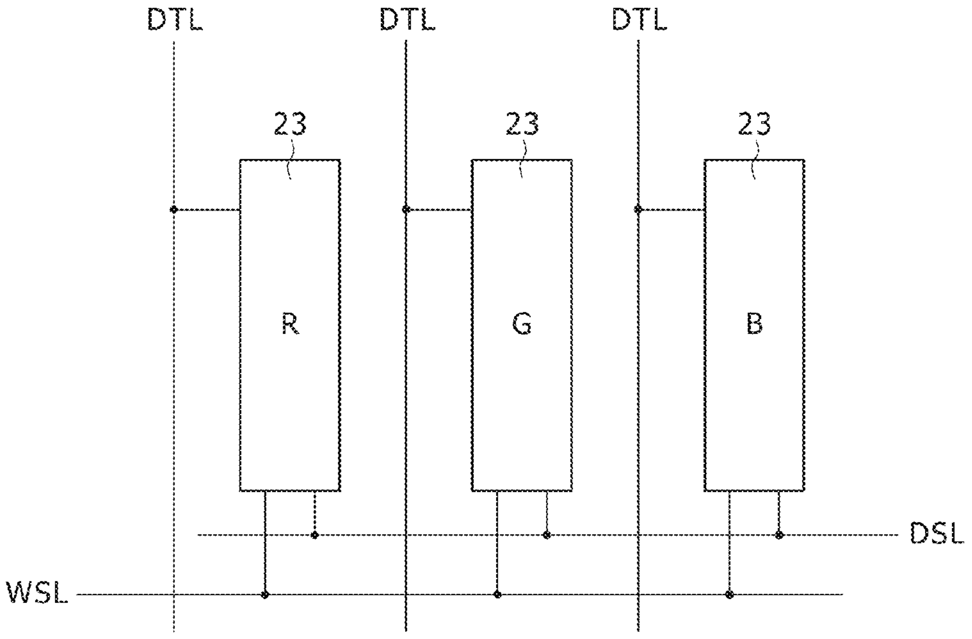
FIG. 5 is a diagram for explaining the arrangement structure of sub-pixels included in a pixel array section.

FIG. 5 shows an arrangement example of the sub-pixels 23 included in the white unit. In the example of FIG. 5, the white unit is composed of the sub-pixels 23 as an R pixel, a G pixel, and a B pixel corresponding to three primary colors. The configuration of the white unit is not limited thereto, of course. As for the sub-pixel 23, not only the sub-pixel structure of a primary color emission type but also other structures such as a structure of a color conversion type based on a filter and a structure of a multi-color emission type will be available.

Figure 6:
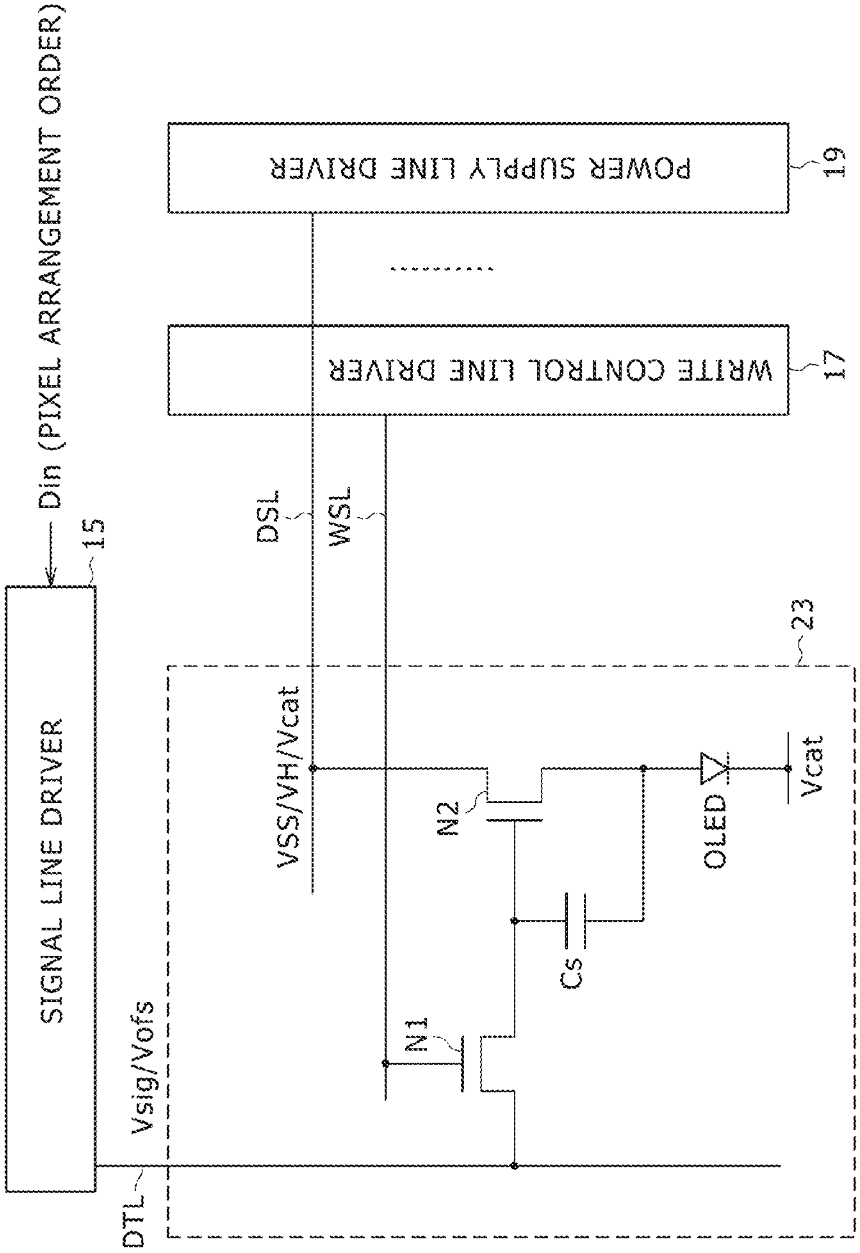
FIG. 6 is a diagram showing a circuit configuration example of the sub-pixel.

FIG. 6 shows a pixel circuit example of the sub-pixel 23 compatible with active matrix driving. For this kind of pixel circuit, a really wide variety of circuit configurations have been proposed. The pixel circuit shown in FIG. 6 corresponds to one of the simplest circuit examples among these proposed circuits.

The pixel circuit of FIG. 6 includes a thin film transistor for controlling sampling operation (hereinafter, referred to as "sampling transistor") N1, a thin film transistor for controlling drive current supply operation (hereinafter, referred to as "drive transistor") N2, a hold capacitor Cs, and an organic EL element OLED.

In the circuit of FIG. 6, the sampling transistor N1 and the drive transistor N2 are each formed of an N-channel MOS transistor. The operation state of the sampling transistor N1 is controlled by a write control line WSL connected to its gate electrode. When the sampling transistor N1 is in the on-state, the potential of a signal line DTL corresponding to pixel data is written to the hold capacitor Cs.

The hold capacitor Cs is a capacitive load connected between the gate electrode and source electrode of the drive transistor N2. A signal potential Vsig held in the hold capacitor Cs gives the gate-source voltage Vgs of the drive transistor N2. A signal current Isig corresponding to this voltage is drawn from a power supply line DSL as a current supply line and supplied to the organic EL element OLED.

When the signal current Isig is larger, the current flowing to the organic EL element OLED is larger and the emission luminance is higher. That is, the grayscale is represented based on the magnitude of the signal current Isig. As long as the supply of this signal current Isig continues, the emission state of the organic EL element OLED with predetermined luminance is continued.

In this embodiment, the power supply line DSL is disposed on a row-by-row basis and supplies a drive potential to all of the sub-pixels 23 located on the same row. In this embodiment, the power supply line DSL is driven by ternary drive potentials VH, Vcat, and VSS. The drive potential VH gives the maximum drive amplitude and corresponds to the first drive potential set forth in the claims. This drive potential VH is a fixed potential.

The drive potential Vcat has the same potential as that of a common cathode electrode connected to the cathode of the organic EL element OLED and corresponds to the second drive potential set forth in the claims. In this embodiment, the drive potential Vcat is a fixed potential. When the drive potential Vcat, which gives intermediate drive amplitude, is applied, the organic EL element OLED is so controlled as to stop emission.

The purpose of using the drive potential Vcat for stopping the emission of the organic EL element OLED in the emission period is to avoid application of a reverse bias to the organic EL element OLED. In general, the repetition of forward bias and reverse bias imposes a large burden on the panel including the organic EL element OLED. Therefore, in this embodiment, the drive potential Vcat is used for the emission stop operation in the emission period to thereby minimize the burden on the panel including the organic EL element OLED.

The drive potential VSS is the fixed potential corresponding to the third drive potential set forth in the claims. In this embodiment, the drive potential VSS is set to a potential lower than the cathode electrode potential Vcat of the organic EL element OLED. Therefore, when the drive potential VSS is applied, the organic EL element OLED is so controlled as to be in the reverse bias state, and is completely turned off.

(b) Signal Line Driver

The signal line driver 15 is a circuit device that applies, to the signal line DTL, a reference potential (hereinafter, referred to as "offset potential") Vofs necessary for correction of the characteristics of the sub-pixel 23 and a signal potential Vsig corresponding to the pixel grayscale. The signal line DTL is disposed on a column-by-column basis and applies a potential to all of the sub-pixels 23 located on the same column.

(c) Write Control Line Driver

The write control line driver 17 is a circuit device that applies, to the write control line WSL, a control pulse giving the write timings of the offset potential Vofs and the signal potential Vsig. In this embodiment, the write control line WSL is disposed on a row-by-row basis as described above. Therefore, the operation of the write control line driver 17 is synchronized with a horizontal scan clock and the write control line driver 17 operates to output the control pulse to the pixel line on the next row in response to every input of the horizontal scan clock.

In this embodiment, the write control line driver 17 is composed basically of a shift register whose respective output stages correspond to the respective rows (pixel lines) and output stages corresponding to the respective rows. The shift register is used to sequentially transfer, to the subsequent row, a timing signal giving e.g. the timings of the rising and falling of the control pulse. The output stage is composed of a logic circuit that generates the control pulse based on the timing pulse supplied from the shift register, a level shifter that converts the control pulse to a potential suitable for the driving, and a buffer circuit that actually drives the write control line WSL.

(d) Power Supply Line Driver

The power supply line driver 19 is a circuit device that controls the drive operation of the sub-pixel 23 in linkage with the control operation of the write control line WSL. As described above, the power supply line driver 19 operates to time-sequentially apply any one of the ternary drive potentials to the power supply line DSL.

In this embodiment, the period during which either the drive potential VH or Vcat is applied to the power supply line DSL is referred to as the emission period, and the period during which the drive potential VSS is applied to the power supply line DSL is referred to as the non-emission period.

Figure 7:
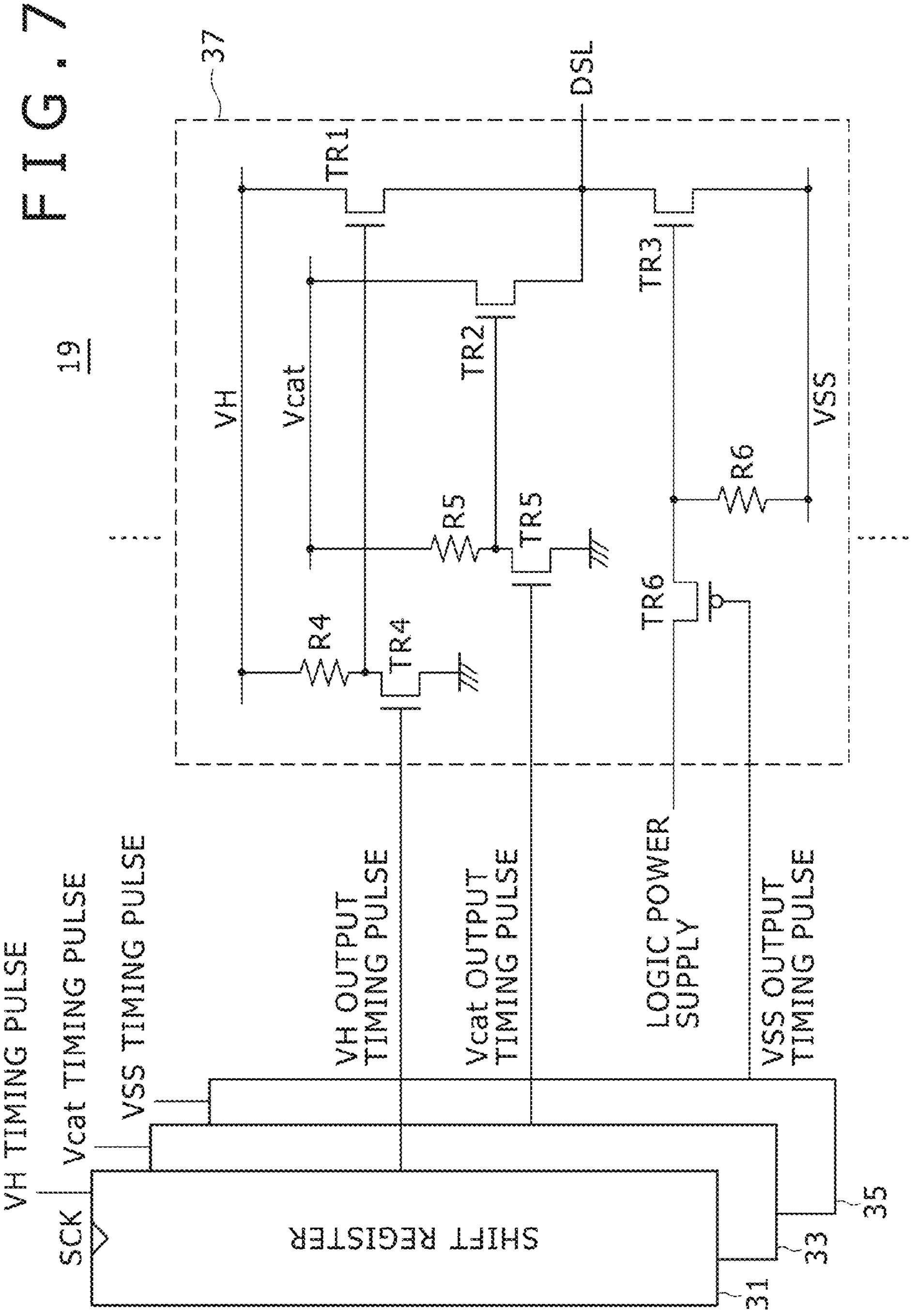
FIG. 7 is a diagram for explaining an internal configuration example of a power supply line driver.

FIG. 7 shows an internal configuration example of the power supply line driver 19. The power supply line driver 19 includes three-stage shift registers 31, 33, and 35 that line-sequentially transfer output timing pulses each corresponding to a respective one of the ternary drive potentials, and M output stage circuits 37 corresponding to the individual power supply lines DSL. In FIG. 7, only one output stage circuit 37 is shown because of restrictions on the drawing.

The shift register 31 is for the drive potential VH, the shift register 33 is for the drive potential Vcat, and the shift register 35 is for the drive potential VSS. Each shift register operates in synchronization with the horizontal scan clock and transfers the logic level value held at each stage to the subsequent stage in response to every input of the horizontal scan clock. The timing pulses corresponding to the respective shift registers are supplied from the power supply line drive timing generator 21.

The output stage circuit 37 includes buffer circuits corresponding to the individual drive potentials and switch circuits for the on/off control of the buffer circuits. A transistor TR1 is the buffer circuit for the drive potential VH. A transistor TR2 is the buffer circuit for the drive potential Vcat. A transistor TR3 is the buffer circuit for the drive potential VSS. A transistor TR4 is the switch circuit for the drive potential VH. A transistor TR5 is the switch circuit for the drive potential Vcat. A transistor TR6 is the switch circuit for the drive potential VSS.

The supply of the drive potential to the power supply line DSL by the buffer circuit is exclusively carried out by the control by the switch circuit. For example, at the drive timing of the drive potential VH, only the transistor TR1 is turned on whereas the transistors TR2 and TR3 are turned off. Similarly, at the drive timing of the drive potential Vcat, only the transistor TR2 is turned on whereas the transistors TR1 and TR3 are turned off. At the drive timing of the drive potential VSS, only the transistor TR3 is turned on whereas the transistors TR1 and TR2 are turned off.

(e) Power Supply Line Drive Timing Generator

The power supply line drive timing generator 21 is a circuit device that generates the timing pulses used for the driving of the power supply line driver 19. Of the output timings of three kinds of drive potentials based on the timing pulses, only the output timing of the drive potential VSS is fixed, and the output timings of the drive potentials VH and Vcat are variably controlled depending on the average luminance level Yavr of input image data Din.

In this embodiment, the unit output period (pulse width) of the drive potential Vcat is set to 1% of the one-frame period length. The period of the drive potential Vcat is so set as to uniformly exist within the range of the predefined emission period.

Figure 8:
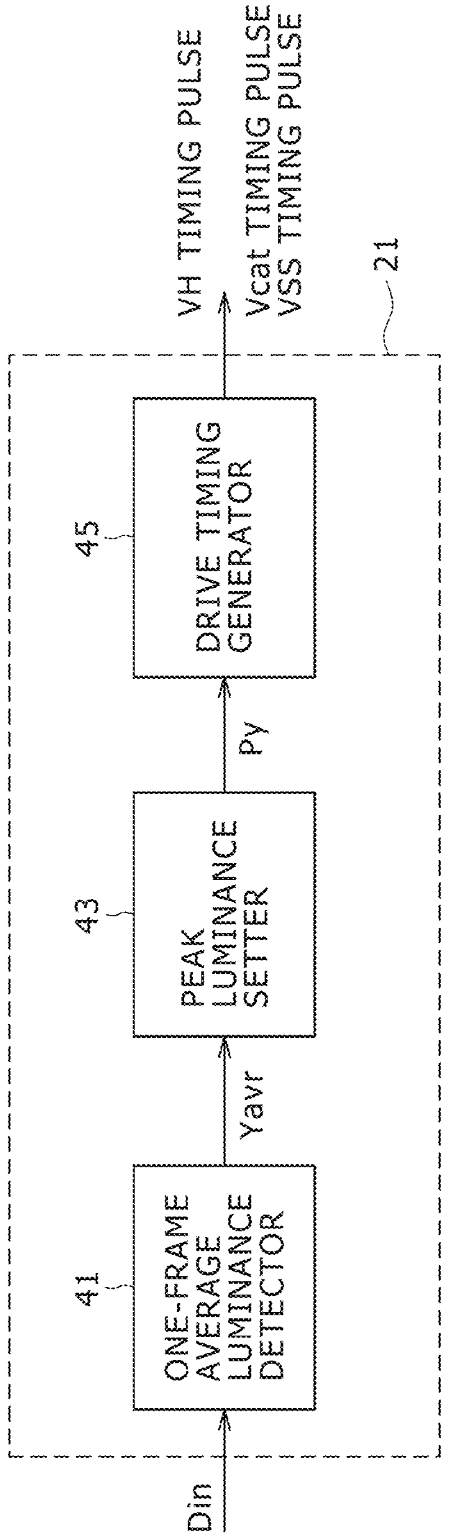
FIG. 8 is a diagram for explaining an internal configuration example of a power supply line drive timing generator.

FIG. 8 shows a circuit configuration example of the power supply line drive timing generator 21. The power supply line drive timing generator 21 includes a one-frame average luminance detector 41, a peak luminance setter 43, and a drive timing generator 45.

The one-frame average luminance detector 41 is a circuit device that calculates the average luminance level Yavr of the input image data Din corresponding to all of the pixels included in the one-frame screen. The input image data Din is given with a data format of red (R) pixel data, green (G) pixel data, and blue (B) pixel data. In this embodiment, the average luminance level Yavr is calculated as a value relative to the maximum luminance level as 100%.

In the calculation of the average luminance level Yavr, initially the one-frame average luminance detector 41 converts R pixel data, G pixel data, and B pixel data corresponding to the respective pixels into the luminance level of each pixel.

The average luminance level Yavr may be calculated on a frame-by-frame basis, or alternatively may be calculated as the average value of plural frames.

Figure 9:
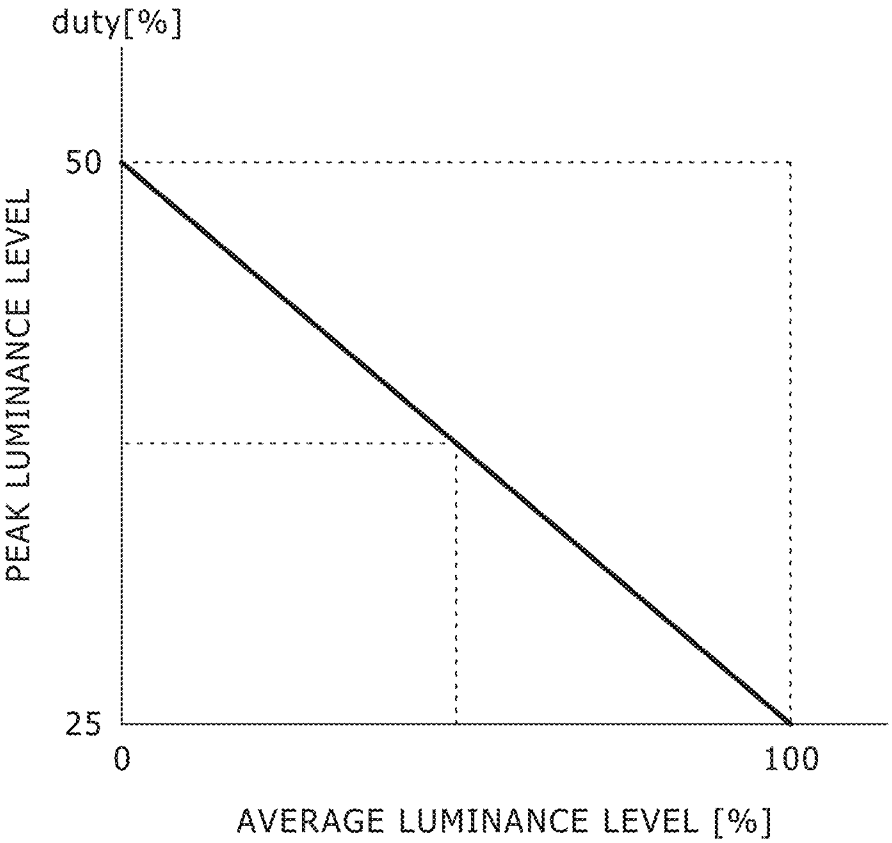
FIG. 9 is a diagram showing an example of a conversion table used in a peak luminance setter.

The peak luminance setter 43 is a circuit device that sets a peak luminance level Py used for displaying of the relevant frame screen based on the calculated average luminance level Yavr. For example, for a frame screen whose average luminance level Yavr is low, the emission period length is so set that the peak luminance level Py corresponds to a high value in the dynamic range. In this embodiment, the emission period length is set to a length in the range of 25% to 50% of the one-frame period length, which is 100%. FIG. 9 shows an example of the conversion table used in the peak luminance setter 43. In the diagram, the ordinate indicates the period length [%] corresponding to the peak luminance level Py, and the abscissa indicates the average luminance level Yavr.

The drive timing generator 45 is a circuit device that generates the timing pulses necessary for the drive control of the sub-pixels 23. Because the drive timing is fixed except for the emission period, the timing pulses corresponding to the respective drive potentials are output at predefined timings in these periods. In this embodiment, the output timing of the drive potential VH and the output timing of the drive potential Vcat in the emission period are variably generated depending on the peak luminance level Py.

Figure 10:
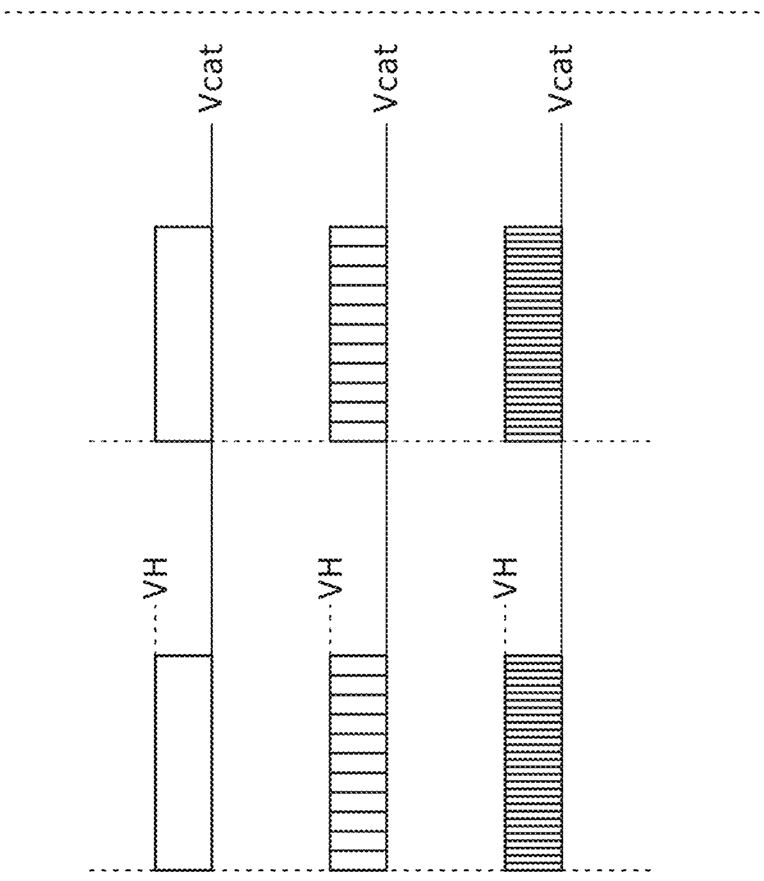
FIGS. 10A to 10C are diagrams showing output pattern examples of a drive potential dependent on the peak luminance level.

FIGS. 10A to 10C show output pattern examples of the drive potential in the emission period. FIG. 10A shows an output pattern example when the peak luminance level Py is 50%. This case corresponds to the maximum luminance. Therefore, only the drive potential VH is employed in the emission period. FIG. 10B shows an output example when the peak luminance level Py is 40%. In this case, the pulsed drive potential Vcat having the period length equivalent to 1% of the one-frame period length is output ten times in the emission period. The output timing of the drive potential Vcat is so disposed as to uniformly exist in the emission period.

FIG. 10C shows an output example when the peak luminance level Py is 25%. This case corresponds to the minimum luminance. In this case, the pulsed drive potential Vcat having the period length equivalent to 1% of the one-frame period length is output 25 times in the emission period. Of course, the output timing of the drive potential Vcat is so disposed as to uniformly exist in the emission period. Therefore, as shown in FIG. 10C, the drive potentials VH and Vcat are alternately output with the same output period length.

Although it is also possible to calculate the pattern of the drive potentials VH and Vcat dependent on the peak luminance level Py each time, the output patterns corresponding to the respective peak luminance levels Py are stored in advance in this embodiment.

Figure 11:
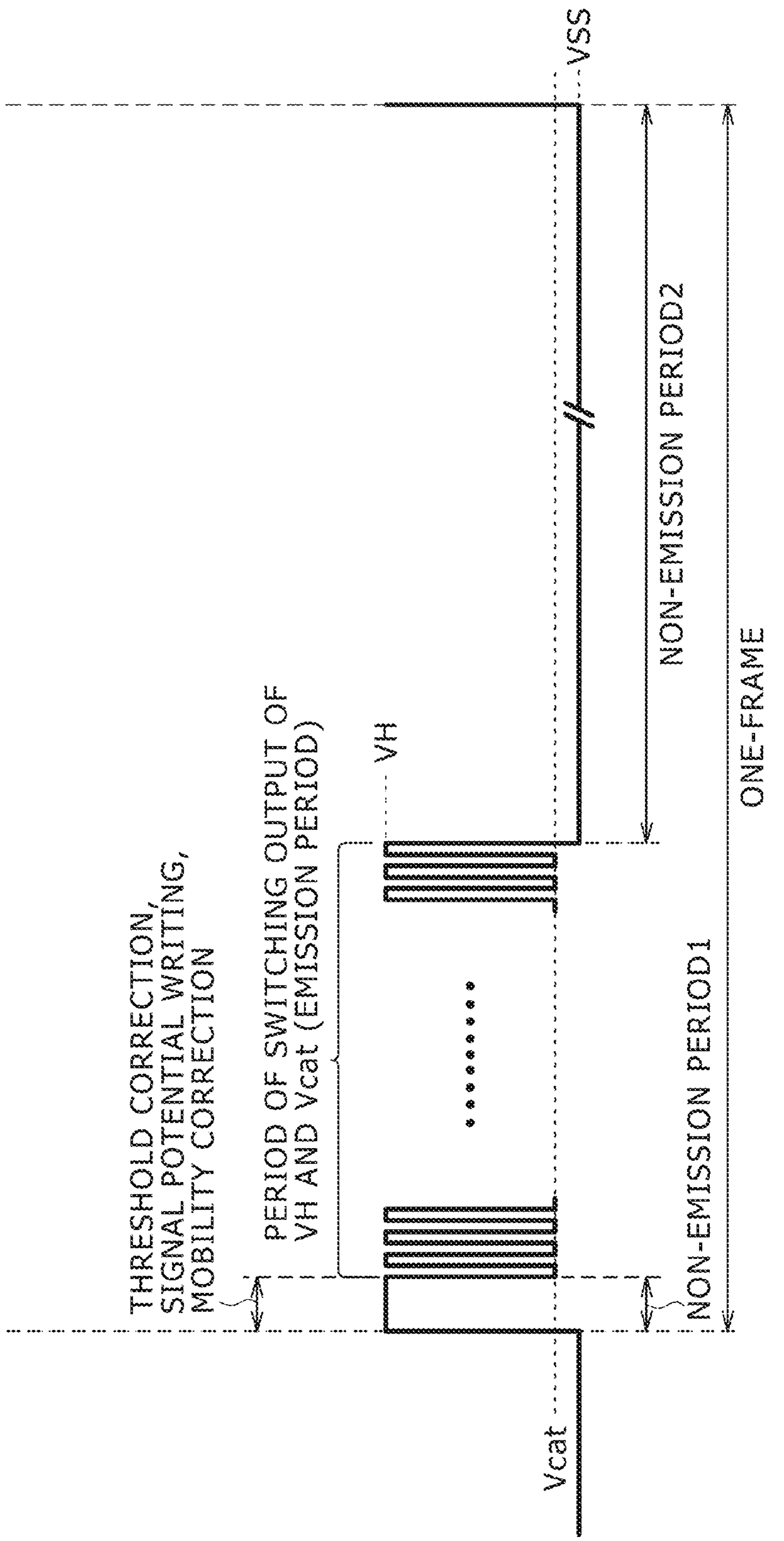
FIG. 11 is an enlarged view of an output pattern example of the drive potential.

FIG. 11 shows an example of the drive waveform of the power supply line DSL, realized by three kinds of timing pulses.

As shown in FIG. 11, the drive potential is fixed to VH during a first non-emission period. The drive potential is fixed to VSS during a second non-emission period. In the emission period, the output of the drive potential VH and the output of the drive potential Vcat whose waveform is shaped into a pulse form are alternately performed depending on the peak luminance level Py, which is sequentially set. FIG. 11 shows an output pattern example when the peak luminance level Py is 25%.

(B-3) Drive Operation Example of Organic EL Panel Module

A drive operation example of the organic EL panel module will be described below based on FIGS. 12A to 12E. FIG.

Figures 12A, 12B, 12C, 12D, 12E:
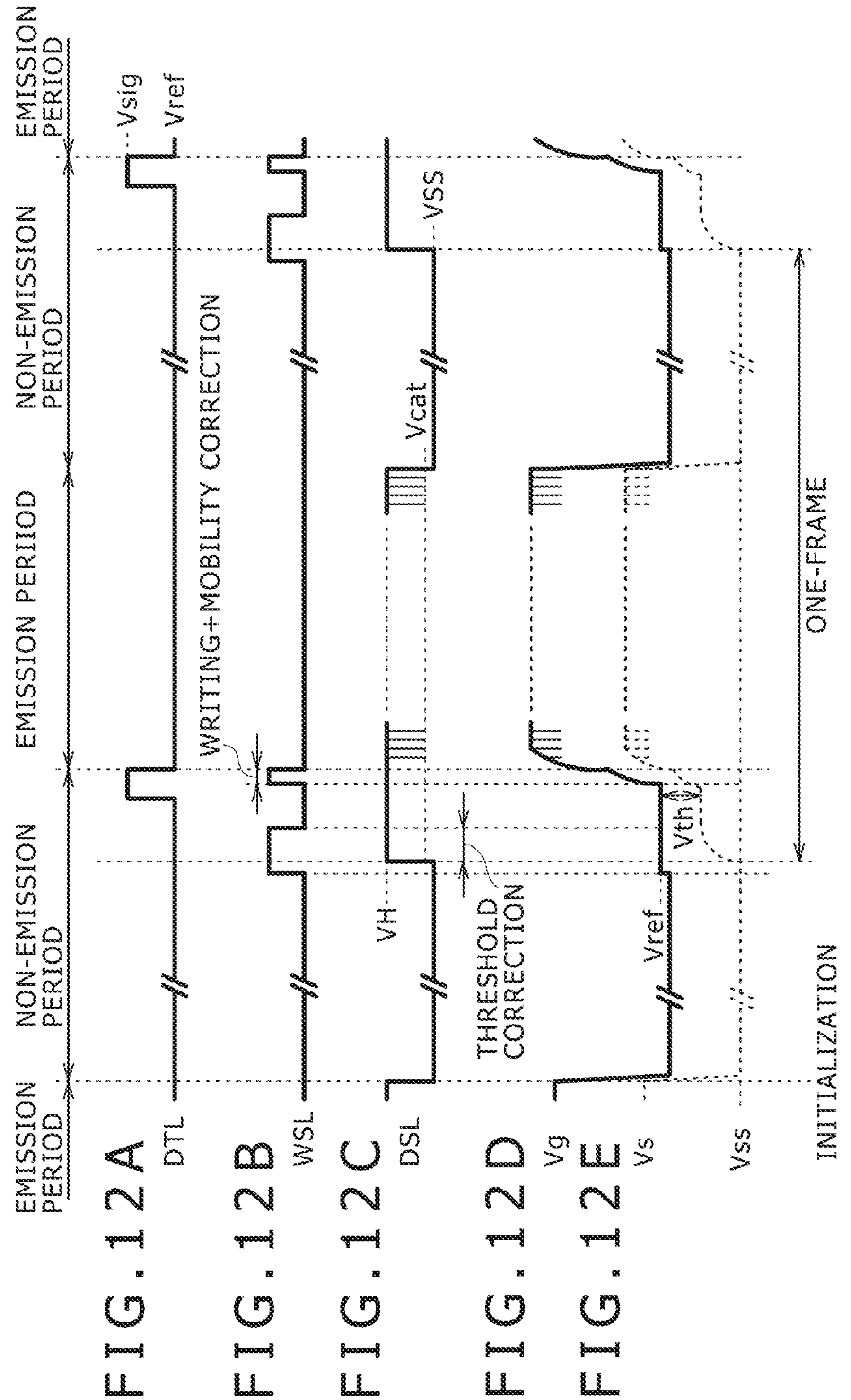
FIGS. 12A to 12E are diagrams for explaining a drive operation example of an organic EL panel module.

12A shows the potential waveform of the signal line DTL. FIG. 12B shows the drive waveform of the write control line WSL. FIG. 12C shows the drive waveform of the power supply line DSL. FIG. 12D shows the potential waveform of the gate potential Vg of the drive transistor N2. FIG. 12E shows the potential waveform of the source potential Vs of the drive transistor N2.

First, initialization operation will be described below. The initialization operation is to initialize the potential held by the hold capacitor Cs. This operation is carried out through switching of the potential of the power supply line DSL from the drive potential VH to the drive potential VSS in the state in which the write control line WSL is at the L level. At this time, due to the lowering of the potential of the power supply line DSL to the drive potential VSS, the source potential Vs of the drive transistor N2 is lowered to the drive potential VSS. Of course, a reverse bias is applied to the organic EL element OLED and thus the emission thereof stops.

At this time, the drive transistor N2 operates in the floating state. Therefore, along with the lowering of the source potential Vs of the drive transistor N2, the potential of the gate electrode (gate potential Vg), which is coupled to the source electrode via the hold capacitor Cs, is also lowered. This operation is the initialization operation.

This operation state is continued until timing immediately before the start of variation correction operation for the threshold voltage Vth of the drive transistor N2 (threshold correction operation).

In this embodiment, the write control line WSL is switched from the L level to the H level immediately before the start of the threshold correction operation as shown in FIG. 12B. Due to the switching of the write control line WSL to the H level, the sampling transistor N1 is turned on, so that the gate potential Vg of the drive transistor N2 is set to the offset potential Vofs. This operation is correction preparatory operation.

Thereafter, the potential of the power supply line DSL is switched from the drive potential VSS to the drive potential VH, and thereby the threshold correction operation is started.

Figure 13:
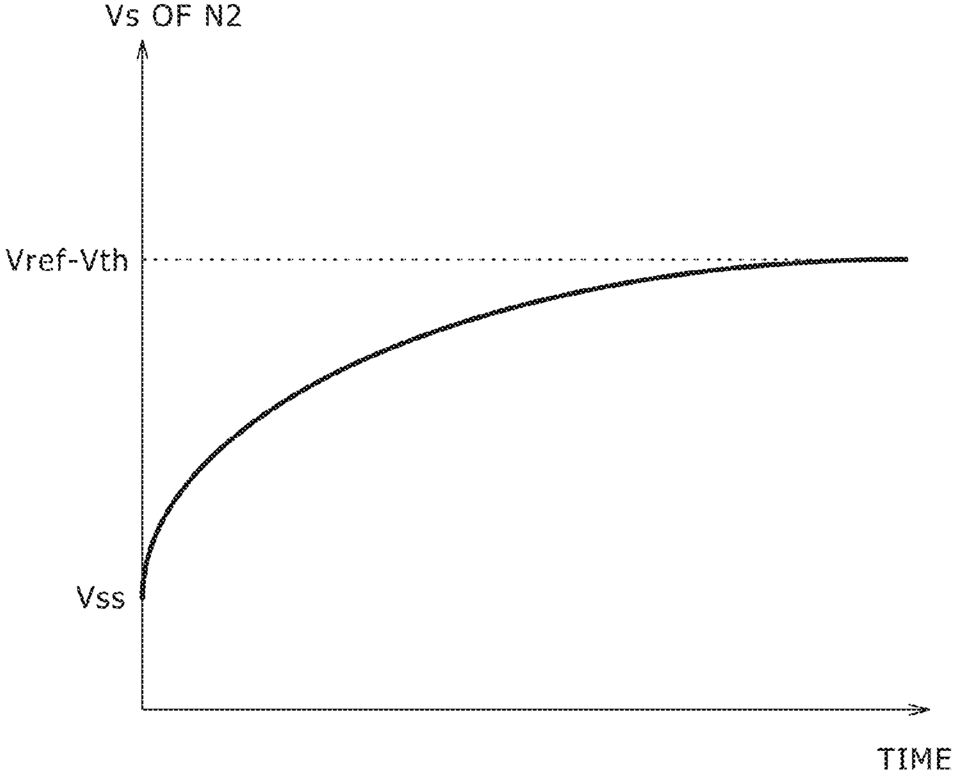
FIG. 13 is a diagram for explaining threshold correction operation.

Upon the start of the threshold correction operation, the drive transistor N2 is turned on and the source potential Vs starts to rise up. On the other hand, the gate potential Vg of the drive transistor N2 is fixed at the offset potential Vofs. Therefore, the gate-source voltage Vgs of the drive transistor N2 gradually decreases. FIG. 13 shows enlargement of the potential change of the source potential Vs of the drive transistor N2 in the threshold correction operation.

As shown in FIG. 13, the rise of the source potential Vs of the drive transistor N2 automatically stops at the timing when the gate-source voltage Vgs of the drive transistor N2 reaches the threshold voltage Vth. This operation is the threshold correction operation, by which variation in the threshold voltage Vth of the drive transistor N2 is cancelled. The potential of the write control line WSL is switched from the H level to the L level at the timing set also in consideration of variation in the time necessary for the threshold correction operation.

Thereafter, the potential of the signal line DTL is switched to the signal potential Vsig. Of course, the signal potential Vsig is the potential corresponding to the pixel grayscale of the sub-pixel 23 as the writing target. The application of the signal potential Vsig to the signal line DTL is carried out before the switching of the write control line WSL to the H level. The purpose thereof is to start the writing in the state in which the potential of the signal line DTL has been shifted to the signal potential Vsig.

As described above, the write control line WSL is switched to the H level in the state in which the signal potential Vsig is applied to the signal line DTL and the drive potential VH is applied to the power supply line DSL, so that the writing of the signal potential Vsig is started.

Along with the writing of the signal potential Vsig, the gate potential Vg of the drive transistor N2 rises up, so that the drive transistor N2 is turned on.

Upon the turning-on of the drive transistor N2, a current having the amplitude dependent on Vgs−Vth is drawn from the power supply line DSL and charges the capacitive component parasitic to the organic EL element OLED. Due to the charge of the parasitic capacitor, the anode potential of the organic EL element OLED (the source potential Vs of the drive transistor N2) rises up. However, the organic EL element OLED does not emit light unless the anode potential of the organic EL element OLED becomes higher than the cathode potential by its threshold voltage Vth(oled) or higher.

Figure 14:
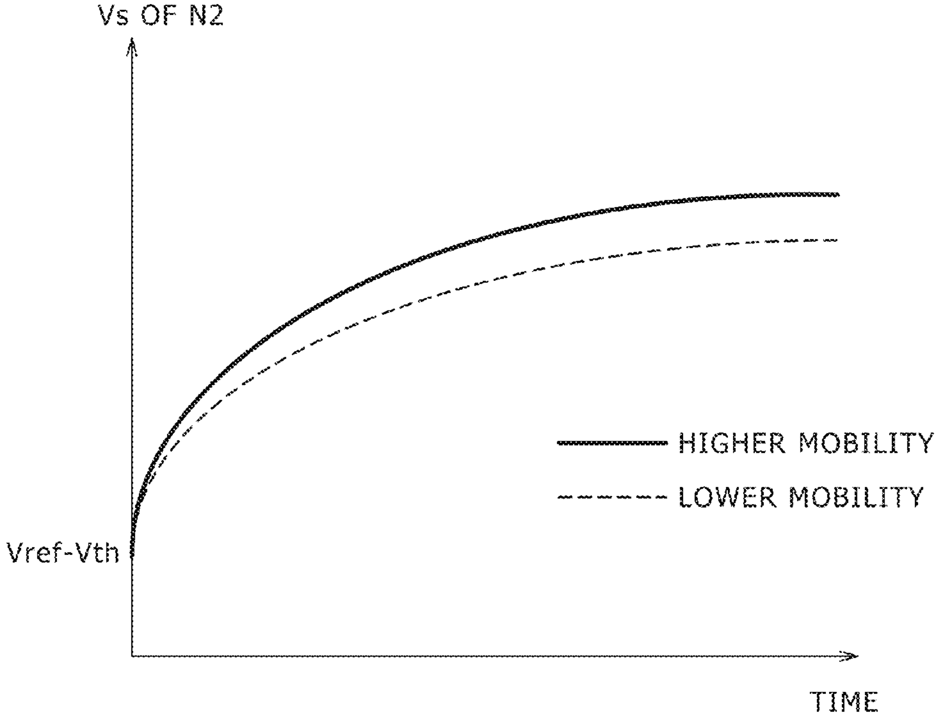
FIG. 14 is a diagram for explaining mobility correction operation.

The current flowing at the time depends on the mobility μ of the drive transistor N2. FIG. 14 shows difference in the rising speed of the source potential Vs due to difference in the mobility μ. As shown in FIG. 14, when the mobility μ is higher, the amount of the current flowing to the drive transistor N2 is larger and the source potential Vs rises up faster. This means that, even when the same signal potential Vsig is applied, the gate-source voltage Vgs of the drive transistor N2 having higher mobility μ becomes lower than the gate-source voltage Vgs of the drive transistor N2 having relatively lower mobility μ.

That is, the amount of the current flowing to the drive transistor N2 having higher mobility μ becomes smaller than the amount of the current flowing to the drive transistor N2 having relatively lower mobility μ. As a result, correction is so carried out that a current having the same magnitude flows to the organic EL element OLED if the signal potential Vsig is the same irrespective of variation in the mobility μ. This operation is mobility correction operation.

At the timing of the completion of the mobility correction operation, the anode potential of the organic EL element OLED has become higher than the cathode potential by the threshold voltage Vth(oled) or higher and the organic EL element OLED is turned on. This turning-on starts the emission of the organic EL element OLED.

After the end of the writing of the signal potential Vsig, the sampling transistor N1 is turned off, so that the drive transistor N2 operates in the floating state. Therefore, along with the rise of the anode potential due to the turning-on of the organic EL element OLED, the gate potential Vg of the drive transistor N2 also rises up due to bootstrap operation.

After this, blinking operation by the application of the drive potentials VH and Vcat is carried out with the output pattern set depending on the peak luminance level Py, except for the case of the maximum luminance.

(B-4) Summary

As described above, in this embodiment, the peak luminance level can be controlled through variable control of the number of times (zero to 25 times) of the output of the drive potential Vcat whose waveform is shaped into a pulse form. In this control, any processing is not executed for the image data. Therefore, the displaying performance of the grayscale representation is not deteriorated in the control of the peak luminance level.

Furthermore, in this embodiment, the period length from the start of the emission period to the end thereof is fixed. That is, although the peak luminance level is varied, the ratio of the range of the emission period to the range of the non-emission period (non-emission period 1 and non-emission period 2) is fixed. This can prevent great change in the moving image displaying performance and the flicker suppression performance due to the variable control of the peak luminance level.

Moreover, in this embodiment, the output timings of the drive potential Vcat are uniformly disposed in the emission period. Therefore, only the peak luminance level can be adjusted in such a way that the luminance distribution in the emission period is kept uniform.

(C) Second Embodiment

A second embodiment of the present invention will be described below. This embodiment relates to a scheme in which the emission mode suitable for displaying of the input image data Din is determined and the output timings of the drive potential Vcat in the emission period are unevenly distributed based on the determination result.

(C-1) System Configuration Example

Figure 15:
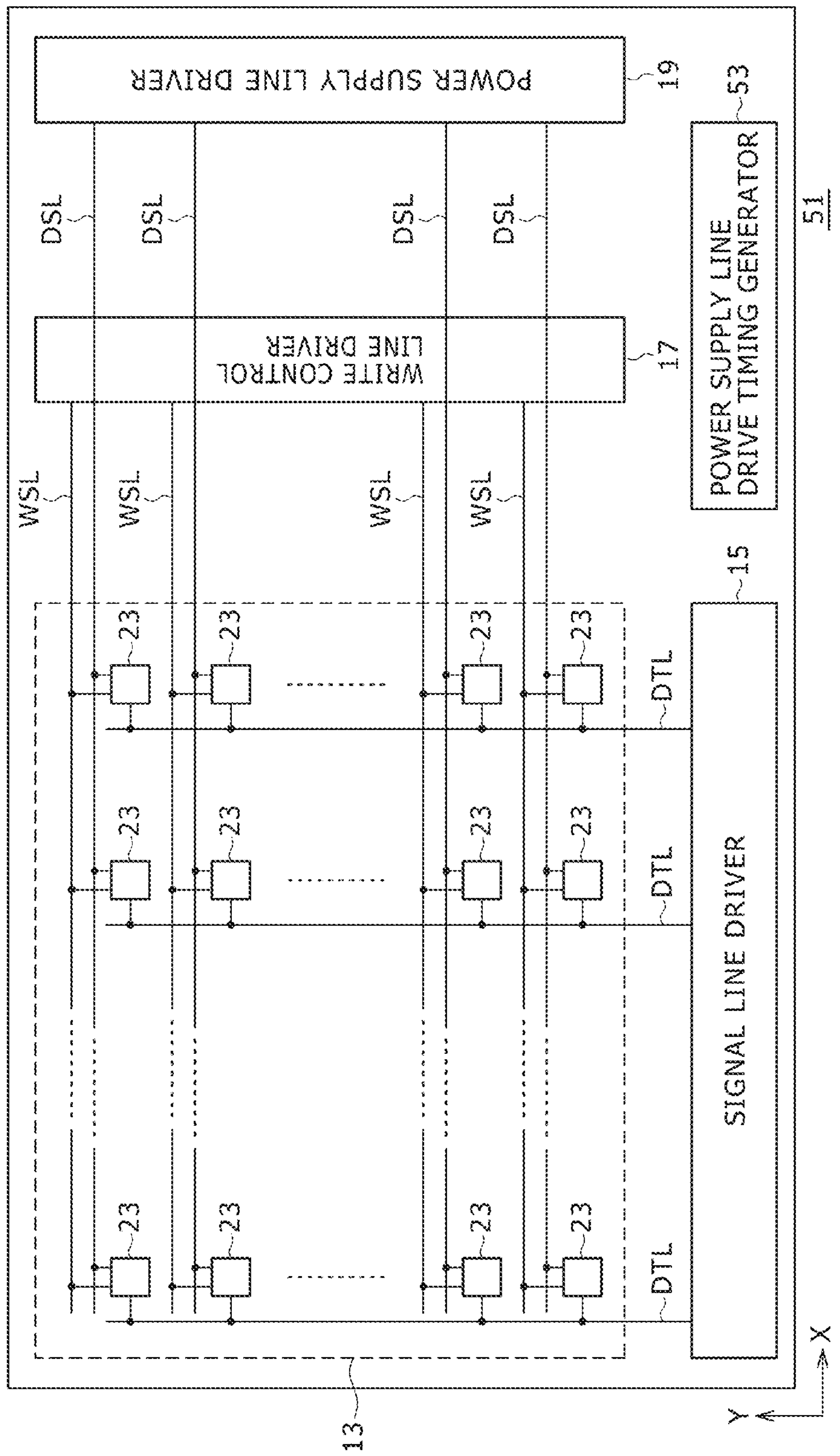
FIG. 15 is a diagram showing a configuration example of an organic EL panel module.

FIG. 15 shows a system configuration example of an organic EL panel module 51 according to this embodiment. In FIG. 15, the same parts as those in FIG. 4 are given the same numerals and symbols.

The organic EL panel module 51 has a configuration obtained by disposing, on a glass substrate, a pixel array section 13, a signal line driver 15, a write control line driver 17, a power supply line driver 19, and a power supply line drive timing generator 53.

In the following, only the power supply line drive timing generator 53, which is a novel unit in this embodiment, will be described below.

Figure 16:
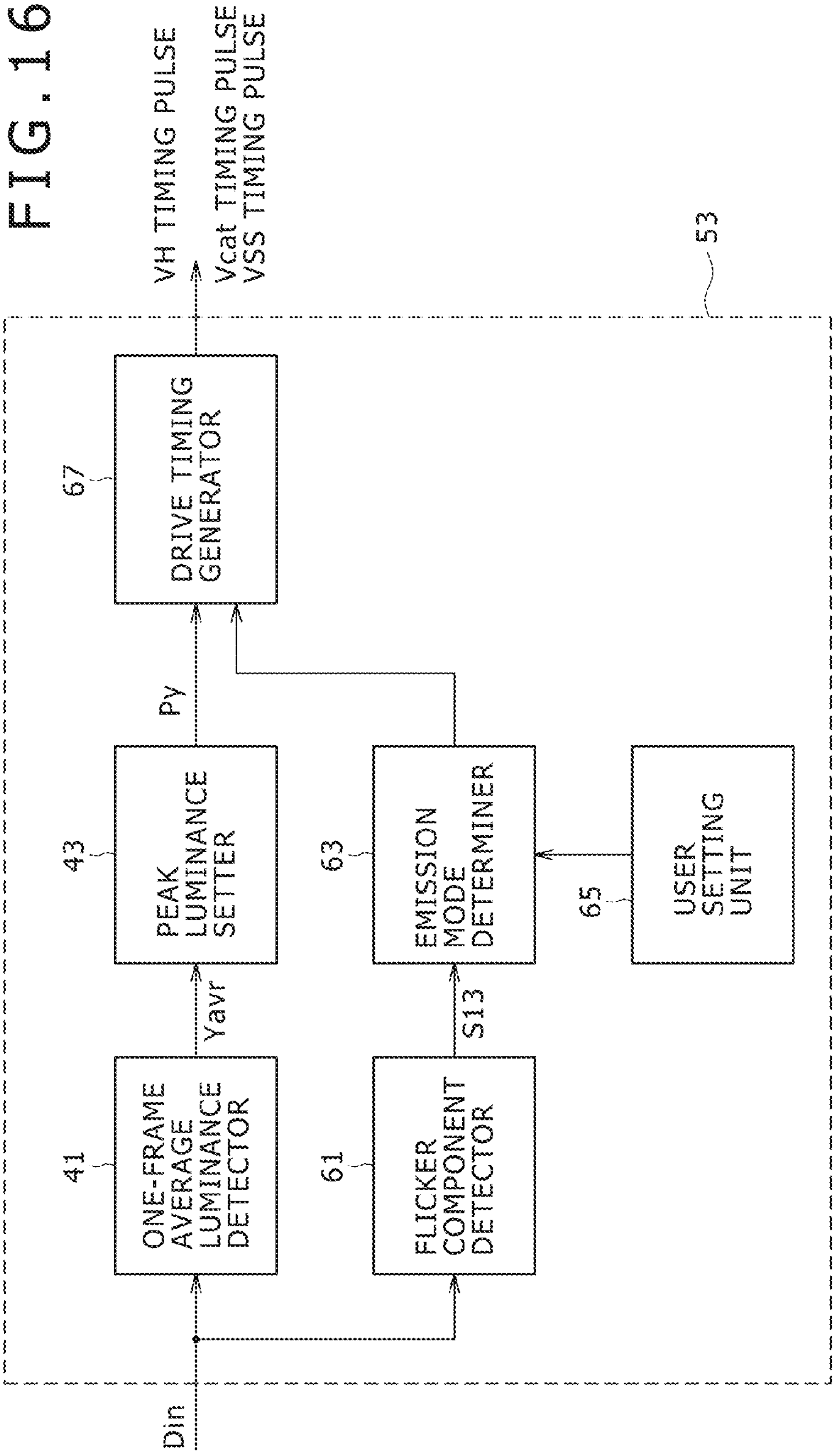
FIG. 16 is a diagram for explaining an internal configuration example of a power supply line drive timing generator.

(C-2) Configuration of Power Supply Line Drive Timing Generator (a) Entire Configuration FIG. 16 shows a circuit configuration example of the power supply line drive timing generator 53. The power supply line drive timing generator 53 includes a one-frame average luminance detector 41, a peak luminance setter 43, a flicker component detector 61, an emission mode determiner 63, a user setting unit 65, and a drive timing generator 67.

The configurations of the functional blocks that are novel in this embodiment will be described below.

(b) Flicker Component Detector

The flicker component detector 61 is a circuit device that detects a moving image component and a flicker component included in an input image based on input image data Din. For the detection of the moving image component, e.g. a method of using the average value of motion vectors with respect to the previous frame or a method of using the ratio of still pixels to one frame is employed.

Figure 17:
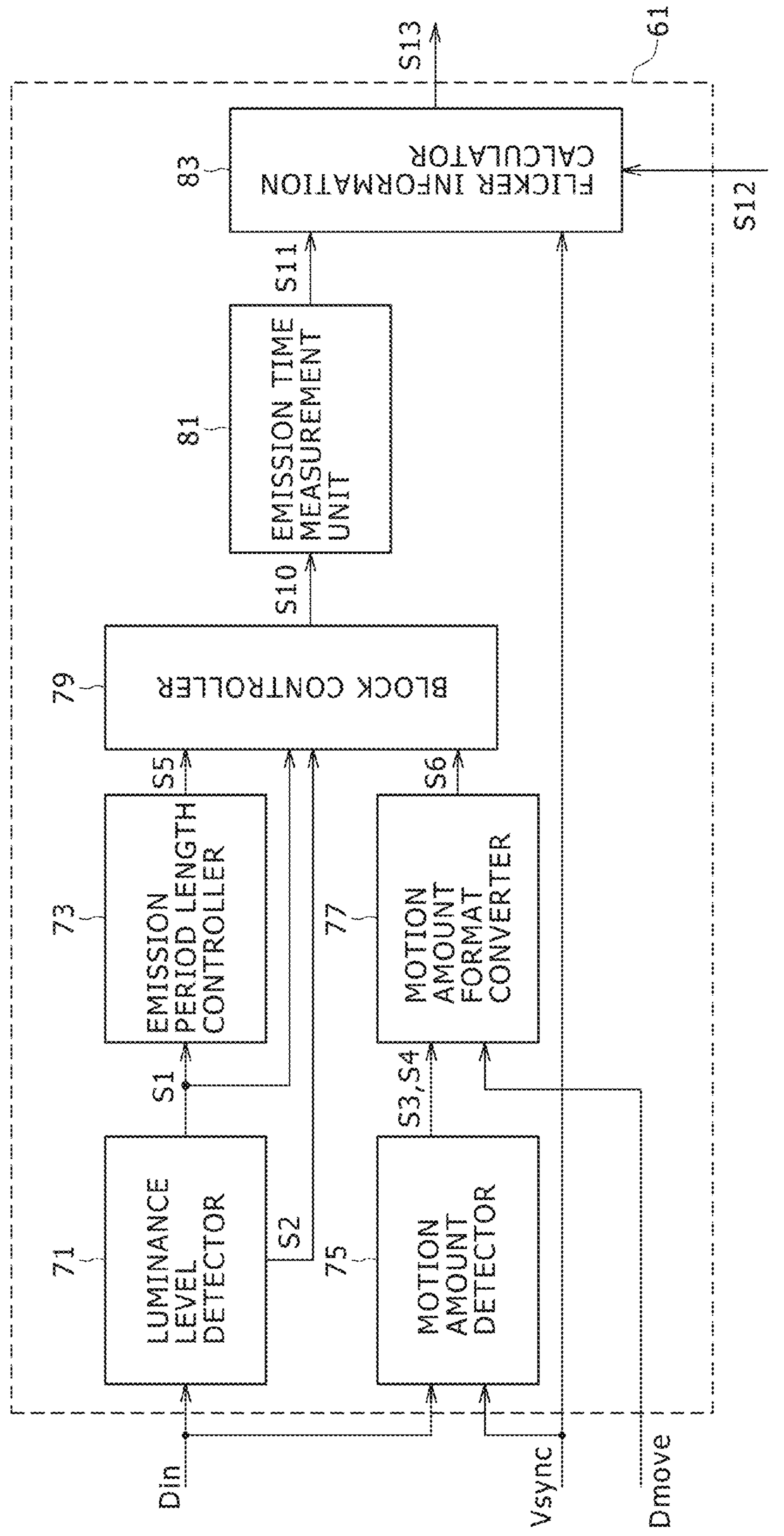
FIG. 17 is a diagram showing an internal configuration example of a flicker component detector.

For the detection of the flicker component, a method of quantifying e.g. the following conditions is employed.

frame rate emission time length in one frame motion amount time of continuous appearance of region in which average luminance level is 50% or higher FIG. 17 shows an internal configuration example of the flicker component detector 61. The flicker component detector 61 includes a luminance level detector 71, an emission period length controller 73, a motion amount detector 75, a motion amount format converter 77, a block controller 79, an emission time measurement unit 81, and a flicker information calculator 83.

(1) Luminance Level Detector

The luminance level detector 71 is a circuit device that calculates the average luminance level of the input image data Din corresponding to all of the pixels included in the one-frame screen.

(2) Emission Period Length Controller

The emission period length controller 73 is a circuit device that variably controls the emission period length in a one-frame period based on the average luminance level S1 of the entire one-frame screen. Specifically, the higher the average luminance level S1 is, the shorter the emission period length is set. In contrast, the lower the average luminance level S1 is, the longer the emission period length is set. An emission period length S5 to be used is supplied to the block controller 79.

(3) Motion Amount Detector

The motion amount detector 75 is a circuit device that detects the motion amount of each pixel based on the input image data Din.

Figure 18:
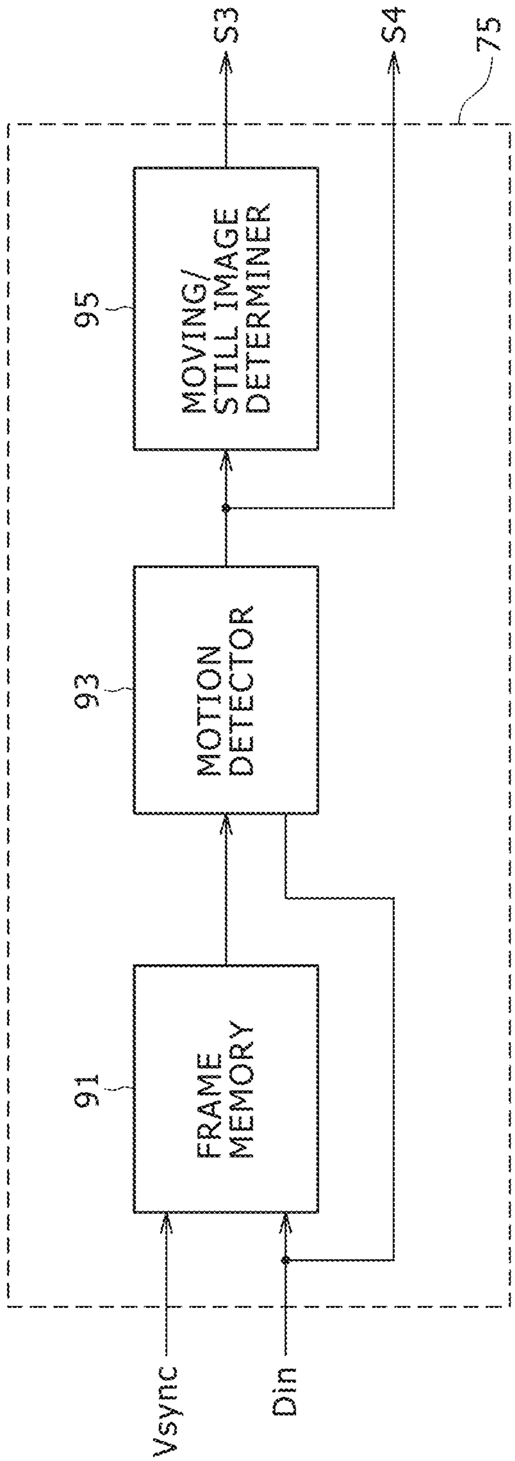
FIG. 18 is a diagram showing an internal configuration example of a motion amount detector.

FIG. 18 shows an internal configuration example of the motion amount detector 75. The motion amount detector 75 includes a frame memory 91, a motion detector 93, and a moving/still image determiner 95.

In this embodiment, the frame memory 91 has memory areas for two frames. For the memory areas, writing and reading are interchanged by a vertical synchronization signal Vsync. Specifically, during writing of the input image data Din to one memory area, the input image data Din of the previous frame is read out from the other memory area.

The motion detector 93 is a circuit device that detects a motion amount S4 represented as the number of pixels.

The moving/still image determiner 95 is a circuit device that determines whether the input image is a moving image or a still image based on the detected motion amount S4 and outputs a determination result S3.

Basically, an image whose motion amount is zero is regarded as a still image by the moving/still image determiner 95. However, an image whose motion amount is very small is also regarded as a still image in some cases. As the threshold value for this determination, a design value set also in consideration of experience and so on is used.

Although the motion amount is detected through comparison between images of two frames in this embodiment, it is also possible to use another motion detection technique that is currently available.

For example, the following techniques can also be used: a motion detection technique with use of a comb filter, a motion detection technique used in an MPEG decoder, and a motion detection technique used in interlace/progressive conversion processing. Furthermore, it is also possible to use the detection result by any of these motion detection functions incorporated in the organic EL panel module 51. In FIG. 17, this kind of motion amount supplied from the external is represented as Dmove.

Figure 19:
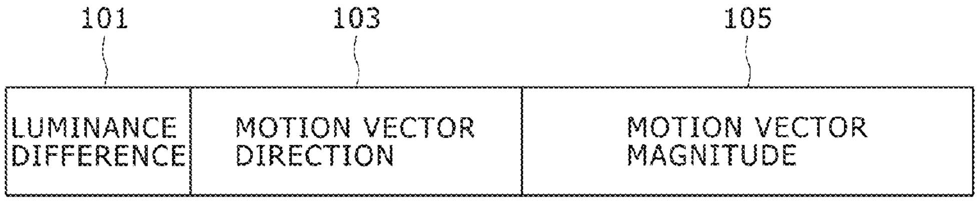
FIG. 19 is a diagram for explaining a data structure example of the motion amount.

For reference, FIG. 19 shows a data example of the motion amount Dmove supplied from an MPEG decoder. By the motion detector disposed externally, not only the mere motion amount but also the direction thereof and the luminance difference are detected. Therefore, as shown in FIG. 19, the motion amount Dmove is so given that a luminance difference 101, a motion vector direction 103, and a motion vector magnitude 105 are combined into one group.

(4) Motion Amount Format Converter

The motion amount format converter 77 is a circuit device for format conversion from the motion amount S4 or Dmove, which is given as the number of pixels basically, into a numeric value for calculation (referred to as "motion value,"

in this embodiment). This motion value is one of the parameters used to adjust the block area for flicker determination in the block controller 79. In general, flicker is less visible in a screen with larger motion. Therefore, when the motion amount is larger, a larger value is allocated to the motion value.

FIG. 20 shows an example of a table in which the correspondence relationship between the motion amount and the motion value is recorded. In the example of FIG. 20, the stages of the motion amount S4 are six stages of 0, 1, 2, 3, 4, and 5 or larger. In the example of FIG. 20, a motion value of "1.0" is allocated to a pixel whose motion amount is zero (i.e. still image). Furthermore, to a pixel whose motion amount is not zero (i.e. moving image), the motion value increased in proportion to the motion amount is allocated. However, if the motion value is increased without limit, a problem could occur in the flicker determination, which is the original purpose. Therefore, in the example of FIG. 20, the increase in the motion value is limited to "1.5" although the motion amount is 5 or larger.

Specifically, the motion value becomes larger by "0.1" if the motion amount becomes larger by one pixel. This correspondence relationship acts to increase the area by 10% of the reference area (the area when the motion amount is zero) in response to the increase in the motion amount by one pixel.

As described above, if the motion amount is given as Dmove from the external, the motion vector magnitude is converted to the number of pixels and thereafter converted to the motion value. Of course, FIG. 20 is one example and the number of stages of the motion amount and the corresponding change width are also any.

(5) Block Controller

The block controller 79 is a circuit device that decides the number, position, and area of block regions to be used in the flicker determination processing.

Figure 21:
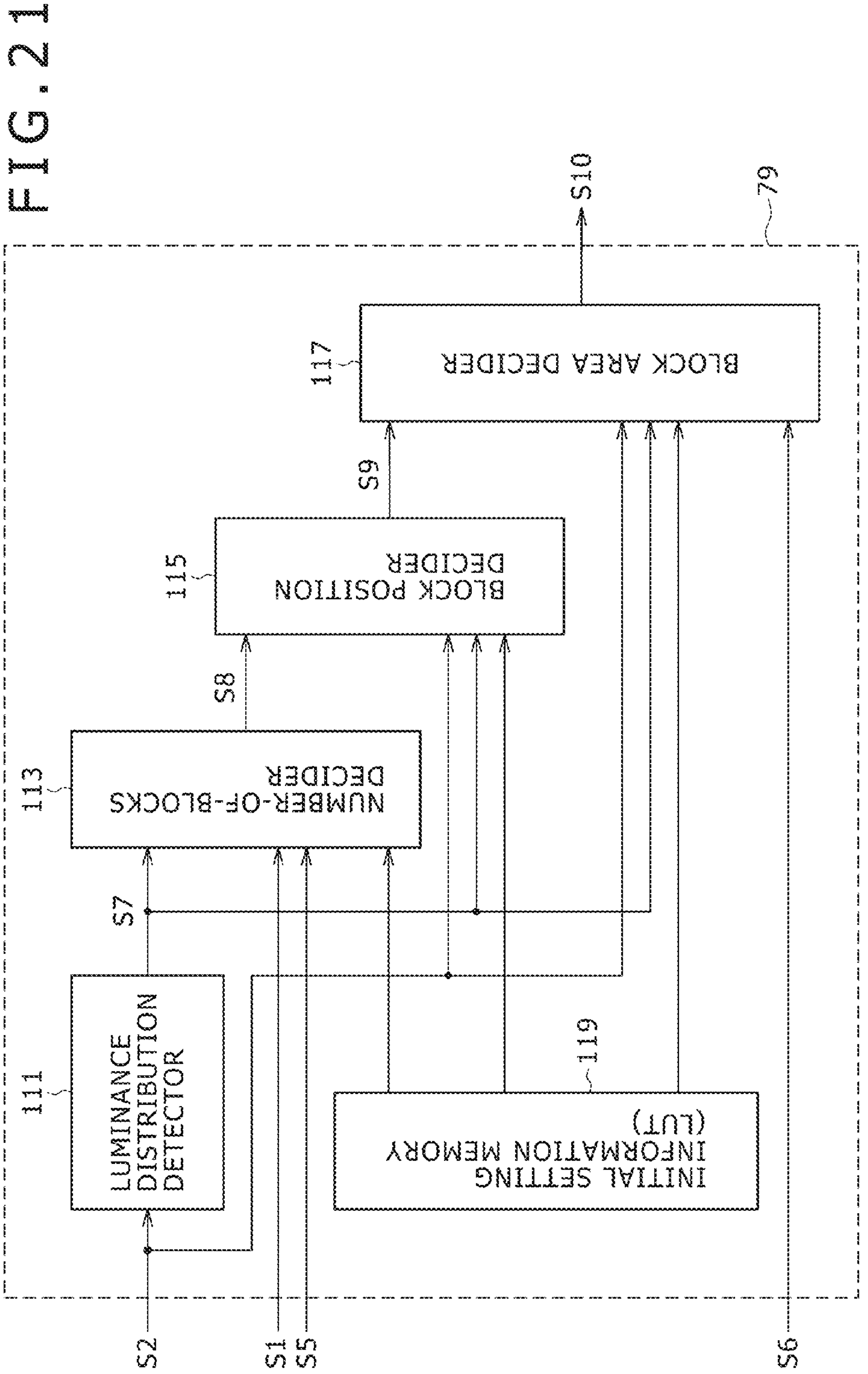
FIG. 21 is a diagram showing an internal configuration example of a block controller.

FIG. 21 shows an internal configuration example of the block controller 79. The block controller 79 includes a luminance distribution detector 111, a number-of-blocks decider 113, a block position decider 115, a block area decider 117, and an initial setting information memory 119.

The luminance distribution detector 111 is a circuit device that detects a region having a high luminance level based on a luminance level S2 obtained on a pixel-by-pixel basis. The luminance distribution detector 111 uses e.g. 50% of the luminance level as the determination threshold value (the maximum grayscale value is defined as 100%), and outputs the result of comparison with the respective luminance levels S2 as luminance distribution information S7. In this embodiment, a pixel whose luminance level is higher than the determination threshold value is represented by "1," and a pixel whose luminance level is lower than the determination threshold value is represented by "0."

The reason why 50% of the luminance level is used as the threshold value in this embodiment is that flicker is more visible in a brighter region. Of course, this condition is one example, and flicker is not visually recognized unless other conditions are also satisfied as described later.

By obtaining the luminance distribution information S7 in advance, the calculation amount necessary in the respective processing units at subsequent stages can be reduced.

The determination result is supplied as the luminance distribution information S7 to the number-of-blocks decider 113, the block position decider 115, and the block area decider 117. The number of pixels is large in a display device having high resolution. Therefore, a method may be employed in which the luminance distribution information S7 is held on a memory such as a RAM and the respective processing units at subsequent stages access the memory.

The number-of-blocks decider 113 is a circuit device that decides the number of blocks to be used in the flicker determination processing. The decision processing therein is executed at two stages.

In the processing of the first stage, it is determined whether the flicker component included in the input image is "scattered" or "concentrated" in the screen, based on the average luminance level S1 of the entire screen and the emission period length S5.

In this embodiment, the number-of-blocks decider 113 determines that the flicker component is the "scattered type" if the following two conditions are simultaneously satisfied, and determines that the flicker component is the "concentrated type" if not.

- the average luminance level S1 of the entire screen is 50% or higher (the maximum grayscale value is defined as 100%)
- the emission period length S5 is 60% of the one-frame period or shorter (the one-frame period is defined as 100%)

In this embodiment, the emission period length is set in the range of 25% to 50%. Therefore, the second condition is satisfied absolutely.

If it is determined that the flicker component is the "scattered type," the number-of-blocks decider 113 sets the number of blocks S8 to "1." On the other hand, if it is determined that the flicker component is the "concentrated type," the number-of-blocks decider 113 decides the number of blocks S8 through the processing of the second stage.

In the processing of the second stage, the number of blocks suitable for the input screen is decided based on the luminance distribution information S7 and initial setting information (number, position, area) on the determination blocks, prepared in advance.

Figure 22:
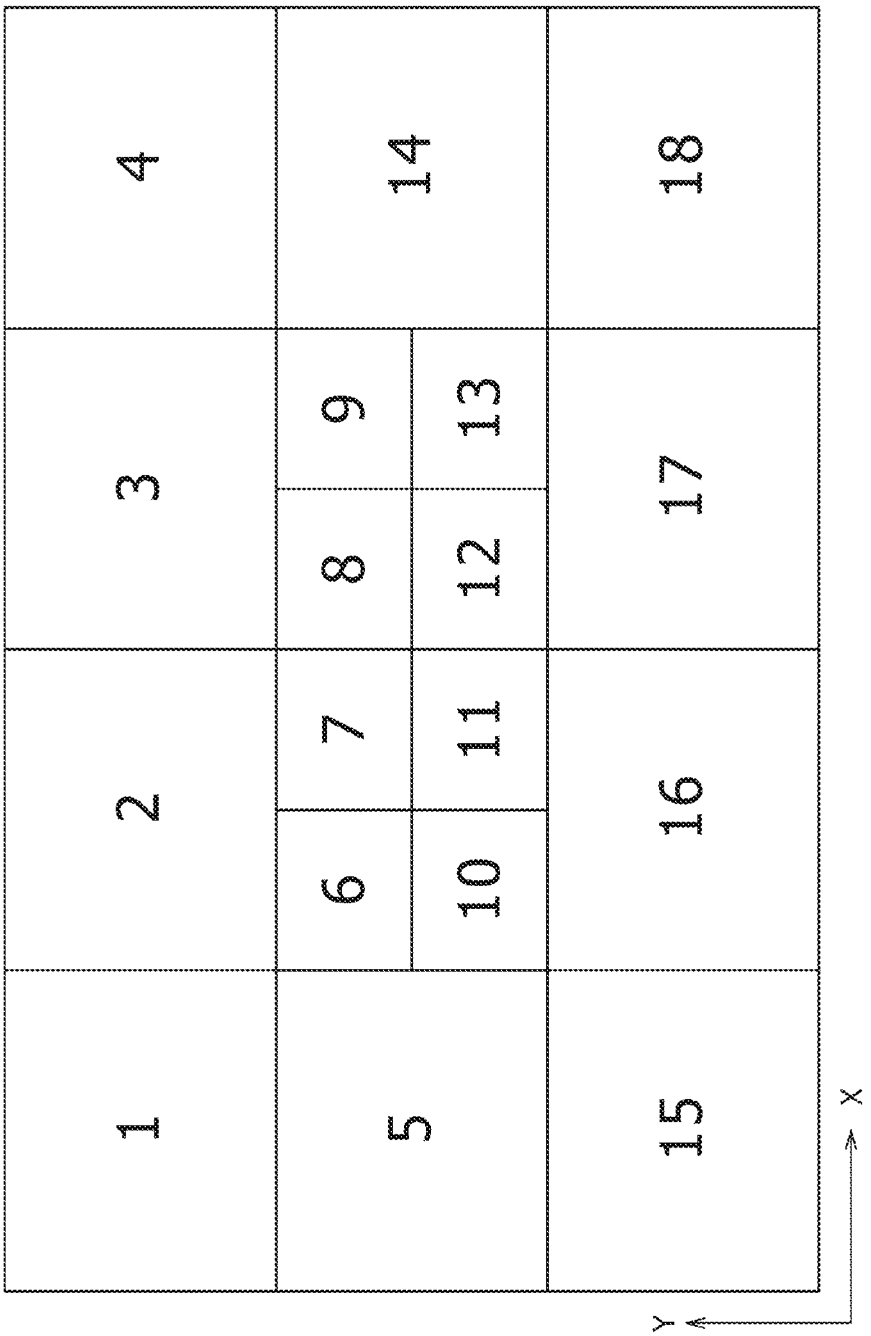
FIG. 22 is a diagram showing an initial setting example of determination blocks.

FIG. 22 shows an initial setting example of the determination blocks. As described above, for recognition of the flicker component, the block region is required to have an area equal to or larger than 10% of the entire screen. Therefore, the block area in the initial setting is set at most in the range of 5% to 10% of the entire screen. Furthermore, flicker is more visible in the vicinity of the screen center than in the periphery of the screen. Therefore, in the initial setting, the area of the block near the center is set to one-fourth of that of the block in the peripheral region. In FIG. 22, the blocks corresponding to numbers "6" to "13" have the one-fourth area.

For the input image whose flicker component is regarded as the "concentrated type," the number-of-blocks decider 113 allocates the corresponding luminance distribution information S7 to each of the block regions (FIG. 22) prepared in the initial setting information memory 119, and determines whether or not the average luminance level of each block region is at least 50% of the grayscale luminance. In this embodiment, based on the luminance distribution information S7 corresponding to the block region, the number of pixels with which it is determined that the average luminance level surpasses 50% of the grayscale luminance (value "1") is compared with the number of pixels with which it is determined that the average luminance level is lower than 50% of the grayscale luminance (value "0"). Depending on which number is larger, it is determined whether or not the average luminance level of the block region is at least 50%.

For example, if it is determined that the average luminance level of a certain block region is lower than 50% of the grayscale luminance (the number of pixels of the value "0">the number of pixels of the value "1"), the number-of-blocks decider 113 counts this block region as one block region or counts it together with plural adjacent block regions as one block region. For example, blocks that have been already segmented like the blocks near the center are counted as one block region in such a way that the area of this one block region does not surpass 10% of the entire screen, on condition that the same determination result is obtained from the adjacent block regions.

Figure 23:
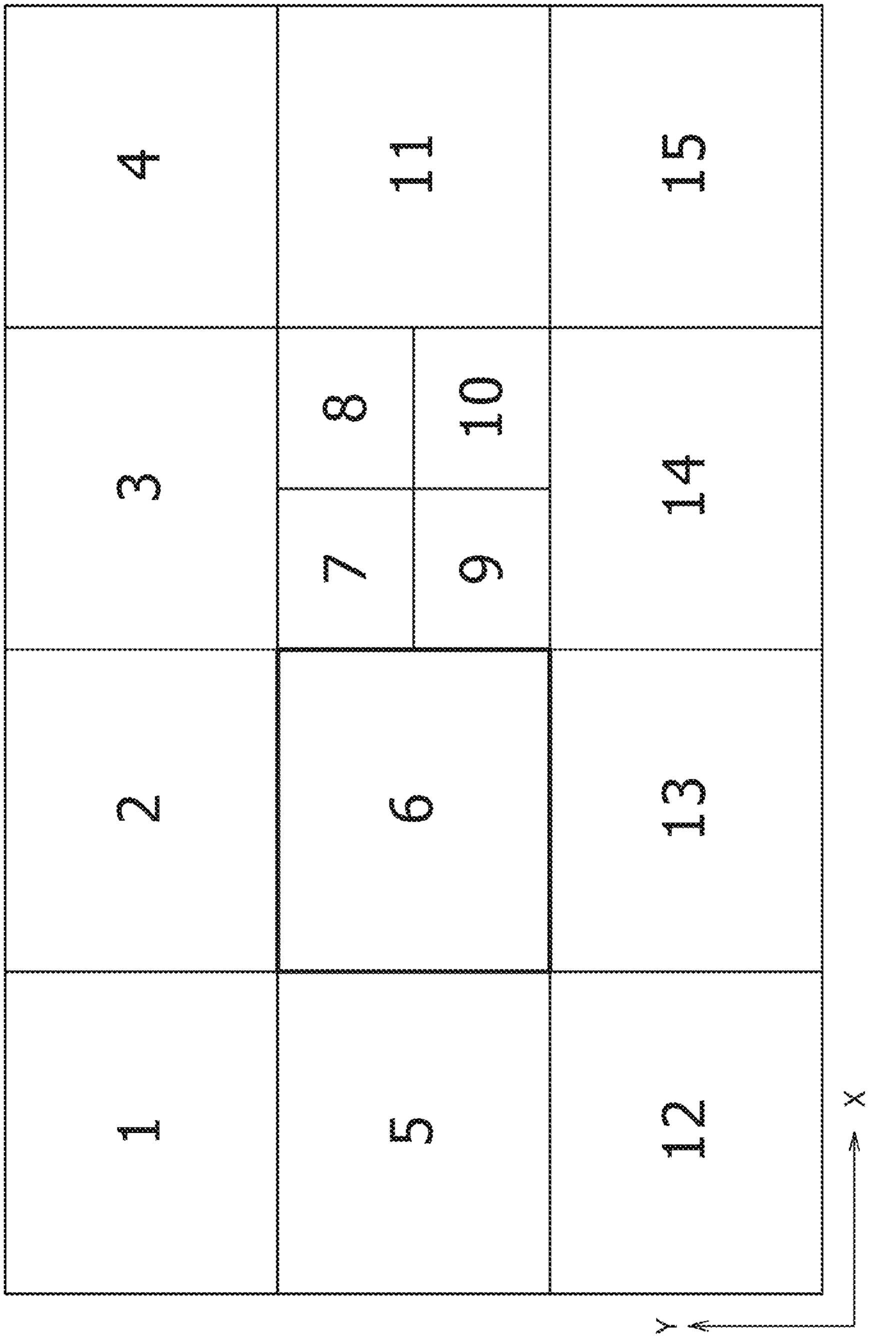
FIG. 23 is a diagram for explaining operation of the coalescence of block regions.

FIG. 23 shows an example of the image resulting from the block coalescence. Specifically, FIG. 23 shows the state in which the average luminance level of each of the blocks “6,” “7,” “10,” and “11” in FIG. 22 is equal to or lower than the threshold value and therefore these four blocks are treated as one block. In this case, the number of block regions for the determination is changed from 18, in the initial state, to 15.

On the other hand, if it is determined that the average luminance level of a certain block region is equal to or higher than 50% of the grayscale luminance (the number of pixels of the value “0”<the number of pixels of the value “1”), the number-of-blocks decider 113 decides the number of blocks into which this block region is segmented in consideration of the initial state of this block region and the position thereof (whether the position is in the vicinity of the center or in the peripheral region). For example, the block in the peripheral part is divided into two or more blocks.

Figure 24:
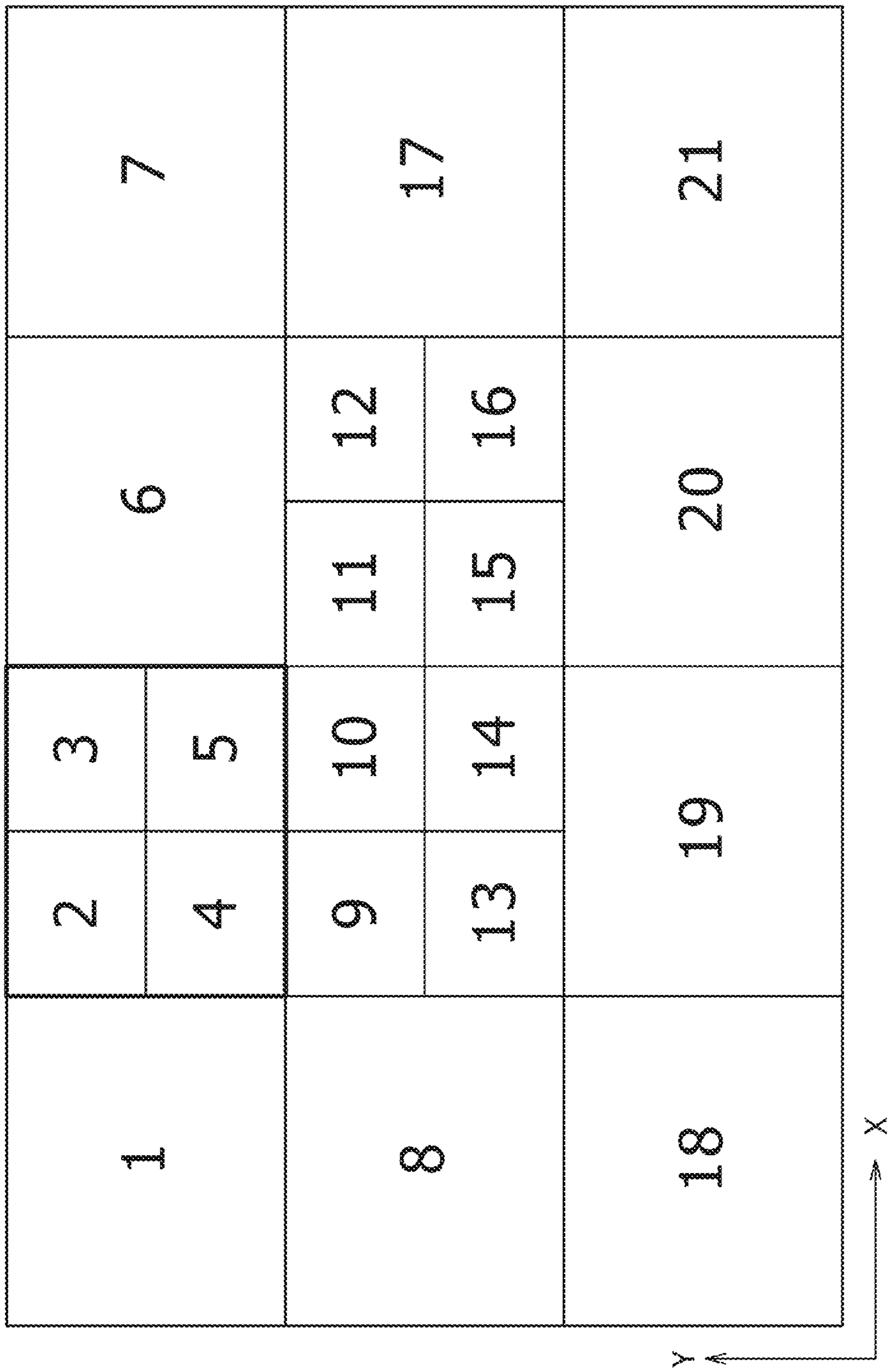
FIG. 24 is a diagram for explaining operation of division of block regions.

FIG. 24 shows an example of the image resulting from the block division. Specifically, FIG. 24 shows the state in which the average luminance level of the block “2” in FIG. 22 is equal to or higher than the threshold value and therefore this block is divided into four block regions. In this case, the number of block regions for the determination is changed from 18, in the initial state, to 21.

The number of blocks S8 decided through this processing is given to the block position decider 115. The smaller the area of the block region is, the higher the flicker determination accuracy is. However, if the number of block regions is too large, the necessary calculation amount is also too much. Therefore, it is desirable to limit the number of block regions to an appropriate number.

The block position decider 115 executes processing of deciding position information S9 on the respective blocks based on the luminance distribution information S7, the number of blocks S8, and the initial setting information (position) on the determination blocks, prepared in advance.

If the number of block regions is one (if the flicker component is the “scattered type”), the entire screen is treated as one block. Therefore, the block position decider 115 does not need to individually decide the position information S9 on the block region. In this case, the block position decider 115 outputs one predefined reference position as the position information S9.

On the other hand, if plural block regions are decided (if the flicker component is the “concentrated type”), the block position decider 115 refers to the luminance distribution information S7 and decides the position information S9 in such a way that a large number of block regions are allocated to a region including a large number of pixels having a high luminance level.

However, at this timing, only the number of blocks has been decided but the area of each block has not yet been decided.

Therefore, with reference to the initial setting information, the coordinates of the origin of the block (e.g. the coordinates of the upper right corner of the block), the coordinates of the center of the block, or the like is given as XY coordinates. For example, for a region having a low luminance level, the position information on the block region defined in the initial setting information is used as it is. For a region having a high luminance level, the position information S9 is so decided that the block region defined in the initial setting information is divided similarly to in the number-of-blocks decider 113.

The block area decider 117 is a circuit device that decides the area of the corresponding block based on a motion value S6 and the luminance distribution information S7. The block area decider 117 outputs a block area S10 that is sequentially calculated to the emission time measurement unit 81.

If the number of pieces of the supplied position information S9 is one (if the flicker component is the “scattered type”), the area does not need to be obtained because the entire screen is one block region.

On the other hand, if plural pieces of the position information S9 are given (if the flicker component is the “concentrated type”), the block area decider 117 calculates the area of each of the blocks corresponding to the position information S9 based on the following equation.

$$\text{block area}=(\text{area equal to 10\% of the entire display region})\times\text{luminance level value}\times\text{motion value} \quad \text{(Equation 1)}$$

The luminance level value in this equation is one of the parameters used for adjustment of the block area. The luminance level value is given as the average luminance level of all of the pixels included in the block region whose position is decided based on the position information S9 (the block region having the area equal to 10% of the entire display region).

The shape of the block region whose position is decided may be a square or may be a shape having the same aspect ratio as that of the screen. In this embodiment, a method in which the block region has the same aspect ratio as that of the screen is employed.

The average luminance level is calculated as the average value of the luminance levels S2 of all of the pixels included in each block region.

FIG. 25 shows an example of the correspondence table between the luminance level and the luminance level value. In general, when the luminance level is higher, flicker is perceived more readily. Therefore, in this embodiment, a smaller luminance level value is allocated to a block region having a higher luminance level so that the area of this block region may be decreased to a larger extent. By decreasing the area of a block region disposed in a high luminance region, the accuracy of detection of the area of the high luminance region becomes higher and the accuracy of flicker detection becomes higher.

In the example of FIG. 25, the following six stages are prepared for the luminance level: 50% to 55%, 55% to 60%, 60% to 65%, 65% to 70%, 70% to 75%, and 75% or higher.

In the example of FIG. 25, a luminance level value of “1.0” is allocated to a block whose luminance level is at the stage of 50% to 55%. Furthermore, the luminance level value is decreased in response to the increment of the luminance level by one stage in the example of FIG. 25. Specifically, the luminance level value is decreased by “0.1” in response to the increment of the luminance level by one stage. This correspondence relationship means that the area of the block region is decreased by 10% of the reference area (the area when the luminance level is at the stage of 50% to 55%) in response to the increment of the luminance level by one stage.

Figure 26:
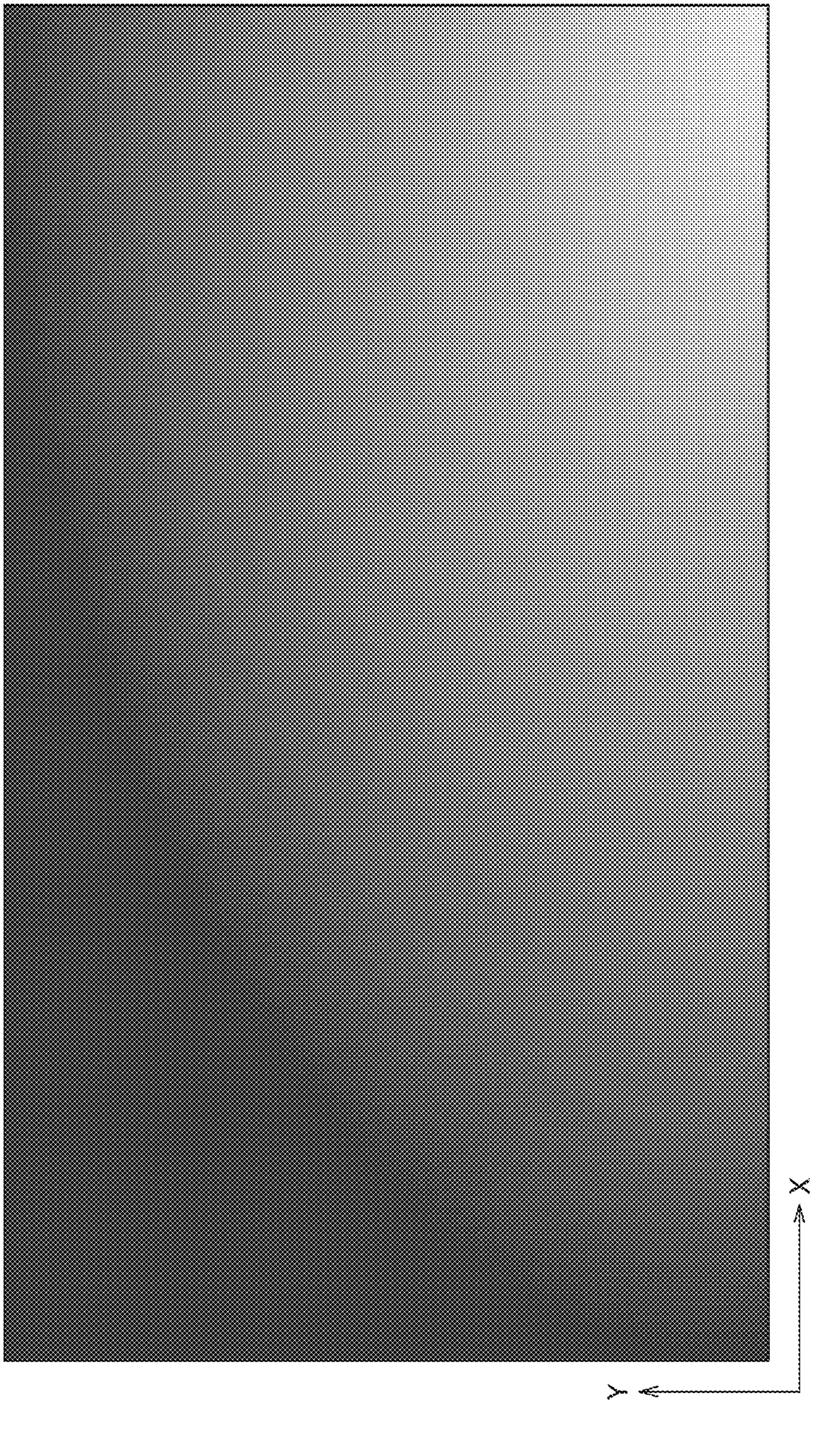
FIG. 26 is a diagram showing an input image example.
Figure 27:
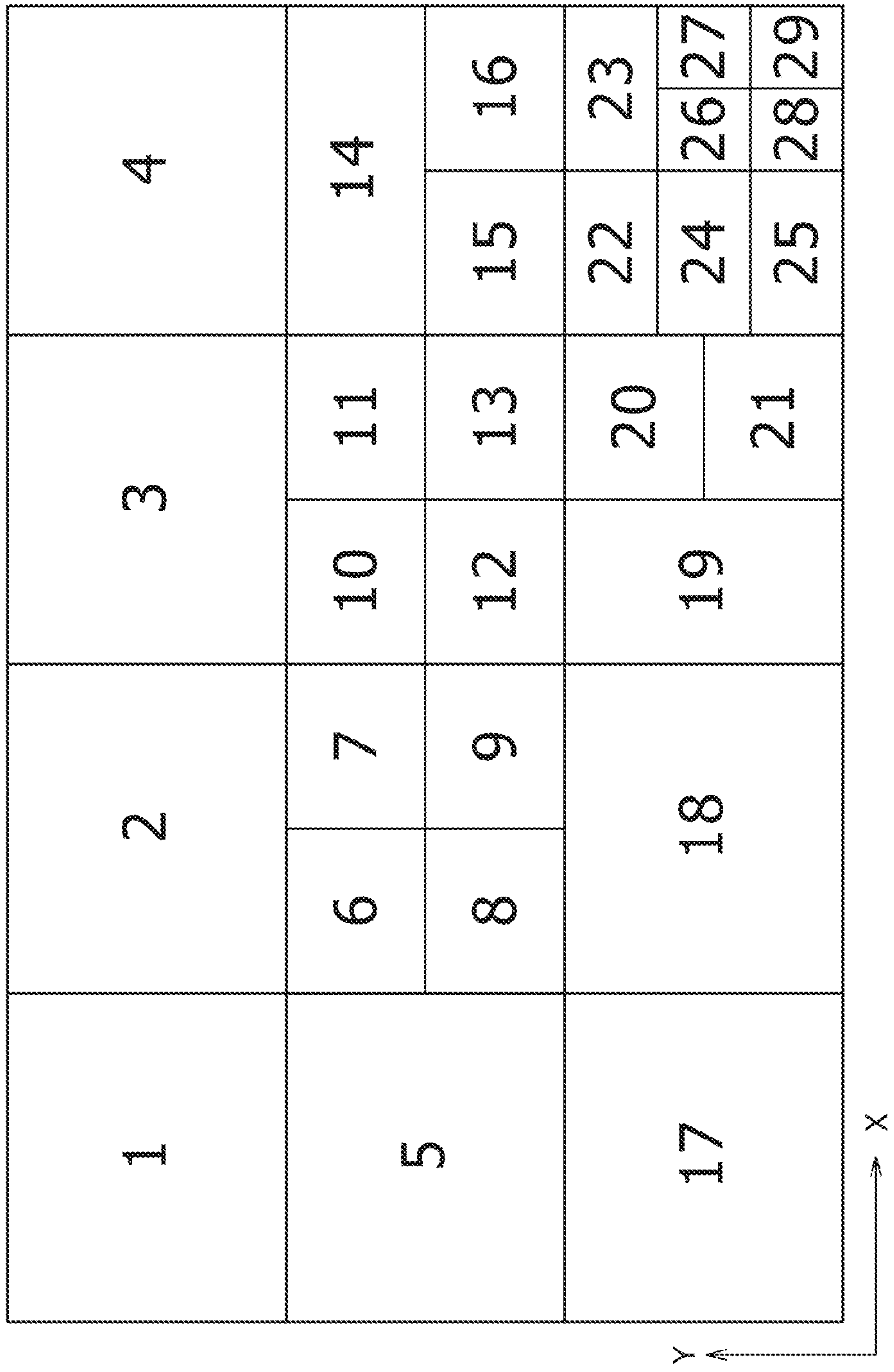
FIG. 27 is a diagram showing an output example of a block area decider.

With reference to FIGS. 26 and 27, one example of the processing result by the block area decider 117 will be described below. FIG. 26 shows an input image example. In the input image shown in FIG. 26, the motion amount is zero and a higher luminance region is concentrated near the lower right corner of the screen.

FIG. 27 shows an output example of the block area decider 117. A large number of blocks are disposed near the lower right corner of the screen at the stage of the block position decider 115. In addition, a large number of blocks having a small area are disposed near the lower right corner of the screen through the area calculation based on Equation 1.

The initial setting information memory 119 is a memory area that stores the initial values of the number, position, and area of the blocks for the flicker determination as described above.

(6) Emission Time Measurement Unit

The emission time measurement unit 81 (FIG. 17) is a circuit device that detects a high luminance region having an area larger than a certain area and measures the emission time of this region. This is because flicker is not visually recognized unless not only high luminance and small motion amount but also a certain area and continuous emission for a certain time are satisfied.

Therefore, the emission time measurement unit 81 executes the following processing. Initially, the emission time measurement unit 81 detects block regions whose average luminance level is 50% of the grayscale luminance or higher from the block regions set in the previous-stage processing. Subsequently, the emission time measurement unit 81 couples block regions that are adjacent to or overlap with each other, among the detected block regions, into one block region, and obtains the area of the block region resulting from the coupling.

Furthermore, if even one coupling-result block whose calculated area is 10% of the entire display region or larger is detected, the emission time measurement unit 81 measures the time from the detection start to the detection end. The maximum number of block regions whose area is 10% of the display region or larger is 10. In this embodiment, the emission times of these 10 block regions can be simultaneously measured.

The area and measurement value of the block region as the emission time measurement target are supplied as emission time information S11 to the flicker information calculator 83.

If the input image is the scattered type (if the luminance of the entire screen is averagely high and the total emission period length is equal to or longer than the threshold value), the emission time measurement unit 81 outputs the emission time and the average luminance level as the emission time information S11 during the period when the detection result showing that the input image is the scattered type is obtained.

(7) Flicker Information Calculator

The flicker information calculator 83 is a circuit device that calculates flicker information based on the emission time information S11 and a frame rate S12. The calculation of the flicker information by the flicker information calculator 83 is carried out if the time length of the emission time information S11 is not zero. If plural regions are detected as the measurement target of the emission time information S11, the flicker information may be calculated regarding all of the regions. Alternatively, the flicker information may be calculated regarding only the region in which flicker is the most highly visible (i.e. the region having the largest area).

The flicker information calculator 83 calculates the flicker information based on the following equation.

Flicker information=frame rate value×area value of region whose average luminance level is 50% or higher×emission time value (Equation 2)

The frame rate value in Equation 2 is a determination parameter reflecting the frame rate S12 used in display driving of the organic EL panel module 51. The area value of region whose average luminance level is 50% or higher is a determination parameter reflecting the area of the coupling-result block region as the measurement target of the emission time information S11. The emission time value is also a determination parameter reflecting the measurement time of the emission time information S11.

FIGS. 28 to 30 show examples of the correspondence tables for converting the respective values to the corresponding parameters.

FIG. 28 shows an example of the correspondence table between the frame rate and the frame rate value. If the frame rate is 65 Hz or higher, flicker is generally invisible. Therefore, the frame rates in this region are associated with zero as the frame rate value. If the frame rate becomes lower than 65 Hz, flicker becomes more visible gradually. Therefore, the frame rate value becomes larger gradually. In the example of FIG. 28, the frame rate value is “4” as the maximum value if the frame rate is 54 Hz or lower.

FIG. 29 shows an example of the correspondence table between the area of a high luminance region and the area value. Of course, generally flicker is invisible if the area is 10% of the entire display region or smaller. Therefore, the areas in this region are associated with zero as the area value. If the area becomes larger than 10%, flicker becomes more visible gradually. Therefore, the area value becomes larger gradually. In the example of FIG. 29, the area value is set for every increment of the area by 5%. The area value is “2” as the maximum value if the area is 50% or larger.

FIG. 30 shows an example of the correspondence table between the emission time of a detected high luminance region and the emission time value. Of course, flicker is invisible if the emission time is short even in a high luminance region. In the example of FIG. 30, the limit of the emission time for flicker recognition is set to one second, and emission times shorter than one second are associated with zero as the emission time value. If the emission time becomes longer than one second, flicker becomes more visible gradually. Therefore, the emission time value becomes larger gradually. In the example of FIG. 30, the emission time value is set for every increment of the emission time by 0.1 seconds. The emission time value is “2” as the maximum value if the emission time is two seconds or longer.

The flicker information calculator 83 calculates flicker information S13 by using the above-described correspondence tables.

The flicker information S13 takes a zero value if the frame rate is high, or if the area of a high luminance region (region whose average luminance level is 50% or higher and whose area is 10% of the entire screen or larger) is small, or if the continuous emission time of the high luminance region is shorter than one second. The total emission time length is reflected at the time of the decision of the number of blocks, and the motion amount is also reflected at the time of the decision of the area of a high luminance region. Therefore, all of the conditions necessary for the flicker determination are reflected in this flicker information S13.

(c) Emission Mode Determiner

The emission mode determiner 63 (FIG. 16) is a circuit device that determines the emission mode used in displaying of the subject image based on the detected flicker information S13.

In this embodiment, the emission mode determiner 63 determines the emission mode corresponding to the detected flicker information S13 in accordance with the correspondence relationship shown in FIG. 31. Of course, the smaller the value of the flicker information S13 is, the lower the intensity of the flicker is. The larger the value of the flicker information S13 is, the higher the intensity of the flicker is.

In the example of FIG. 31, for an input image with low flicker intensity, it is determined to use an emission mode of a moving image improvement system. For an input image with middle flicker intensity, it is determined to use an emission mode of a balance system. For an input image with high flicker intensity, it is determined to use an emission mode of a flicker suppression system.

(d) User Setting Unit

The user setting unit 65 (FIG. 16) is a circuit device disposed in order to reflect the user's preference in the determination of the emission mode. Specifically, it is a circuit device that holds the user's preference for the quality of the displayed image, accepted through an operation screen, in a memory area.

The user's preference for the quality of the displayed image encompasses e.g. information relating to placing emphasis on the displaying quality of a moving image and placing emphasis on the displaying quality of a still image, and information as to which of moving image blur and flicker is emphasized.

(e) Drive Timing Generator

The drive timing generator 67 (FIG. 16) is a circuit device that generates the timing pulses necessary for the drive control of the sub-pixels 23 in such a way that the set emission mode and peak luminance level are satisfied.

Figures 32A, 32B, 32C, 32D, 32E, 32F, 32G:
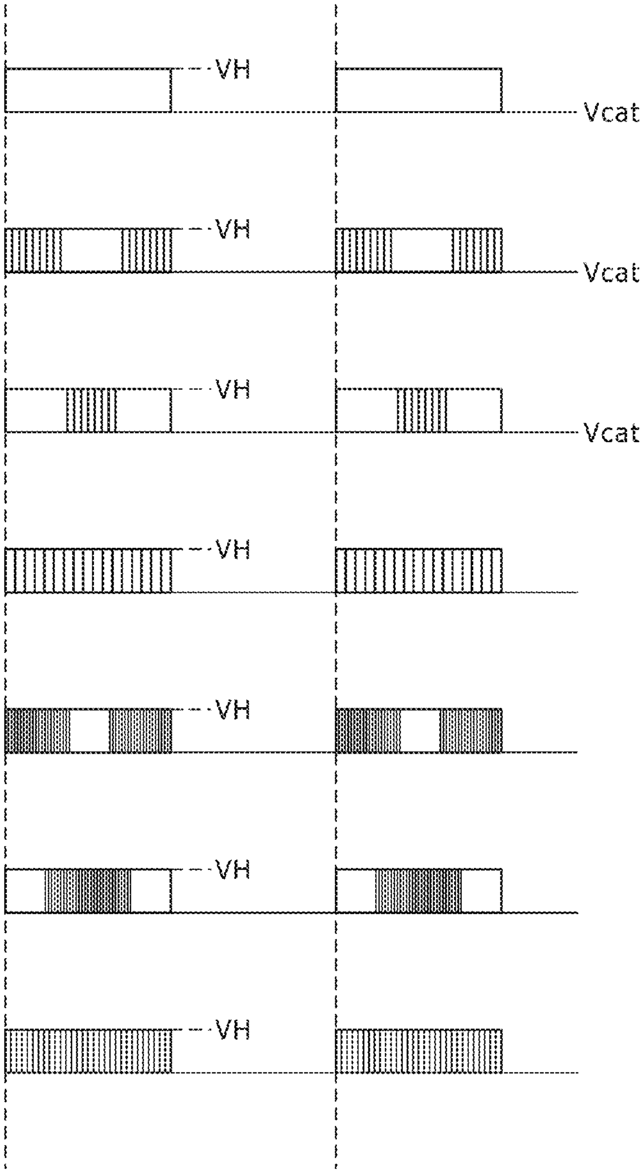
FIGS. 32A to 32G are diagrams for explaining output pattern examples associated with the emission mode and the peak luminance level.
Figures 33A, 33B, 33C, 33D:
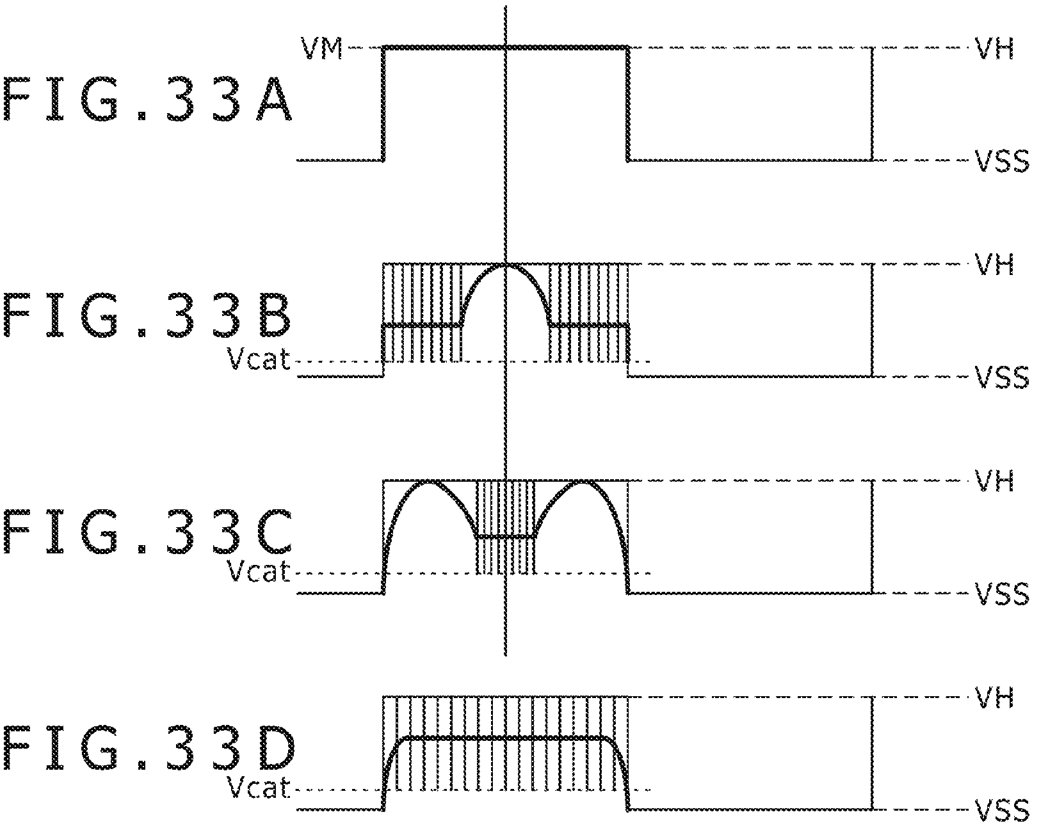
FIGS. 33A to 33D are diagrams for explaining the relationship between the output pattern and the luminance distribution.

FIGS. 32A to 32G show output pattern examples of the drive potential, realized by the generated timing pulses. FIG. 32A shows an output pattern example of the drive potential when the peak luminance level Py is 50%. This case corresponds to the maximum luminance. Therefore, only the drive potential VH is employed in the emission period. The luminance distribution in this case is shown by the heavy line in FIG. 33A.

FIG. 32B shows an output pattern example of the drive potential when the peak luminance level Py is 40% and the emission mode is the moving image improvement mode. Of course, also in this case, the drive potential Vcat whose waveform is shaped into a pulse form is so output plural times that the peak luminance level Py becomes 40%. However, the output timings of the drive potential Vcat are disposed near both ends of the emission period in a concentrated manner. The purpose thereof is to concentrate the luminance distribution at the center of the emission period as shown by the heavy line in FIG. 33B. Due to the concentration of the luminance distribution at the center of the emission period, moving image blur is visually recognized less readily and the visibility of a moving image is improved.

FIG. 32C shows an output pattern example when the peak luminance level Py is 40% and the emission mode is the flicker suppression mode. Of course, also in this case, the drive potential Vcat whose waveform is shaped into a pulse form is so output plural times that the peak luminance level Py becomes 40%. However, the output timings of the drive potential Vcat are disposed near the center of the emission period in a concentrated manner. The purpose thereof is to disperse the apparent luminance distribution to both ends of the emission period as shown by the heavy line in FIG. 33C. If the luminance distribution is dispersed in this manner, the apparent frequency becomes higher and the visibility of a still image is improved.

FIG. 32D shows an output pattern example when the peak luminance level Py is 40% and the emission mode is the balance mode. It is obvious that this output form is the same as that in the first embodiment. Specifically, the output timings of the drive potential Vcat are uniformly disposed across the entire emission period. As shown by the heavy line in FIG. 33D, the luminance distribution is uniformly lowered in the entire emission period.

FIG. 32E shows an example when the peak luminance level Py is 30% and the emission mode is the moving image improvement mode. In this case, corresponding to the decrease in the luminance level Py, the output timings of the drive potential Vcat are densely disposed at positions near both ends of the emission period. As a result, the degree of the concentration of the luminance distribution is further enhanced.

FIG. 32F shows an example when the peak luminance level Py is 30% and the emission mode is the flicker suppression mode. In this case, corresponding to the decrease in the luminance level Py, the output timings of the drive potential Vcat are densely disposed near the center of the emission period. As a result, the degree of the dispersion of the luminance distribution becomes higher.

FIG. 32G shows an output example when the peak luminance level Py is 25% and the emission mode is the balance mode. This output form is the same as that in the first embodiment.

(C-3) Summary

Except for the above-described kinds of operation for the respective emission modes, the drive operation of the organic EL panel module in this embodiment is the same as that in the first embodiment.

As above, in this embodiment, the peak luminance level can be variably controlled in the state in which the period length from the start of the emission period to the end thereof is fixed. In addition, the moving image displaying performance and the flicker suppression performance can be positively improved. That is, the displaying quality can be further enhanced compared with the first embodiment.

(D) Third Embodiment

A third embodiment of the present invention will be described below. In the first and second embodiments, each of the ternary drive potentials, which are selectively output, is a fixed potential. Specifically, the peak luminance level is adjusted through adjustment of the output period length of the drive potential Vcat or the number of times of the output of the drive potential Vcat. However, in this method, the width of the adjustment step is limited to some extent.

To address this, the third embodiment employs such a technique for driving the power supply line DSL that the adjustment step can be freely varied.

Specifically, the intermediate value of the drive potential is variably generated.

(D-1) System Configuration Example

Figure 34:
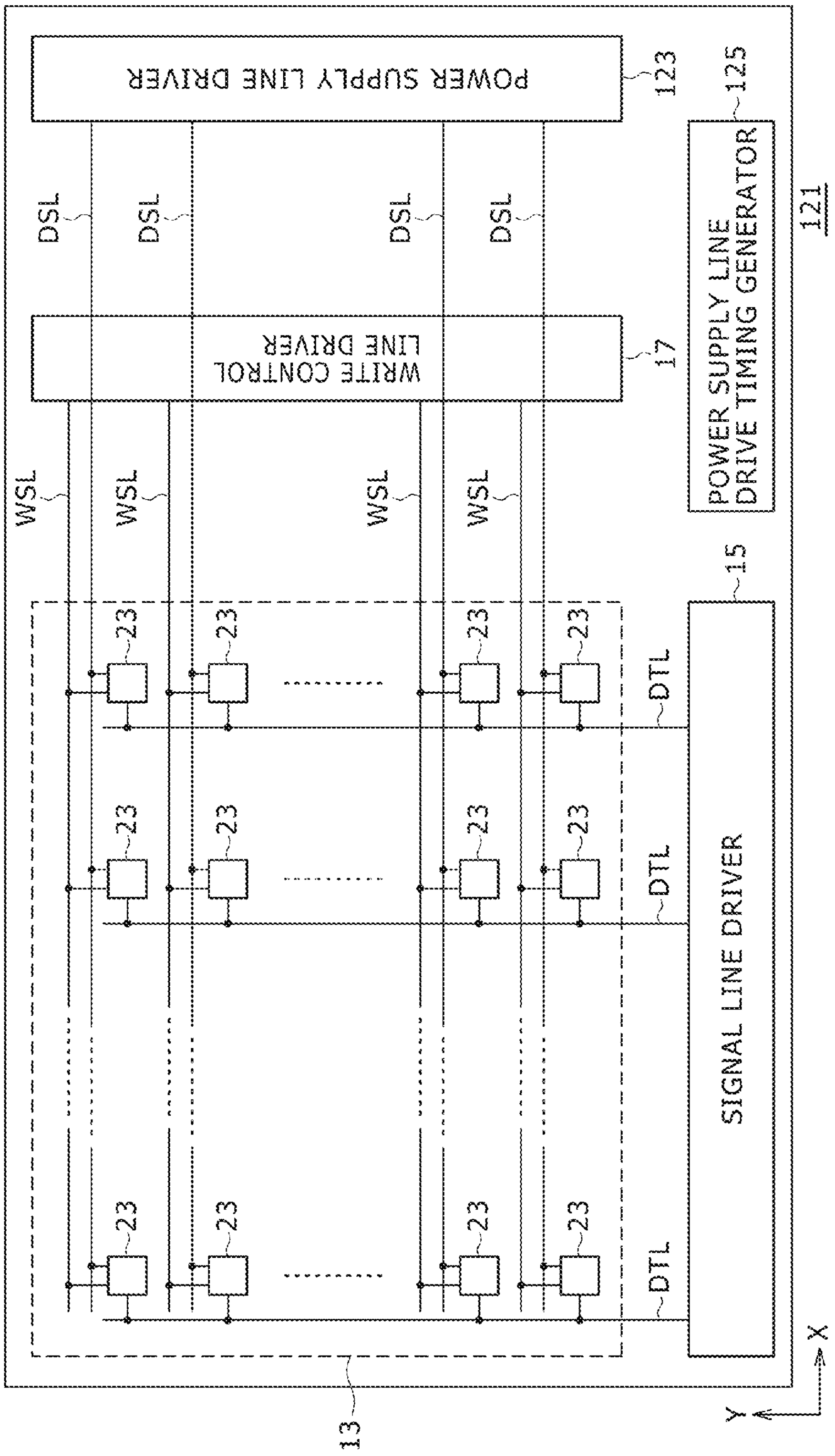
FIG. 34 is a diagram showing a configuration example of an organic EL panel module.

FIG. 34 shows a system configuration example of an organic EL panel module 121 according to the third embodiment. In FIG. 34, the same parts as those in FIG. 4 are given the same numerals and symbols.

The organic EL panel module 121 has a configuration obtained by disposing, on a glass substrate, a pixel array section 13, a signal line driver 15, a write control line driver 17, a power supply line driver 123, and a power supply line drive timing generator 125.

In the following, only the power supply line driver 123 and the power supply line drive timing generator 125, which are novel units in this embodiment, will be described below.

(D-2) Configurations of Respective Units (a) Power Supply Line Driver

Figure 35:
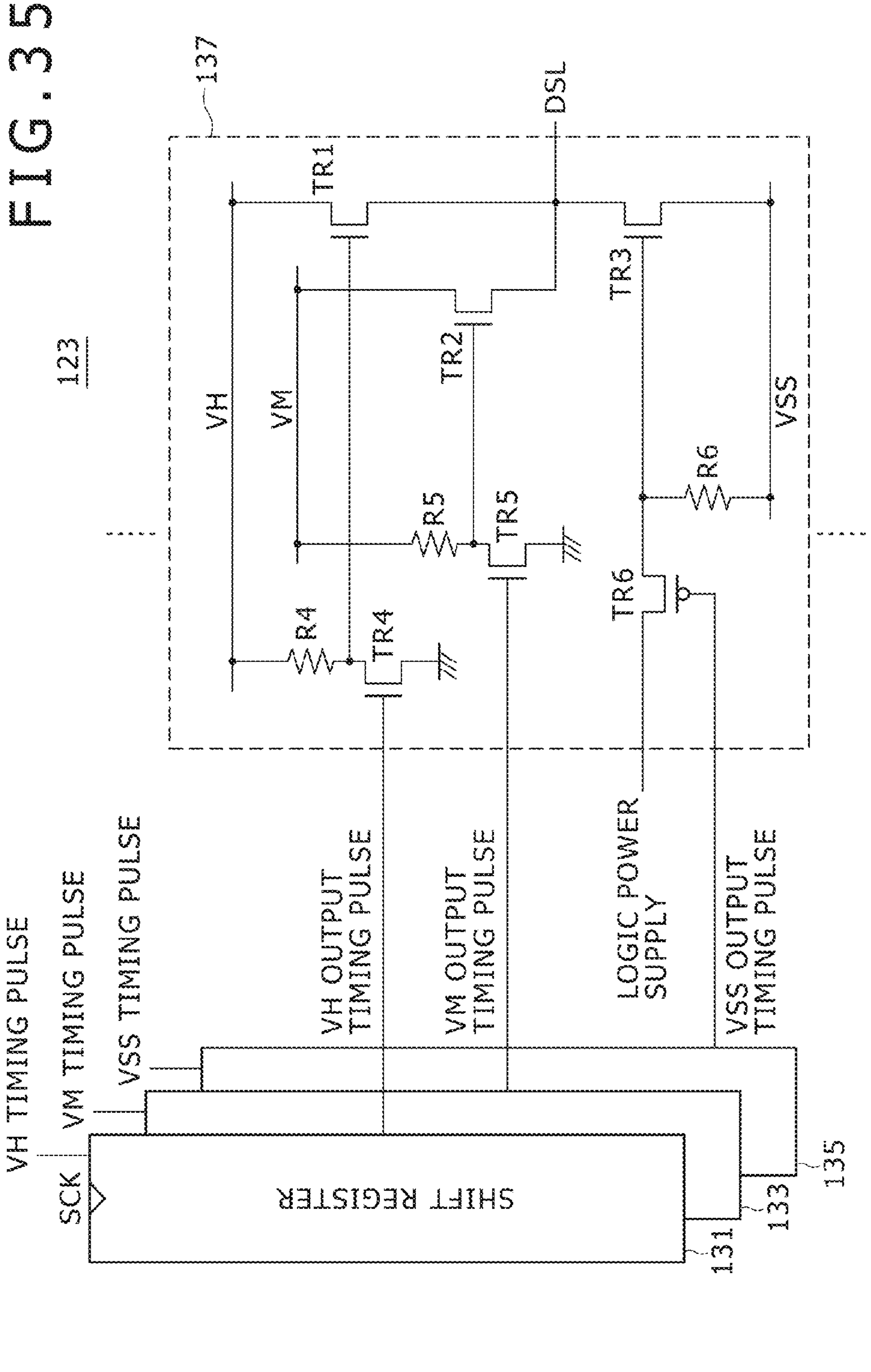
FIG. 35 is a diagram for explaining an internal configuration example of a power supply line driver.

FIG. 35 shows the internal configuration of the power supply line driver 123. The circuit configuration shown in FIG. 35 is basically the same as that of the power supply line driver 19 described with FIG. 7. Specifically, the power supply line driver 123 includes shift registers 131, 133, and 135 corresponding to the respective drive potentials and M output stage circuits 137 corresponding to the individual power supply lines DSL.

The difference in the circuit configuration is that, of the ternary drive potentials, the drive potential as the intermediate value is a drive potential VM that is sequentially set variably depending on the peak luminance level and the emission mode.

In this embodiment, the drive potential VM is generated in the power supply line drive timing generator 125 and applied to the corresponding power supply line.

(b) Power Supply Line Drive Timing Generator

Figure 36:
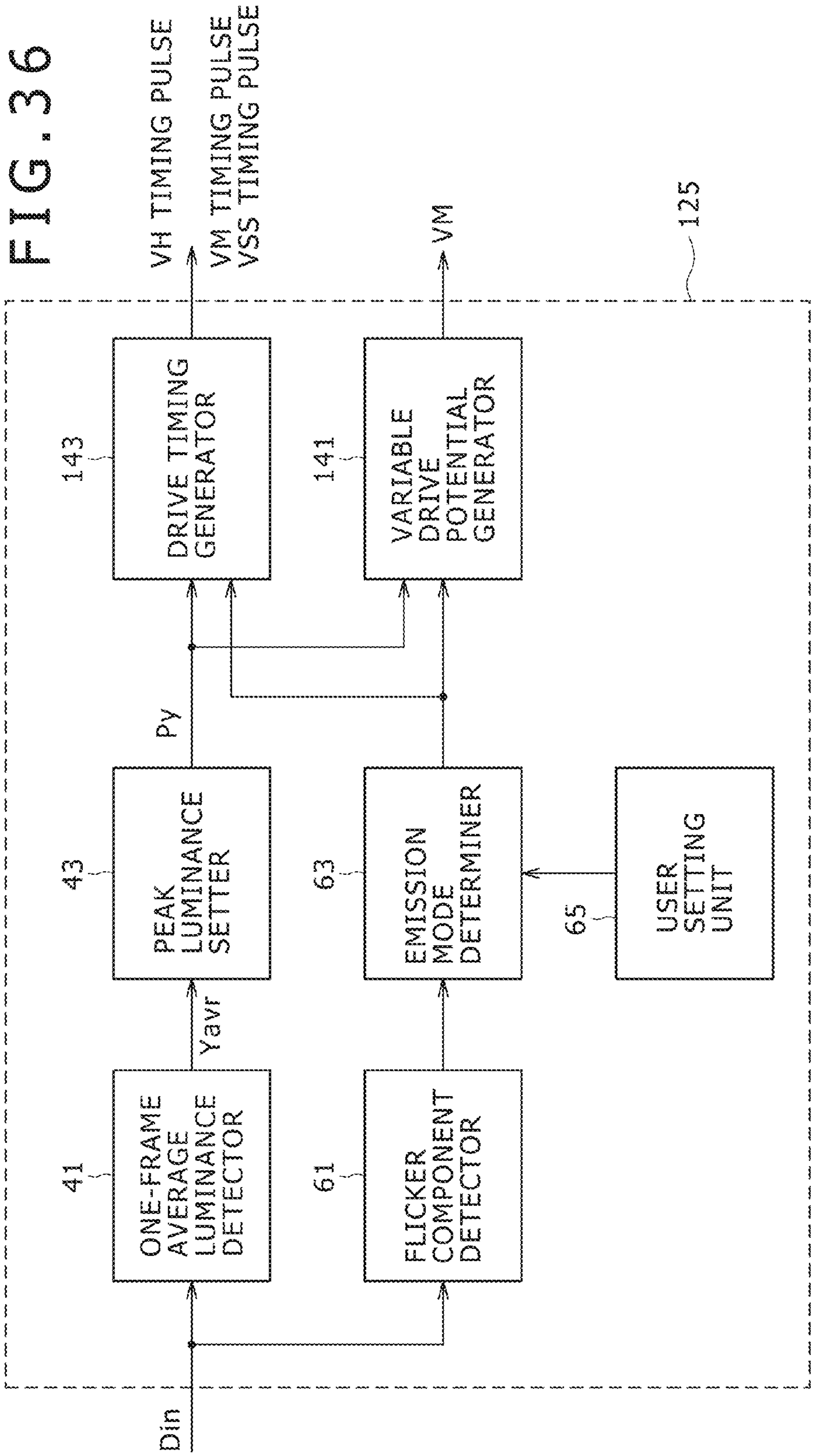
FIG. 36 is a diagram for explaining an internal configuration example of a power supply line drive timing generator.

FIG. 36 shows an internal configuration example of the power supply line drive timing generator 125. In FIG. 36, the same parts as those in FIG. 16 are given the same numerals and symbols.

The power supply line drive timing generator 125 includes a one-frame average luminance detector 41, a peak luminance setter 43, a flicker component detector 61, an emission mode determiner 63, a user setting unit 65, a variable drive potential generator 141, and a drive timing generator 143.

Specifically, this power supply line drive timing generator 125 also has the function to set the peak luminance level and the function to determine the emission mode.

The difference exists in two units: the variable drive potential generator 141 and the drive timing generator 143, which use the peak luminance level and the emission mode.

Figure 37:
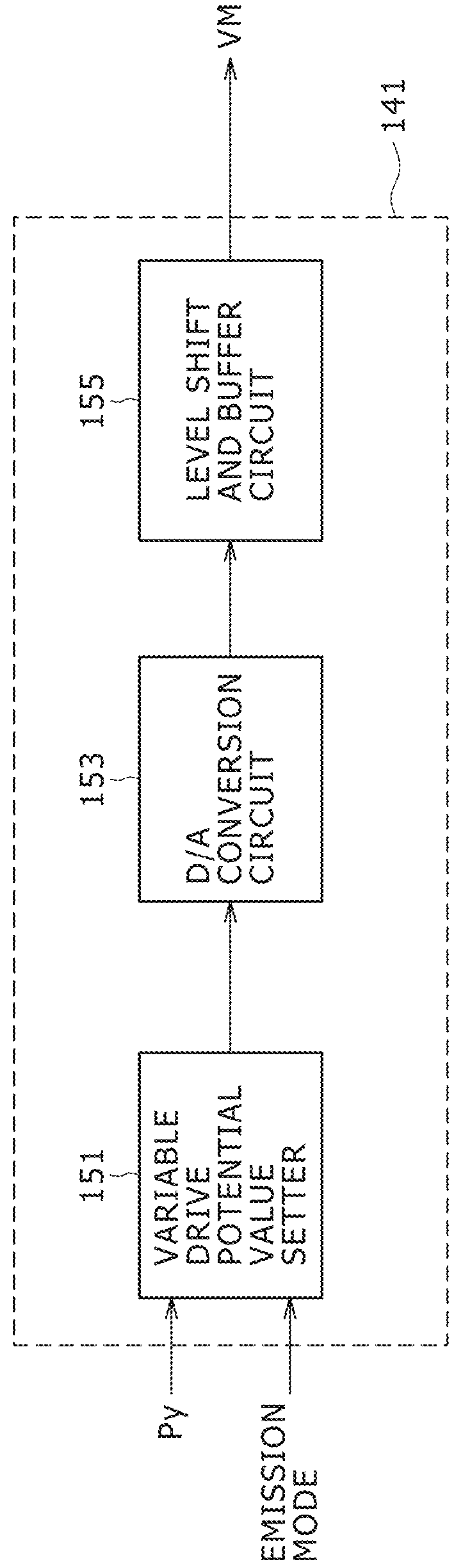
FIG. 37 is a diagram for explaining an internal configuration example of a variable drive potential generator.

FIG. 37 shows an internal configuration example of the variable drive potential generator 141. The variable drive potential generator 141 includes a variable drive potential value setter 151, a D/A conversion circuit 153, and a level shift and buffer circuit 155.

The variable drive potential value setter 151 is a circuit device that variably sets the potential value of the drive potential VM suitable for the detected average luminance level and the emission mode.

The maximum value in the variable range of the drive potential VM is the drive potential VH, and the minimum value in the variable range is the cathode electrode potential Vcat. This drive potential VM is set within this range. In this embodiment, the combinations of the drive potential value and the output period length (e.g. the number of times of output) that are most suitable for realization of the peak luminance level Py are stored in a look-up table (not shown).

The variable drive potential value setter 151 refers to this look-up table and outputs the optimum drive potential value to the digital/analog conversion circuit 153.

The digital/analog conversion circuit 153 converts the drive potential value set as a digital value into an analog voltage.

The level shift and buffer circuit 155 converts the level of the analog voltage input from the previous stage into the voltage level necessary for the driving of the sub-pixel 23.

The drive timing generator 143 is a circuit device that time-sequentially switches the output of three kinds of drive voltages VH, VM, and VSS and generates the drive pulse necessary for the driving of the power supply line DSL. The generated drive pulse is line-sequentially transferred for each row (horizontal line).

Figure 38:
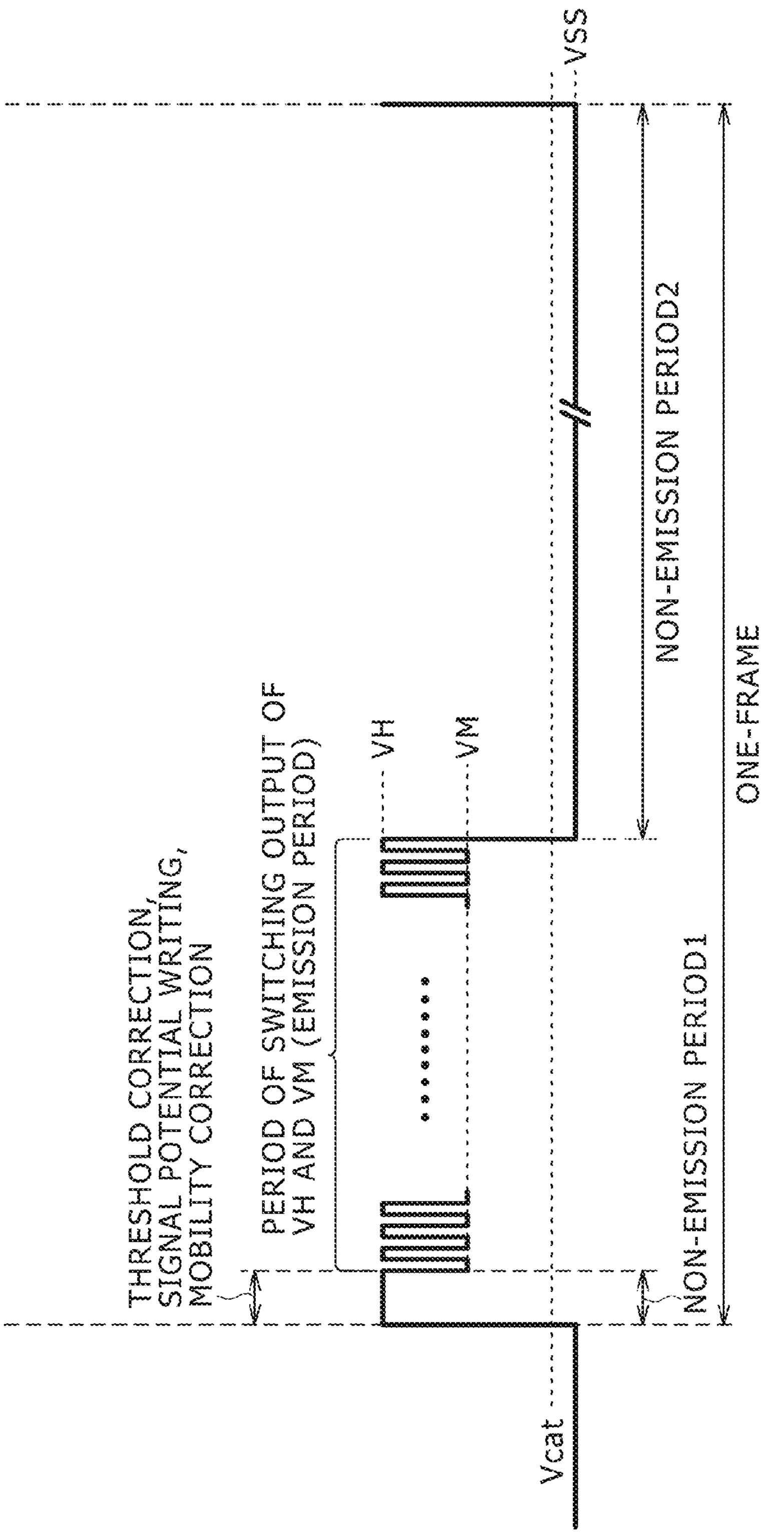
FIG. 38 is an enlarged view of an output pattern example of the drive potential.

FIG. 38 shows an output pattern example of the drive pulse. This output pattern is common to all of the power supply lines DSL. This drive timing generator 143 also includes a variable drive potential value setter 161 that is the same as the variable drive potential value setter 151 in the variable drive potential generator 141.

Through reference to this variable drive potential value setter 161, the drive timing generator 143 sets the number of times of the output of the drive potential VM. Furthermore, the drive timing generator 143 refers to the emission mode and sets the positions of the output timings of the drive potential VM whose waveform is shaped into a pulse form.

Figures 39A, 39B, 39C, 39D, 39E, 39F, 39G:
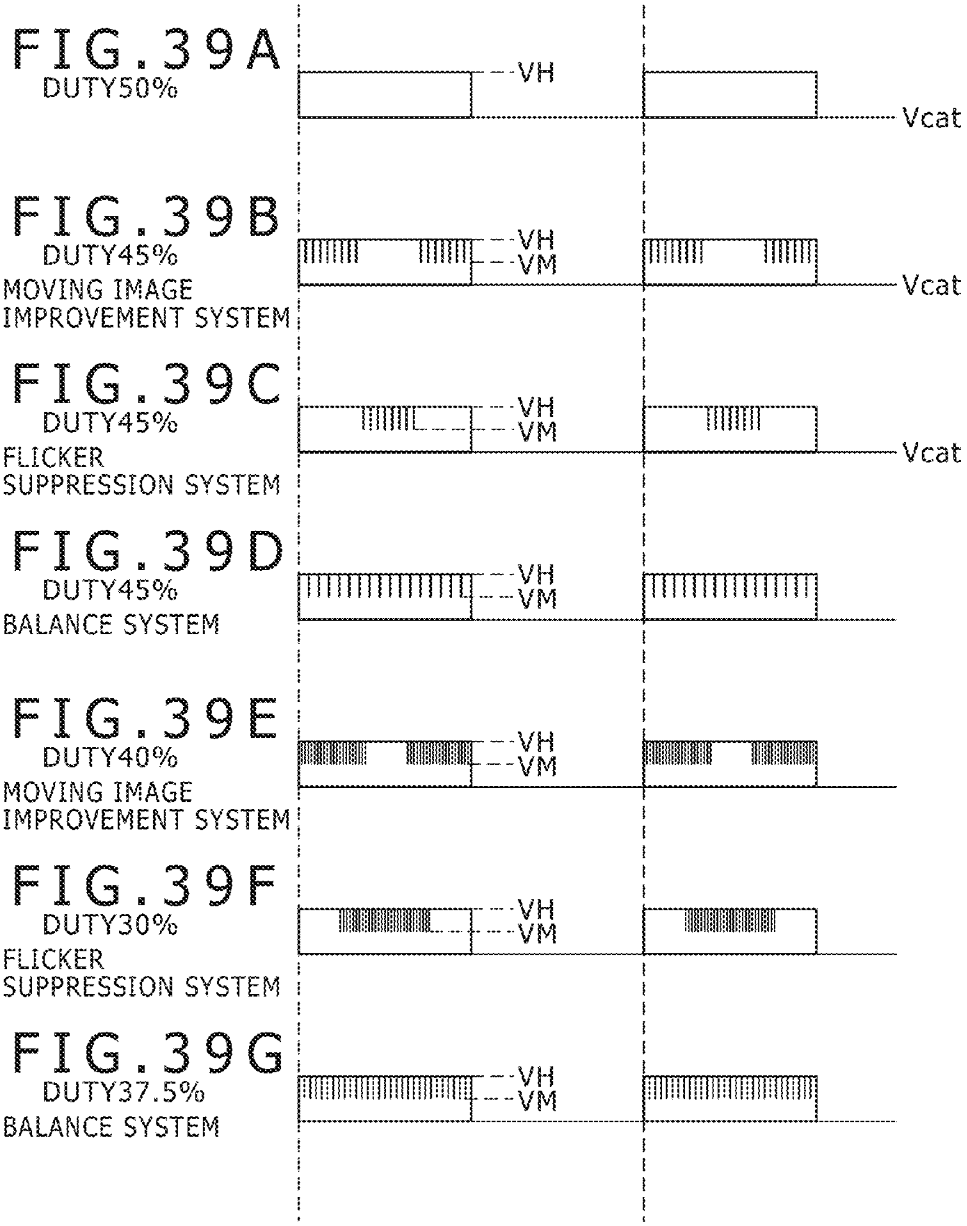
FIGS. 39A to 39G are diagrams for explaining output pattern examples associated with the emission mode and the peak luminance level.

FIGS. 39A to 39G show output pattern examples of the drive potential, realized by the generated timing pulses. FIG. 39A shows an output pattern example of the drive potential when the peak luminance level Py is 50%. This case corresponds to the maximum luminance.

FIG. 39B shows an output pattern example of the drive potential when the peak luminance level Py is 45% and the emission mode is the moving image improvement mode. Of course, also in this case, the drive potential VM (the intermediate value between the drive potential VH and the cathode electrode potential Vcat) whose waveform is shaped into a pulse form is so output plural times that the peak luminance level Py becomes 45%. Of course, the output timings of the drive potential VM are disposed near both ends of the emission period in a concentrated manner.

FIG. 39C shows an output pattern example when the peak luminance level Py is 45% and the emission mode is the flicker suppression mode. Of course, also in this case, the drive potential VM whose waveform is shaped into a pulse form is so output plural times that the peak luminance level Py becomes 45%. Of course, the output timings of the drive potential VM are disposed near the center of the emission period in a concentrated manner.

FIG. 39D shows an output pattern example when the peak luminance level Py is 45% and the emission mode is the balance mode. Of course, the output timings of the drive potential VM are uniformly disposed across the entire emission period.

FIG. 39E shows an example when the peak luminance level Py is 40% and the emission mode is the moving image improvement mode. In this case, corresponding to the decrease in the luminance level Py, the output timings of the drive potential VM are densely disposed at positions near both ends of the emission period.

FIG. 39F shows an example when the peak luminance level Py is 40% and the emission mode is the flicker suppression mode. In this case, corresponding to the decrease in the luminance level Py, the output timings of the drive potential VM are densely disposed near the center of the emission period.

FIG. 39G shows an output example when the peak luminance level Py is 37.5% and the emission mode is the balance mode.

(D-3) Summary

Except for the operation of variably setting the intermediate value of the drive potential (i.e. the drive potential VM), the drive operation of the organic EL panel module in this embodiment is the same as that in the second embodiment.

In this embodiment, not only the number of times of the switching of the drive potential in the emission time but also the amplitude (VH−VM) can be variably controlled.

Therefore, the peak luminance level can be adjusted more minutely compared with the second embodiment. In other words, more minute adjustment of the luminance distribution is possible. For example, even if the number of times of the output of the drive potential VM whose waveform is shaped into a pulse form is the same as that in the second embodiment, fine adjustment of the peak luminance level dependent on the value of the drive potential VM is possible.

As a result, the adjustment accuracy of the displaying quality can be further enhanced compared with the second embodiment.

(E) Fourth Embodiment

A fourth embodiment of the present invention will be described below. In the above-described three embodiments, the peak luminance level is controlled based on the average luminance level.

In the fourth embodiment, the peak luminance level is controlled based on the ambient illuminance.

(E-1) System Configuration Example

Figure 40:
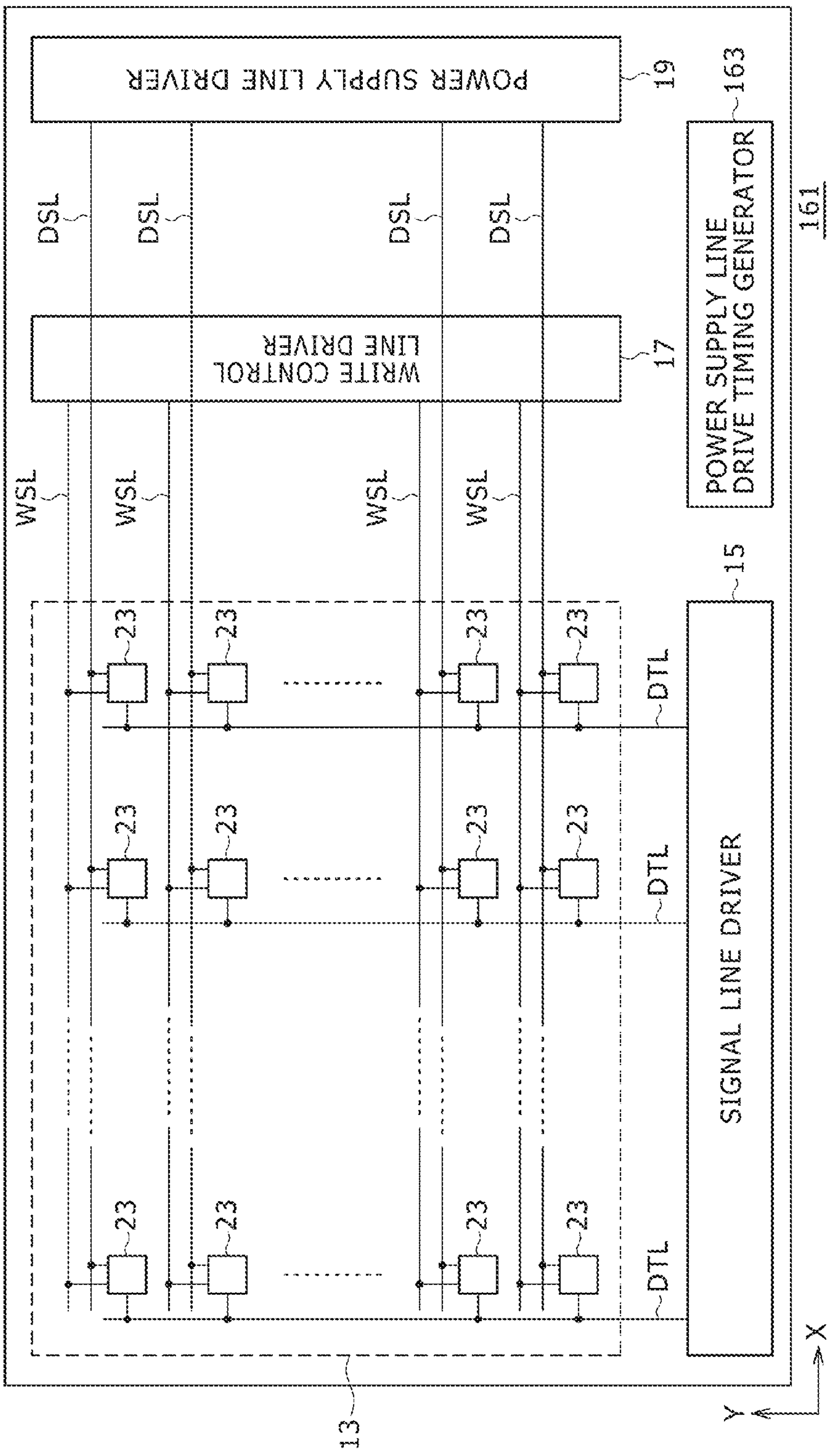
FIG. 40 is a diagram showing a configuration example of an organic EL panel module.

FIG. 40 shows a system configuration example of an organic EL panel module 161 according to the fourth embodiment. In FIG. 40, the same parts as those in FIG. 4 are given the same numerals and symbols.

The organic EL panel module 161 has a configuration obtained by disposing, on a glass substrate, a pixel array section 13, a signal line driver 15, a write control line driver 17, a power supply line driver 19, and a power supply line drive timing generator 163.

In the following, only the power supply line drive timing generator 163, which is a novel unit, will be described below. The power supply line drive timing generator 163 in this embodiment also generates timing pulses corresponding to ternary drive potentials. This embodiment employs the same ternary drive potentials as those in the first embodiment. That is, three values of VH, VSS, and Vcat are employed.

Figure 41:
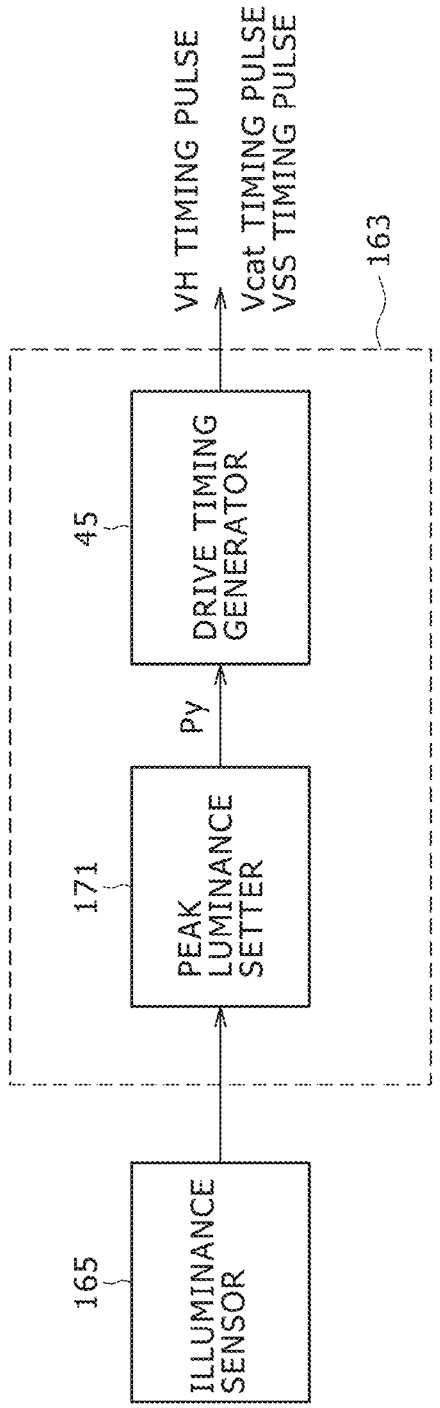
FIG. 41 is a diagram for explaining an internal configuration example of a power supply line drive timing generator.

However, in this embodiment, for generation of the switching timing of the drive potential, reference to the illuminance value of the panel ambience detected by an illuminance sensor 165 is made as shown in FIG. 41. In FIG. 41, the same parts as those in FIG. 8 are given the same numerals and symbols.

The illuminance sensor 165 is disposed on the surface of the case so that the illuminance of the panel ambience can be accurately detected. As the illuminance sensor 165, e.g. a phototransistor, a photodiode, or a photo IC (photodiode+amplifier circuit) is used.

As shown in FIG. 41, the power supply line drive timing generator 163 includes a peak luminance setter 171 and a drive timing generator 45.

Figure 42:
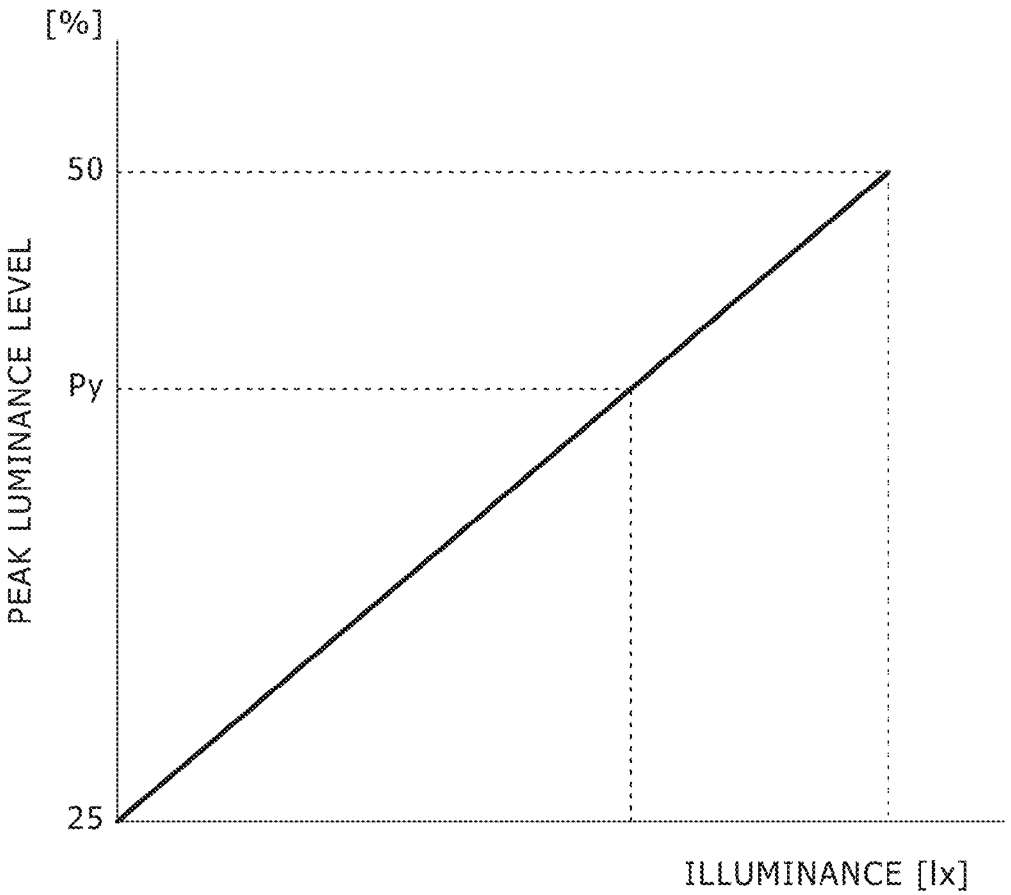
FIG. 42 is a diagram for explaining a setting example of the peak luminance level dependent on the ambient illuminance.

The peak luminance setter 171 is a circuit device that controls a peak luminance level Py depending on the detected ambient illuminance. FIG. 42 shows the input/output characteristic of a look-up table included in the peak luminance setter 171.

In FIG. 42, the abscissa indicates the illuminance [lx] and the ordinate indicates the peak luminance level [%]. In this embodiment, the peak luminance level Py is set in the range corresponding to the range of 25% to 50% of the one-frame period. This feature is the same as that in the first embodiment. Specifically, the peak luminance level given by the emission period length of 25% is allocated to the assumed minimum value of the illuminance, and the peak luminance level given by the emission period length of 50% is allocated to the assumed maximum value of the illuminance. The assumed minimum value and maximum value of the illuminance are set in consideration of the use environment.

The operation of the drive timing generator 45 in this embodiment is the same as that in the first embodiment. For example, when the set value of the peak luminance level is large, the drive timing generator 45 operates to decrease the number of times of the output of the drive potential Vcat. When the peak luminance level is low, the drive timing generator 45 operates to increase the number of times of the output of the drive potential Vcat. In either case, the output timings of the drive potential Vcat are uniformly disposed in the emission period.

(E-2) Summary

In this embodiment, the peak luminance level is increased to enhance the visibility when the ambient illuminance is high, whereas the peak luminance level is decreased to suppress glare and the power consumption when the ambient illuminance is low.

Of course, the positions of both ends of the emission period are fixed, which can avoid great change in the moving image characteristic and the flicker characteristic.

(F) Other Embodiments

(F-1) Other Methods for Setting Peak Luminance Level

In the above-described embodiments, the peak luminance level is variably set depending on the frame average luminance or the ambient illuminance.

Alternatively, it is also possible to set the peak luminance level with reference to another kind of information. For example, the peak luminance level may be variably set based on the ambient temperature or environmental temperature of the organic EL panel module. For example, the peak luminance level may be set higher when the temperature is lower, and the peak luminance level may be set lower when the temperature is higher.

The above-described plural conditions may be combined for the variable setting of the peak luminance level.

(F-2) Application to Division Emission System

In the above-described embodiments, the drive potential of the intermediate value is inserted in a pulsed manner in one emission period basically.

Figure 43A:
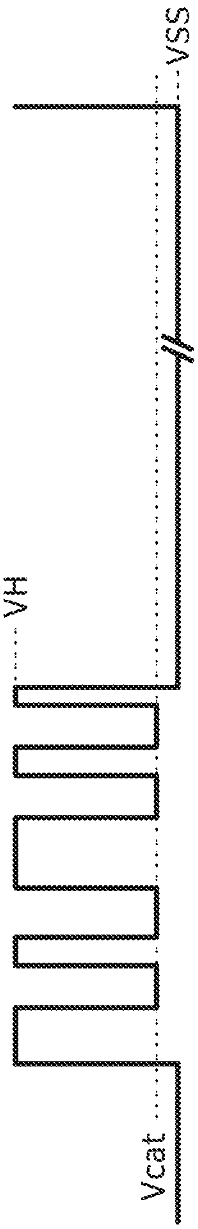
FIGS. 43A to 43D are diagrams showing other examples of the drive waveform of a power supply line.

However, this pulse insertion technique can be applied also to the case in which the emission period is divided into plural short emission periods as shown in FIG. 43A. The output pattern of the drive potential shown in FIG. 43A is an output pattern example that can simultaneously achieve both flicker suppression based on the high apparent frequency of the luminance distribution and improvement in the moving image visibility based on the long length of the center emission period.

In the output patterns of FIG. 43, the intermediate value of the drive potential is set to the cathode electrode potential Vcat.

Figure 43B:
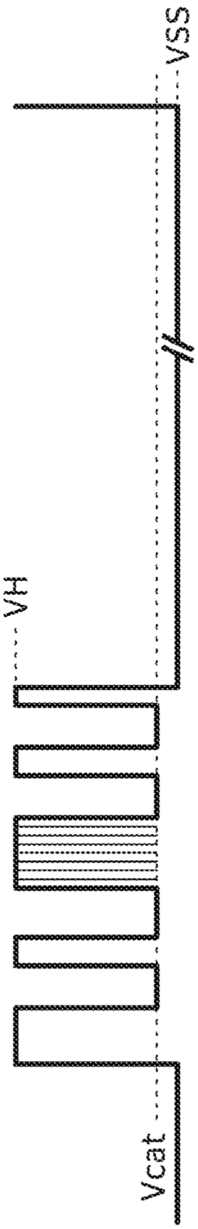
Figure 43C:
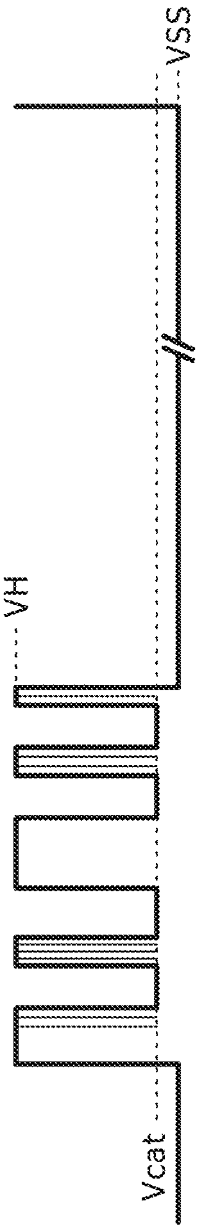
Figure 43D:
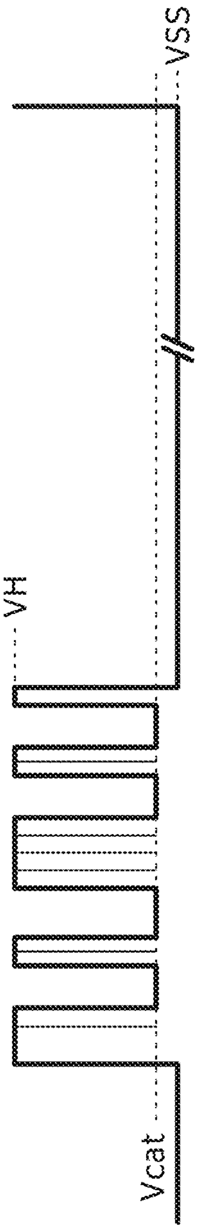
Figures 44A, 44B, 44C, 44D:
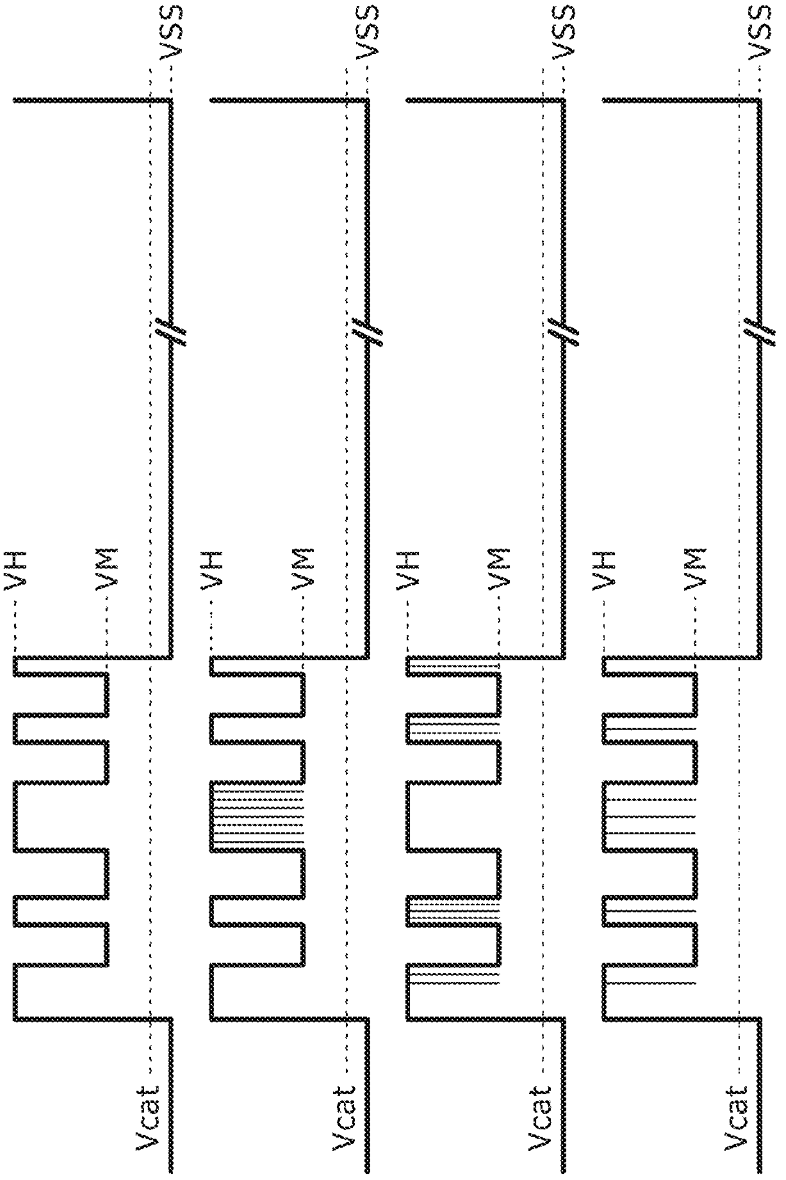
FIGS. 44A to 44D are diagrams showing other examples of the drive waveform of the power supply line.

Also with this kind of output pattern, fine adjustment of the peak luminance level and the visibility can be carried out by inserting the drive potential of the intermediate value in a pulsed manner in a part of the emission period in a concentrated manner or uniformly across the entire emission period as shown in FIGS. 43B to 43D.

For example, the output pattern shown in FIG. 43B is suitable to adjust the peak luminance level and the flicker visibility. For example, the output pattern shown in FIG. 43C is suitable to adjust the peak luminance level and the moving image visibility. For example, the output pattern shown in FIG. 43D is suitable to adjust the peak luminance level while keeping the balance of the visibility.

Of course, such a drive system can be applied also to the case in which the intermediate value of the drive potential is variably controlled.

FIGS. 44A to 44D show output pattern examples corresponding to the variable drive potential. FIGS. 44A to 44D correspond to FIGS. 43A to 43D, respectively. FIGS. 44A to 44D are different from FIGS. 43A to 43D only in that the intermediate value of the drive potential is replaced by the variable drive potential VM.

(F-3) Another Power Supply Line as Driving Target

In the above-described embodiments, the cathode electrode potential of the organic EL element OLED is fixed and the drive potential on the anode side is variably controlled.

However, as similar operation, the potential on the anode electrode side of the organic EL element OLED may be fixed and the potential on the cathode electrode side may be variably controlled.

Figure 45:
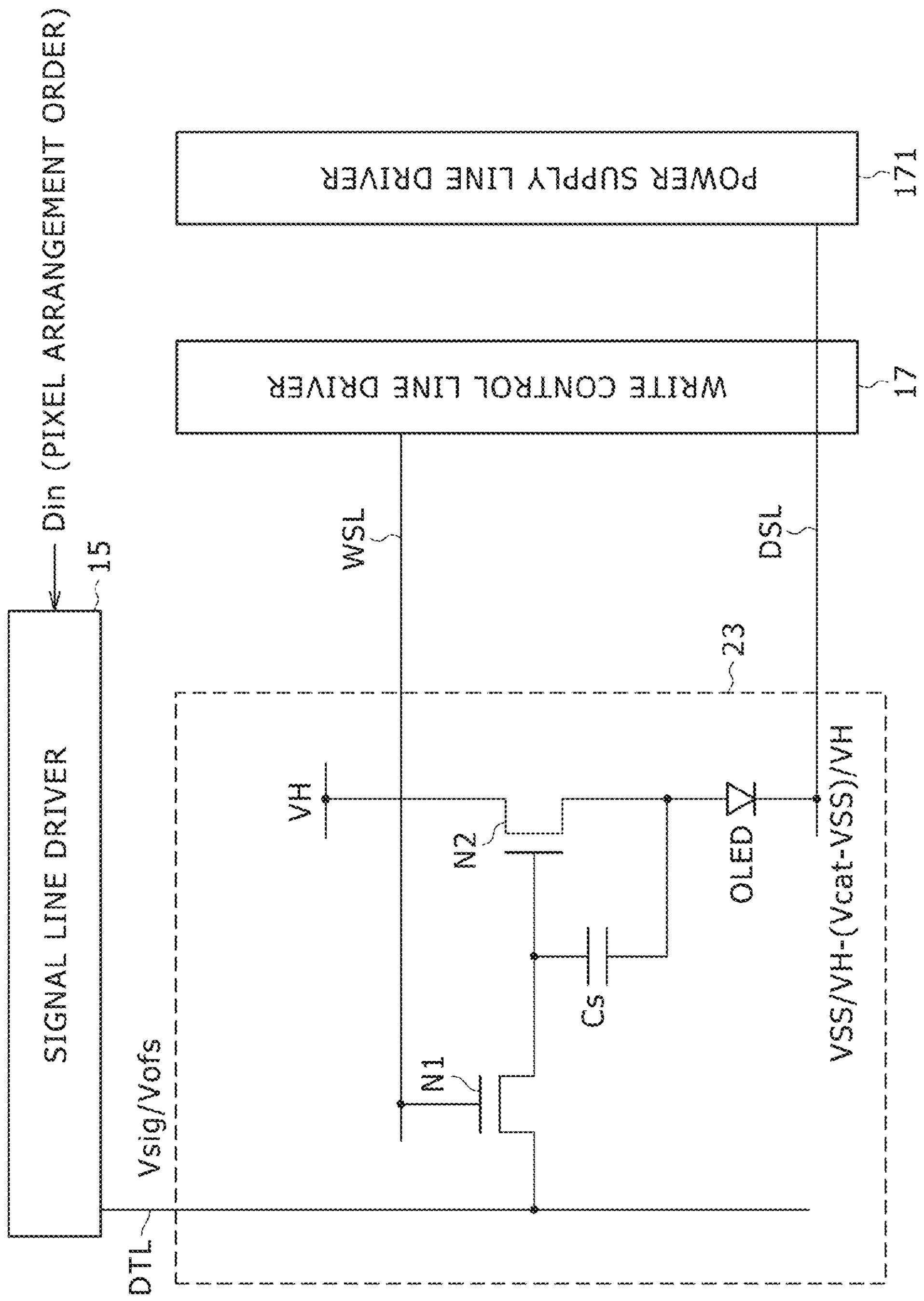
FIG. 45 is a diagram for explaining the connection relationship between a sub-pixel and drive circuitry in the case of driving a cathode electrode potential.

FIG. 45 shows the correspondence relationship between the sub-pixel 23 and the drive circuitry. In FIG. 45, the same parts as those in FIG. 6 are given the same numerals and symbols. In the sub-pixel 23 shown in FIG. 45, the anode electrode side of the organic EL element OLDE is set to the drive potential VH common to all of the sub-pixels 23. On the other hand, the power supply line DSL is connected to the cathode electrode of the organic EL element OLED on a row-by-row basis. In this embodiment, any of the drive potentials VSS, VH−(Vcat−VSS), and VH is line-sequentially applied to the power supply line DSL.

In this embodiment, the potential of the cathode electrode is controlled by a power supply line driver 171.

Figure 46:
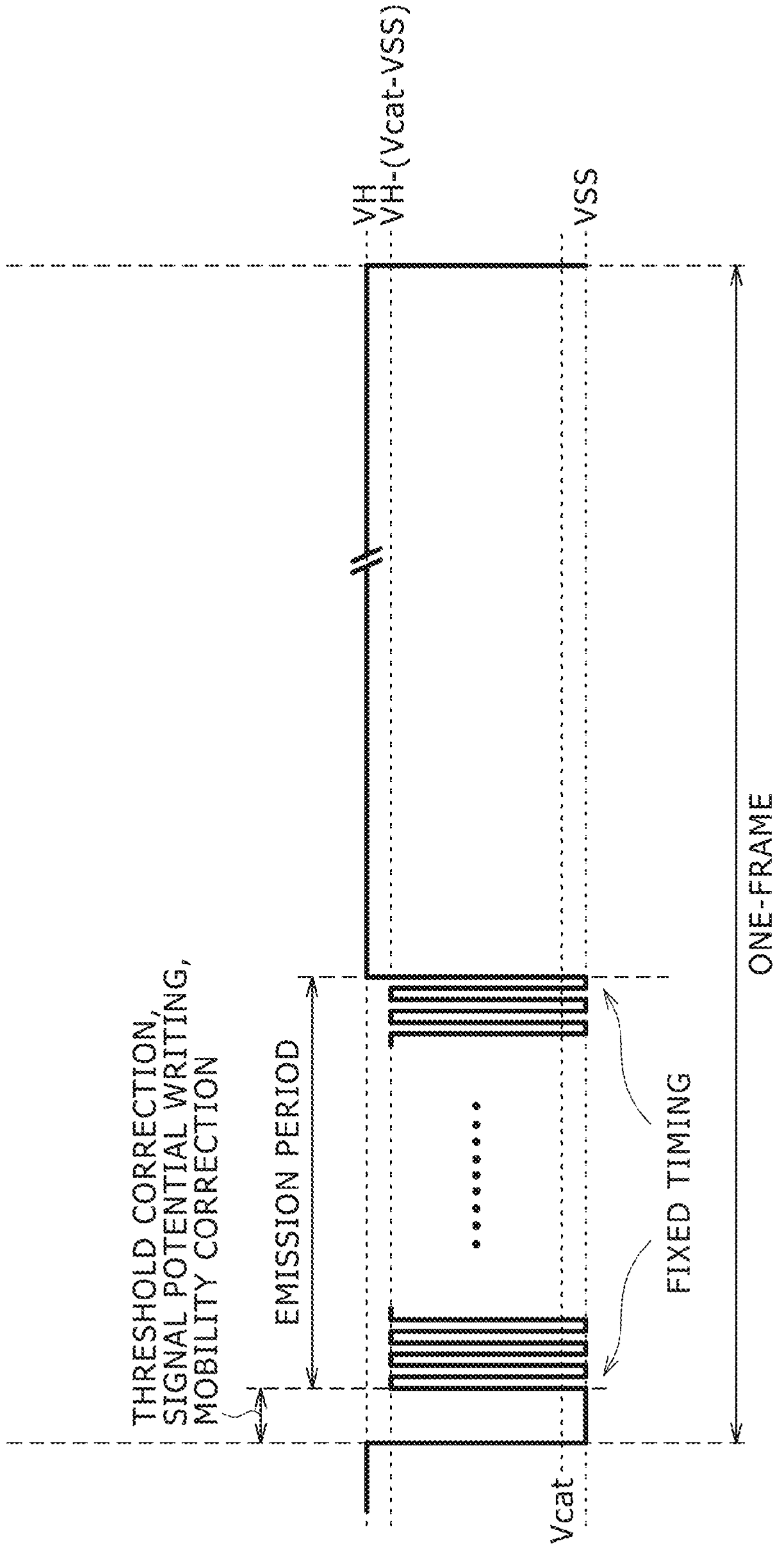
FIG. 46 is a diagram showing a drive waveform example in the case of driving the cathode electrode potential.

FIG. 46 shows a waveform example of the output pattern applied to the power supply line DSL by the power supply line driver 171. In FIG. 46, the abscissa indicates the time and the ordinate indicates the potential. This drive waveform is obtained by inverting the drive waveform shown in FIG. 11. In the example of FIG. 45, the intermediate value of the drive potential is set to VH−(Vcat−VSS). The purpose thereof is to prevent application of a reverse bias to the organic EL element OLED.

Figure 47:
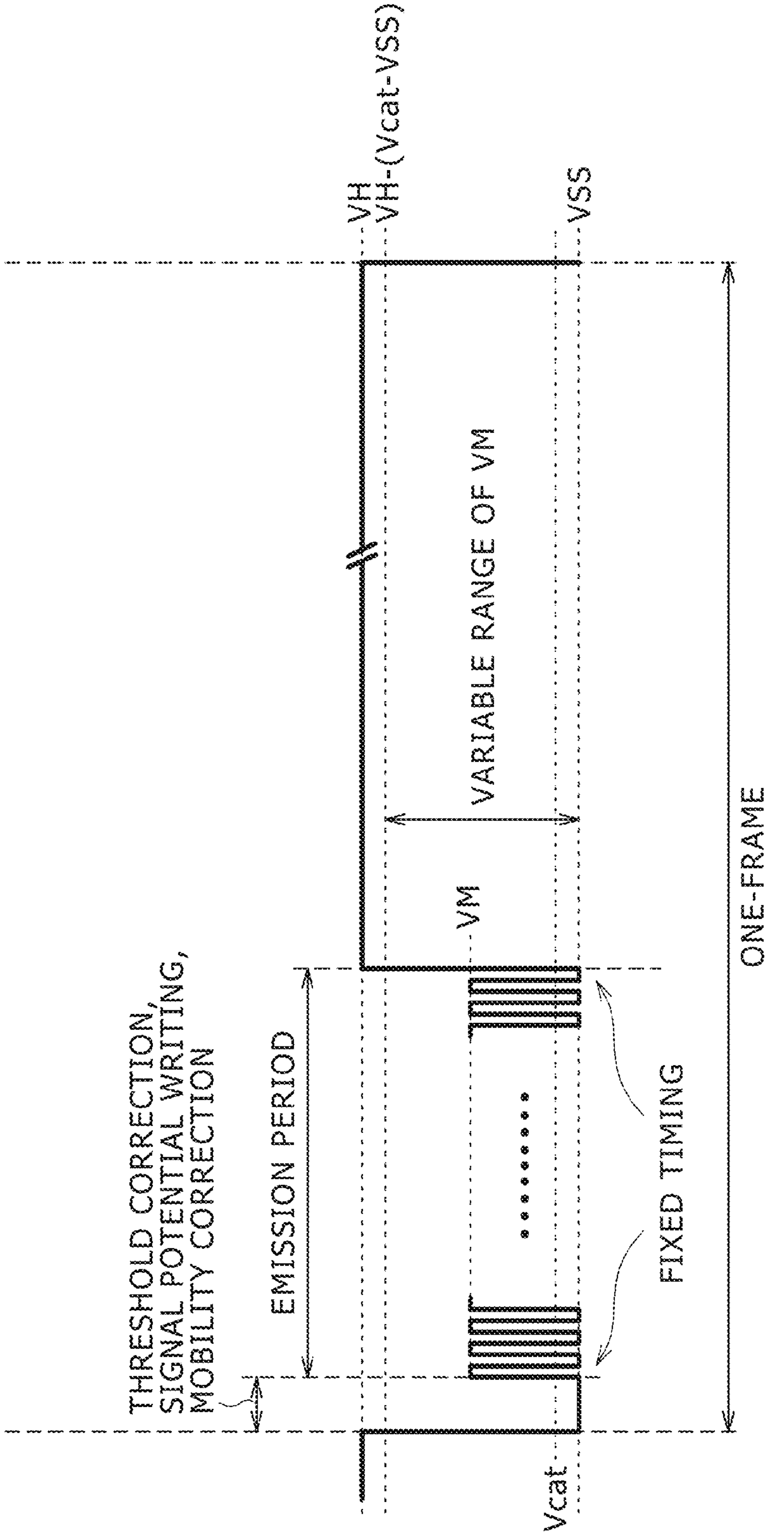
FIG. 47 is a diagram showing a drive waveform example in the case of driving the cathode electrode potential.

In the example of FIG. 46, the drive potential of the intermediate value is a fixed potential. Of course, the same technical concept can be applied also to the case in which the drive potential of the intermediate value is sequentially set as a variable potential as shown in FIG. 47.

(F-4) Another Circuit Configuration of Sub-pixel

Figure 48:
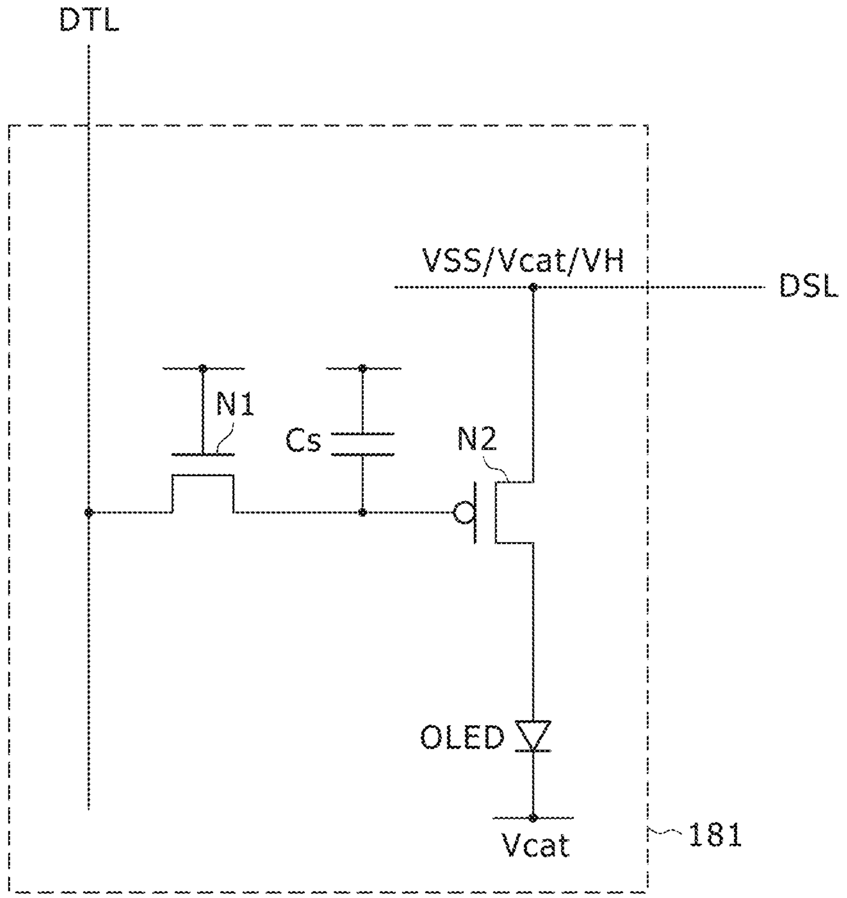
FIG. 48 is a diagram showing another pixel circuit example of a sub-pixel.

The sub-pixel may have another circuit configuration. FIG. 48 shows the circuit configuration of a sub-pixel 181 as another circuit configuration example. In this sub-pixel 181, a drive transistor N2 is formed of a P-channel thin film transistor. Furthermore, one electrode of a hold capacitor Cs is connected to a fixed power supply. Of course, a pixel circuit having another circuit configuration is also possible.

(F-5) Drive Potential of Common Power Supply

In the above-described first and second embodiments, the drive potential for setting the organic EL element OLDE to the non-emission state is set to VSS lower than the cathode electrode potential Vcat. That is, the drive potential is so set that a reverse bias is applied to the organic EL element OLED.

Alternatively, the drive potential for setting the organic EL element OLED to the non-emission state may be set to the cathode electrode potential Vcat.

(F-6) Other Output Pattern Examples

In the above-described embodiments, basically the drive potential VH is applied at positions near both ends of the emission period and the drive potential of the intermediate value is inserted in a pulsed manner in the middle of the emission period.

Figure 49A:
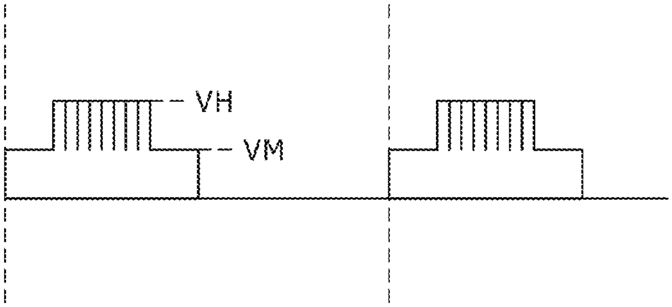
FIGS. 49A to 49C are diagrams showing other output pattern examples.
Figure 49B:
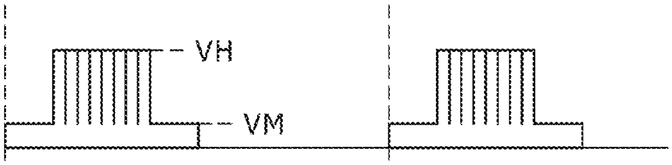
Figure 49C:
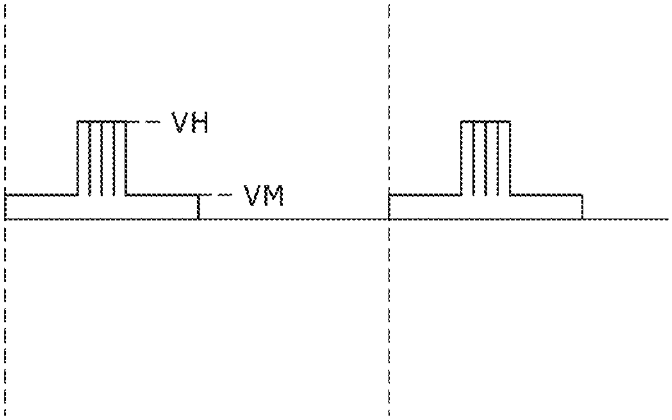

However, an output pattern like those shown in FIGS. 49A to 49C can be employed as an output pattern of the moving image improvement system.

Specifically, the drive potential VM as a variable potential may be applied at positions near both ends of the emission period, and the drive potential VH as a fixed potential may be applied in the middle of the emission period. In this case, if the drive potential VM is lower than the drive potential VH, the drive potential during the emission period has a convex waveform.

FIG. 49A shows an example when the ratio of the output period length of the drive potential VH as a fixed potential is high. FIG. 49B shows an example when the ratio of the output period length of the drive potential VH as a fixed potential is the same as that in FIG. 49A but the value of the drive potential VM as a variable potential is lower than that in FIG. 49A.

FIG. 49C shows an example when the value of the drive potential VM as a variable potential is the same as that in FIG. 49B but the ratio of the output period length of the drive potential VH as a fixed potential is lower than that in FIG. 49B.

In any case, the peak luminance level can be varied with the emission period length itself fixed. In addition, the luminance distribution can be concentrated at the center of the emission period and thus the moving image displaying quality can be enhanced. That is, visual recognition of moving image blur is suppressed.

(F-7) Another Method for Adjusting Peak Luminance Level

In the above-described embodiments, the width of the drive potential (e.g. Vcat or VM) inserted in a pulsed manner is basically fixed and the number of times of the insertion thereof is varied to thereby adjust the peak luminance level.

However, the pulse width of the drive potential inserted in a pulsed manner may be variably controlled.

F-8) Product Examples (Electronic Apparatus

The above description relates to an organic EL panel module having the function to set the emission period according to the embodiment of the present invention. However, an organic EL panel module and other display panel modules having this kind of setting function are distributed also in the commercial product form of being mounted in various kinds of electronic apparatus. Examples of products obtained by mounting the display panel module in electronic apparatus will be described below.

Figure 50:
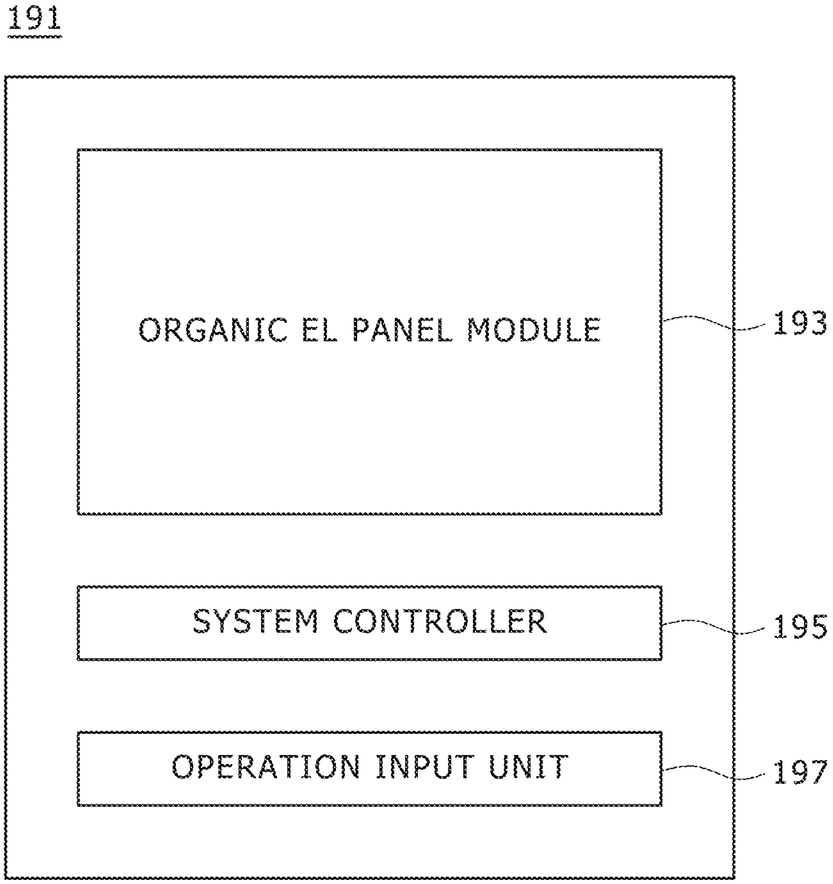
FIG. 50 is a diagram showing a functional configuration example of electronic apparatus.

FIG. 50 shows a conceptual configuration example of electronic apparatus 191. The electronic apparatus 191 includes an organic EL panel module 193 including the above-described drive circuit for the power supply line DSL, a system controller 195, and an operation input unit 197. The processing executed by the system controller 195 differs depending on the commercial product form of the electronic apparatus 191. The operation input unit 197 is a device that accepts operation inputs to the system controller 195. As the operation input unit 197, e.g. a mechanical interface such as a switch and a button or a graphic interface is used.

The electronic apparatus 191 is not limited to apparatus of a specific field as long as it has a function to display an image and video produced therein or input from the external.

Figure 51:
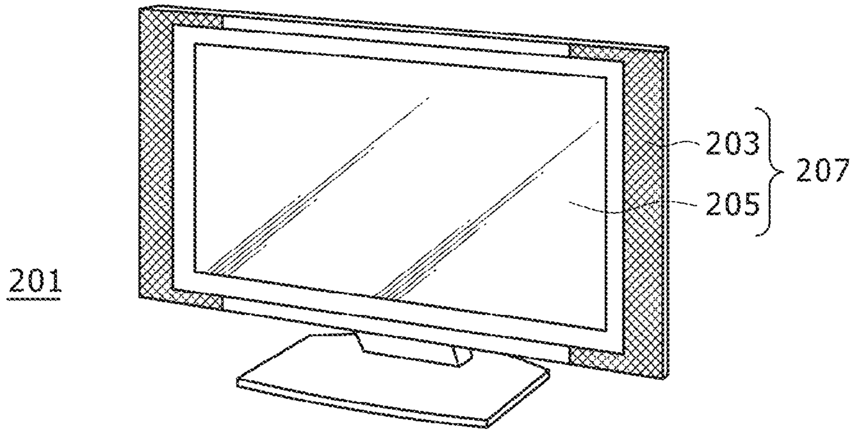
FIG. 51 is a diagram showing a commercial product example of the electronic apparatus.

FIG. 51 is an appearance example of a television receiver as an example of the electronic apparatus. On the front face of the case of this television receiver 201, a display screen 207 composed of a front panel 203, a filter glass 205, and so on is disposed. The display screen 207 corresponds to the organic EL panel module 193.

Figure 52A:
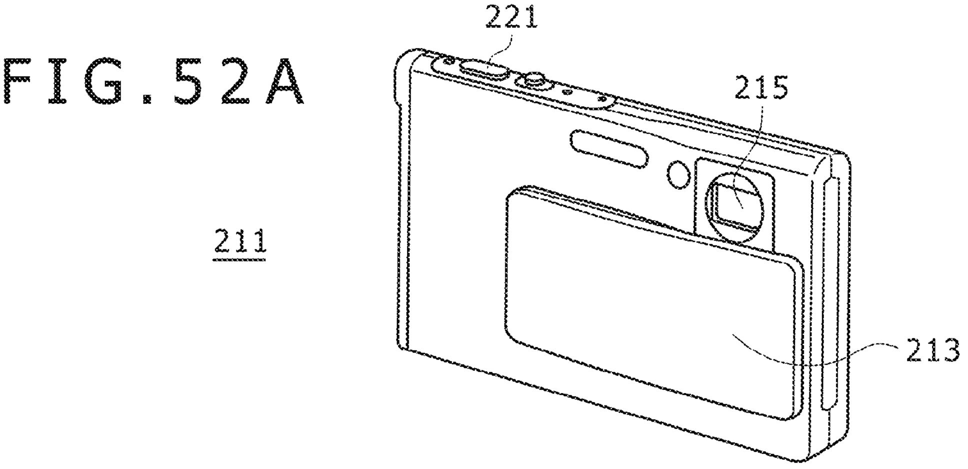
FIGS. 52A and 52B are diagrams showing a commercial product example of the electronic apparatus.
Figure 52B:
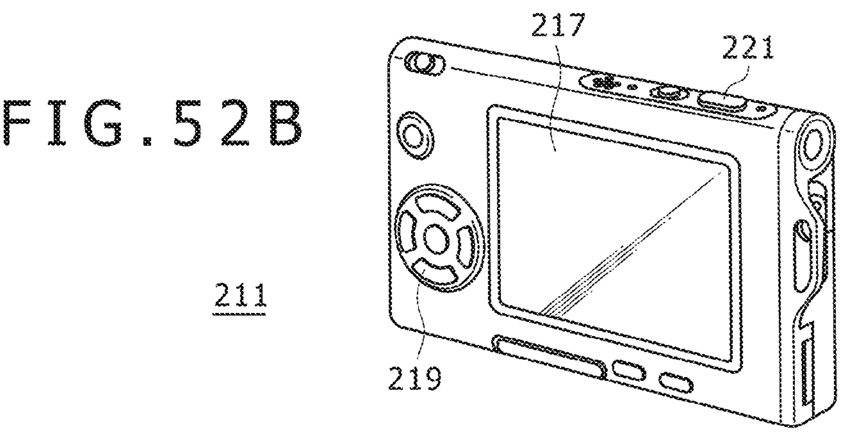

Furthermore, e.g. a digital camera will be available as this kind of electronic apparatus 191. FIGS. 52A and 52B show an appearance example of a digital camera 211. FIG. 52A shows an appearance example of the front-face side (subject side), and FIG. 52B shows an appearance example of the back-face side (photographer side).

The digital camera 211 includes a protective cover 213, an imaging lens unit 215, a display screen 217, a control switch 219, and a shutter button 221. The display screen 217 corresponds to the organic EL panel module 193.

Figure 53:
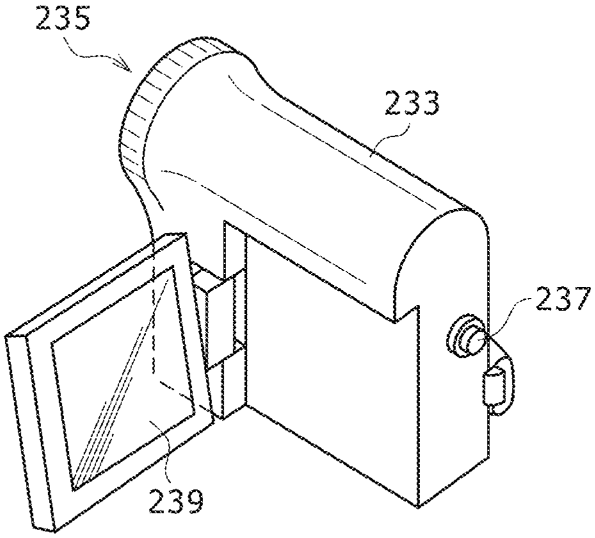
FIG. 53 is a diagram showing a commercial product example of the electronic apparatus.

Furthermore, e.g. a video camera will be available as this kind of electronic apparatus 191. FIG. 53 shows an appearance example of a video camera 231.

The video camera 231 includes an imaging lens 235 that is disposed on the front side of a main body 233 and used to capture an image of a subject, a start/stop switch 237 for photographing, and a display screen 239. The display screen 239 corresponds to the organic EL panel module 193.

Figure 54A:
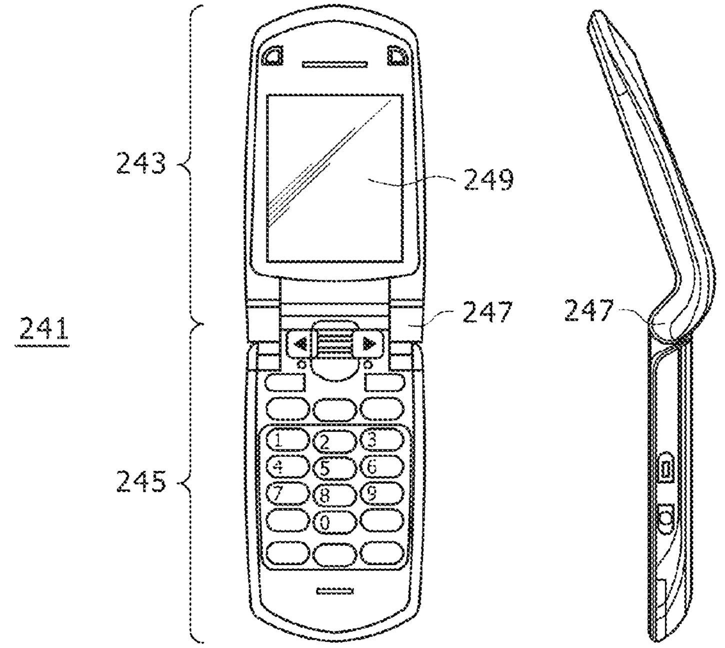
FIGS. 54A and 54B are diagrams showing a commercial product example of the electronic apparatus.
Figure 54B:
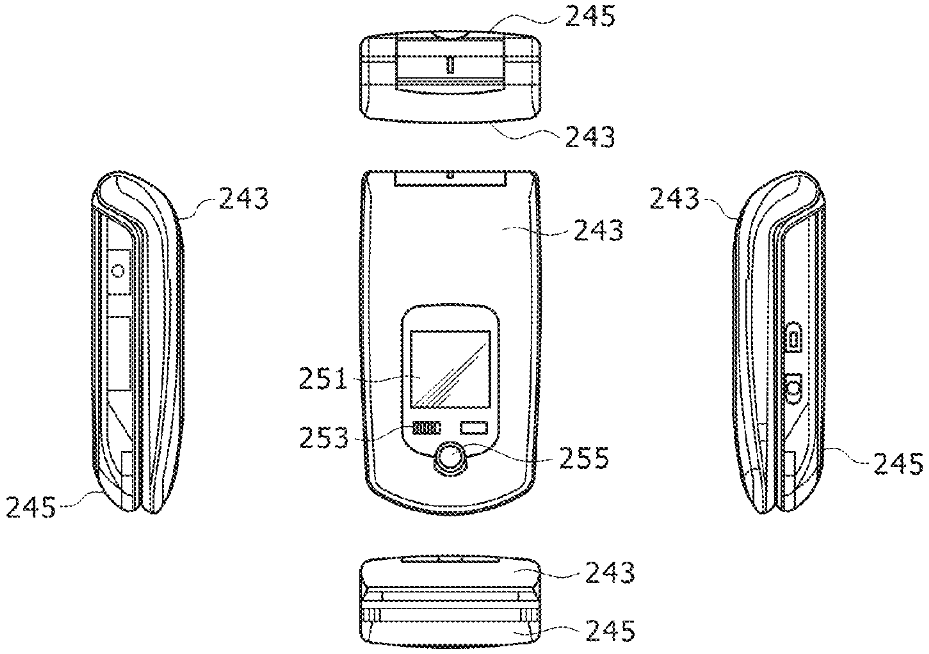

Furthermore, e.g. a portable terminal device will be available as this kind of electronic apparatus 191. FIGS. 54A and 54B show an appearance example of a cellular phone 241 as the portable terminal device. The cellular phone 241 shown in FIGS. 54A and 54B are a foldable type. FIG. 54A shows an appearance example of the opened state, and FIG. 54B shows an appearance example of the folded state.

The cellular phone 241 includes an upper case 243, a lower case 245, a connection (hinge, in this example) 247, a display screen 249, an auxiliary display screen 251, a picture light 253, and an imaging lens 255. The display screen 249 and the auxiliary display screen 251 correspond to the organic EL panel module 193.

Figure 55:
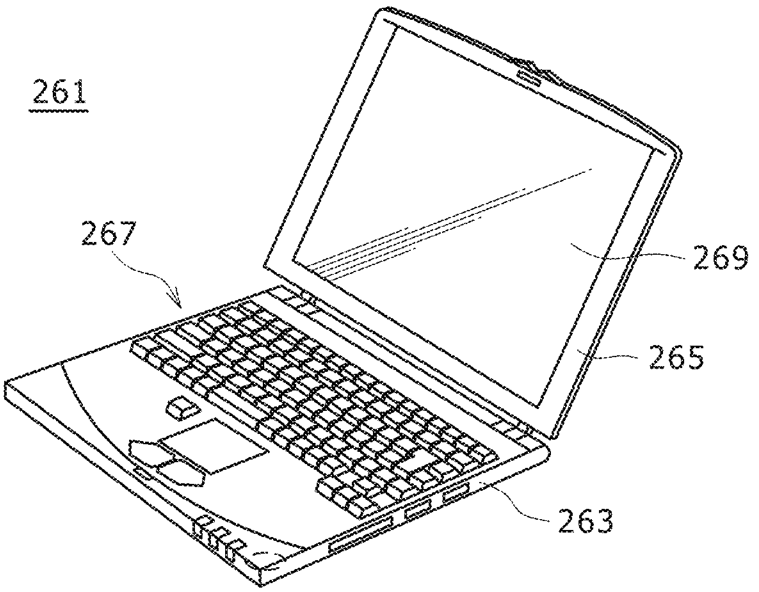
FIG. 55 is a diagram showing a commercial product example of the electronic apparatus.

Furthermore, e.g. a computer will be available as this kind of electronic apparatus 191. FIG. 55 shows an appearance example of a notebook computer 261.

The notebook computer 261 includes a lower case 263, an upper case 265, a keyboard 267, and a display screen 269. The display screen 269 corresponds to the organic EL panel module 193.

Besides the above-described devices, an audio reproduction device, a game machine, an electronic book, an electronic dictionary, and so on will be available as the electronic apparatus 191.

(F-9) Other Display Device Examples

In the above-described embodiments, the above-described drive technique is applied to an organic EL panel module.

However, the drive technique can be applied also to other self-luminous display panel modules. For example, the drive technique can be applied also to a display device including arranged LEDs and a display device in which other light emitting elements having a diode structure are arranged on the screen. For example, the drive technique can be applied also to a display panel module in which inorganic EL elements are arranged in a matrix.

(F-10) Others

Various modifications might be incorporated into the above-described embodiments without departing from the scope of the present invention. In addition, various modifications and applications that are created or combined based on the description of the present specification will also be possible.

The present application contains subject matter related to that disclosed in Japanese Priority Patent Application JP 2008-256931 filed in the Japan Patent Office on Oct. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel element including a self-luminous element and a drive transistor, connected serially between a power supply line and a cathode electrode of the self-luminous element, wherein the power supply line being connected to a current terminal of the drive transistor, a control circuitry configured to drive the pixel element so as to control a voltage between an anode electrode of the self-luminous element and the cathode electrode;

wherein the control circuitry is configured to:

repeatedly switch between an active state and an intermediate state so as to obtain a predetermined luminance duration in an emission period, wherein the active state is a state that the self-luminous element emits light and the intermediate state is a state that the self-luminous element is turned off without receiving a reverse-biased potential at the anode electrode, and apply an off-state voltage between the anode electrode and the cathode electrode during a non-emission period.

2. The display device according to claim 1, wherein the control circuitry is configured to supply a pulse-shaped waveform for the pixel element such that a predetermined peak luminance level is obtained in the emission period, the emission period having fixed starting and ending timings.

3. The display device according to claim 1, wherein the control circuitry is configured to set the pixel element to the intermediate state a plurality of times within the emission period.

4. The display device according to claim 3, wherein the control circuitry is configured to adjust a peak luminance level of the self-luminous element through variable control of a number of times of application of the intermediate state.

5. The display device according to claim 1, wherein the control circuitry is configured to adjust a peak luminance level of the self-luminous element through variable control of an application period length of the active state and the intermediate state.

6. The display device according to claim 1, wherein an intermediate voltage is applied to the self-luminous element when the self-luminous element is set to the intermediate state.

7. The display device according to claim 6, wherein a potential difference between an anode and a cathode of the self-luminous element is smaller than a threshold voltage of the self-luminous element, when the pixel element is set to the intermediate state.

8. The display device according to claim 1, wherein the off-state voltage is configured to set the self-luminous element in a reverse-biased state.

9. The display device according to claim 1, wherein the self-luminous element is an organic EL element.

10. The display device according to claim 1, wherein the power supply line is directly connected to the current terminal of the drive transistor.

11. A display apparatus comprising a display panel and the control circuitry, wherein the display panel includes a plurality of pixel elements;

one of the pixel elements including a self-luminous element and a drive transistor, connected serially between a power supply line and a cathode electrode of the self-luminous element, wherein the power supply line being connected to a current terminal of the drive transistor;

the control circuitry is configured to drive one of the pixel element so as to control a voltage between an anode electrode of the self-luminous element and the cathode electrode, and wherein the control circuitry is further configured to:

repeatedly switch between an active state and an intermediate state in an emission period, wherein the active state is a state that the self-luminous element emits light and the intermediate state is a state that the self-luminous element being turned off without receiving a reverse-biased potential at the anode electrode, and an off-state voltage is applied between the anode electrode and the cathode electrode during a non-emission period.

12. The display apparatus according to claim 11, wherein the control circuitry is configured to variably change at least one of timing, frequency, and duration of application of the active voltage based on a condition.

13. The display apparatus according to claim 12, wherein the condition is a mode selected from a plurality of predetermined modes according to a user preference.

14. The display apparatus according to claim 12, wherein the condition is determined based on an attribute of an image data.

15. The display apparatus according to claim 14, wherein the attribute of the image data is detected based on at least one of a moving image component and a flicker component of the image data.

16. The display apparatus according to claim 11, wherein the control circuitry is configured to variably change an active voltage which is applied between the drive transistor and the cathode electrode during the emission period, based on a condition.

17. The display apparatus according to claim 16, wherein the condition is determined based on at least one of an average luminance level of an image data and an ambient luminance level.

18. The display apparatus according to claim 16, wherein the condition is determined based on temperature associated with the display panel.

19. The display apparatus according to claim 11, wherein the control circuitry further comprises:

a signal line drive circuit configured to drive signal lines; and a write control line drive circuit configured to control potential writing to the plurality of pixels arranged in a matrix.

20. An electronic device comprising:

the display apparatus according to claim 11;

a system controller configured to control operation of the display panel; and an operation input unit for the system controller.

21. A method for driving a display device, the display device comprising a pixel element including a self-luminous element and a drive transistor, connected serially between a power supply line and a cathode electrode of the self-luminous element, wherein the power supply line being connected to a current terminal of the drive transistor, the method comprising:

applying an off-state voltage between an anode electrode of the self-luminous element and the cathode electrode during a non-emission period;

repeatedly switching a state of the self-luminous element between an active state and an intermediate state so as to obtain a predetermined luminance duration in an emission period, wherein the active state is a state that the self-luminous element emits light and the intermediate state is a state that the self-luminous element being turned off without receiving a reverse-biased potential at the anode electrode.

22. The method according to claim 21, wherein said switching the state of the self-luminous element includes setting the pixel element to the intermediate state a plurality of times within the emission period.

23. The method according to claim 21, wherein said switching the state of the self-luminous element includes adjusting a peak luminance level of the self-luminous element by controlling each of application period lengths of the active and the intermediate states.

24. The method according to claim 21, further comprising variably changing at least one of timing, frequency, and duration of application of the active voltage based on a condition.

25. The method according to claim 24, further comprising setting the condition to a mode selected from a plurality of predetermined modes according to a user preference.

26. The method according to claim 24, further comprising determining the condition based on an attribute of an image data.

27. The method according to claim 21, further comprising variably changing an active voltage which is applied between the drive transistor and the cathode electrode during the emission period, based on a condition.

28. The method according to claim 27, further comprising determining the condition based on at least one of an average luminance level of an image data and an ambient luminance level.

29. The method according to claim 27, further comprising determining the condition based on temperature associated with the display panel.

30. The method according to claim 21, wherein the self-luminous element is an organic EL element.

* * * * *